(12) United States Patent
Zhang et al.

(10) Patent No.: US 11,719,916 B2
(45) Date of Patent: Aug. 8, 2023

(54) OPTICAL IMAGING LENS

(71) Applicant: Genius Electronic Optical (Xiamen) Co., Ltd., Xiamen (CN)

(72) Inventors: Lanlan Zhang, Xiamen (CN); Xinming Liu, Xiamen (CN); Hai Lin, Xiamen (CN); Chuanbo Dong, Xiamen (CN); Hung-Chien Hsieh, Taichung (TW)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 376 days.

(21) Appl. No.: 17/034,293

(22) Filed: Sep. 28, 2020

(65) Prior Publication Data

US 2022/0066143 A1    Mar. 3, 2022

(30) Foreign Application Priority Data

Aug. 25, 2020   (CN) .......................... 202010863979.0

(51) Int. Cl.
| | | |
|---|---|---|
| G02B 13/18 | (2006.01) | |
| G02B 13/00 | (2006.01) | |
| G02B 9/62 | (2006.01) | |
| G02B 27/00 | (2006.01) | |
| H04N 23/55 | (2023.01) | |

(52) U.S. Cl.
CPC ........... *G02B 13/0045* (2013.01); *G02B 9/62* (2013.01); *G02B 27/0025* (2013.01); *H04N 23/55* (2023.01)

(58) Field of Classification Search
CPC .. G02B 13/0045; G02B 9/62; G02B 27/0025; H04N 5/2254
See application file for complete search history.

(56) References Cited

U.S. PATENT DOCUMENTS

| | | | | |
|---|---|---|---|---|
| 2015/0346460 | A1* | 12/2015 | Chen ................. | G02B 13/0045 359/713 |
| 2019/0331900 | A1* | 10/2019 | Yao .................... | G02B 13/0045 |
| 2021/0018727 | A1* | 1/2021 | Hagiwara .......... | G02B 13/0045 |
| 2022/0066137 | A1* | 3/2022 | Yang ................... | G02B 13/0045 |

FOREIGN PATENT DOCUMENTS

| | | | | |
|---|---|---|---|---|
| WO | WO-2020098384 | A1 * | 5/2020 | ............. B60R 11/04 |
| WO | WO-2021184212 | A1 * | 9/2021 | |

* cited by examiner

*Primary Examiner* — George G. King
*Assistant Examiner* — Anna Elizabeth Smith
(74) *Attorney, Agent, or Firm* — Chen Yoshimura LLP

(57) ABSTRACT

An optical imaging lens may include a first, a second, a third, a fourth, a fifth, and a sixth lens elements positioned in an order from an object side to an image side. Through designing concave and/or convex surfaces of the six lens elements, the improved optical imaging lens may provide better imaging quality while the length of the lens may be shortened, the F-number may be reduced, and the field of view may be extended.

20 Claims, 54 Drawing Sheets

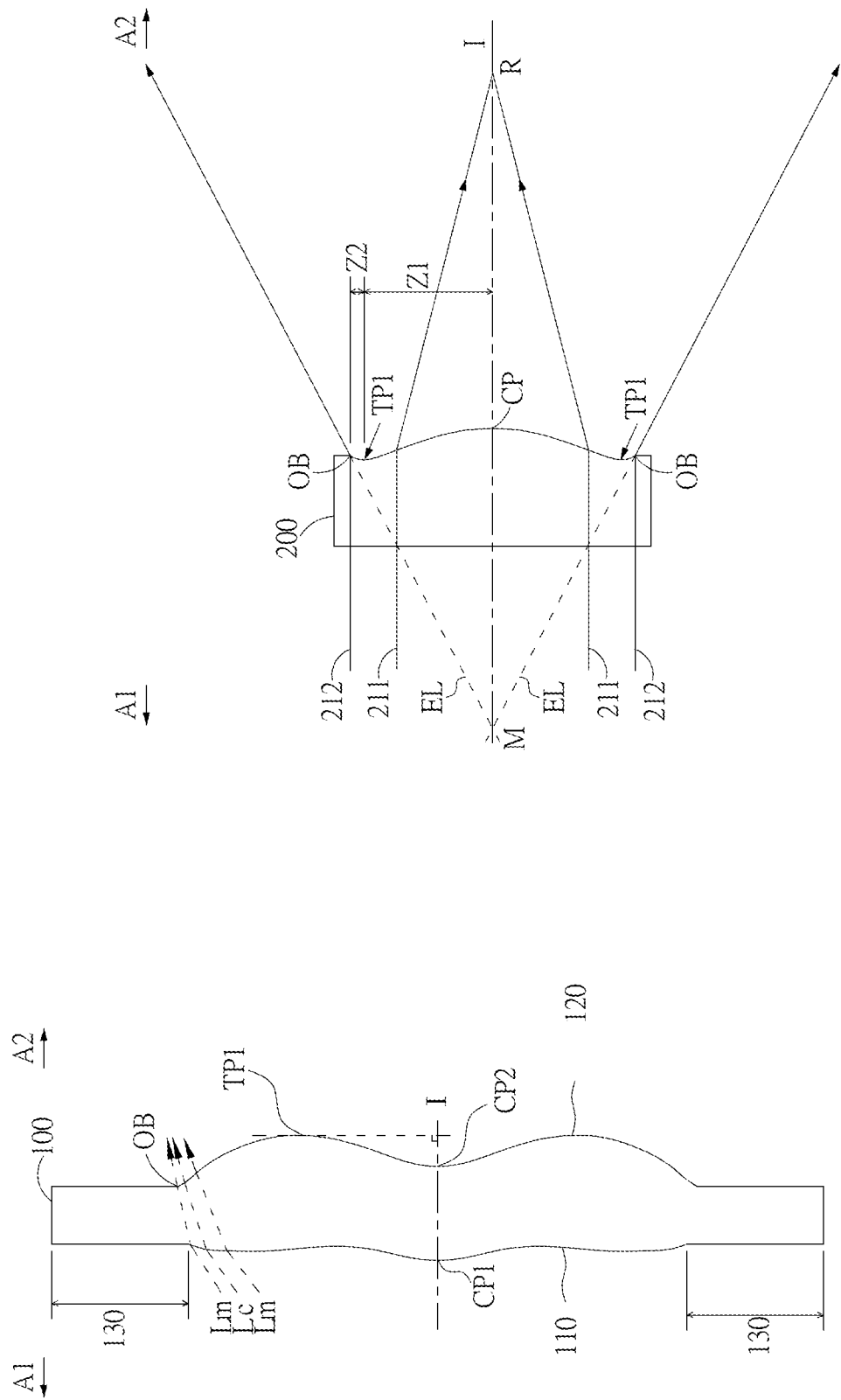

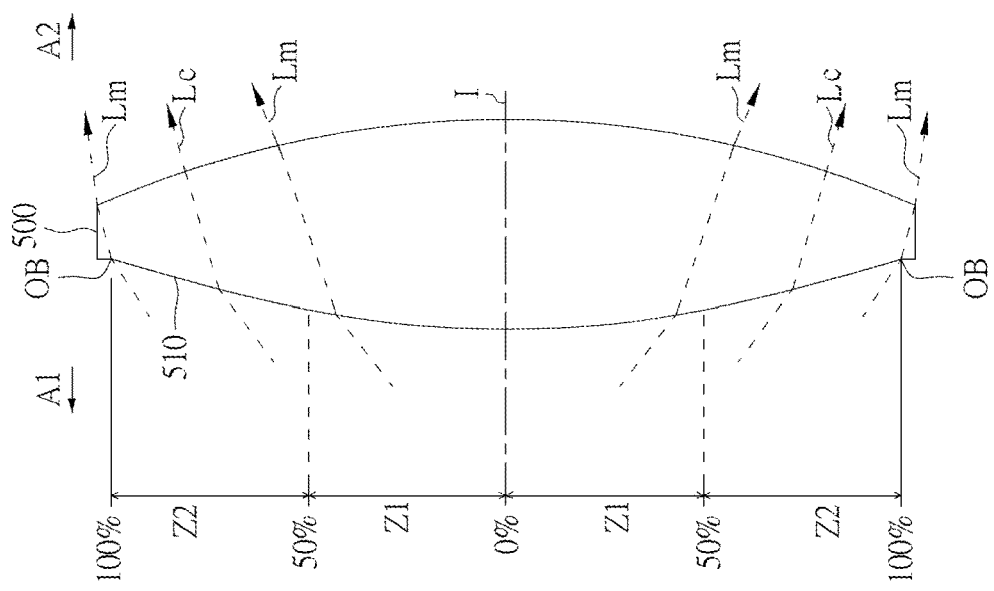
FIG. 5
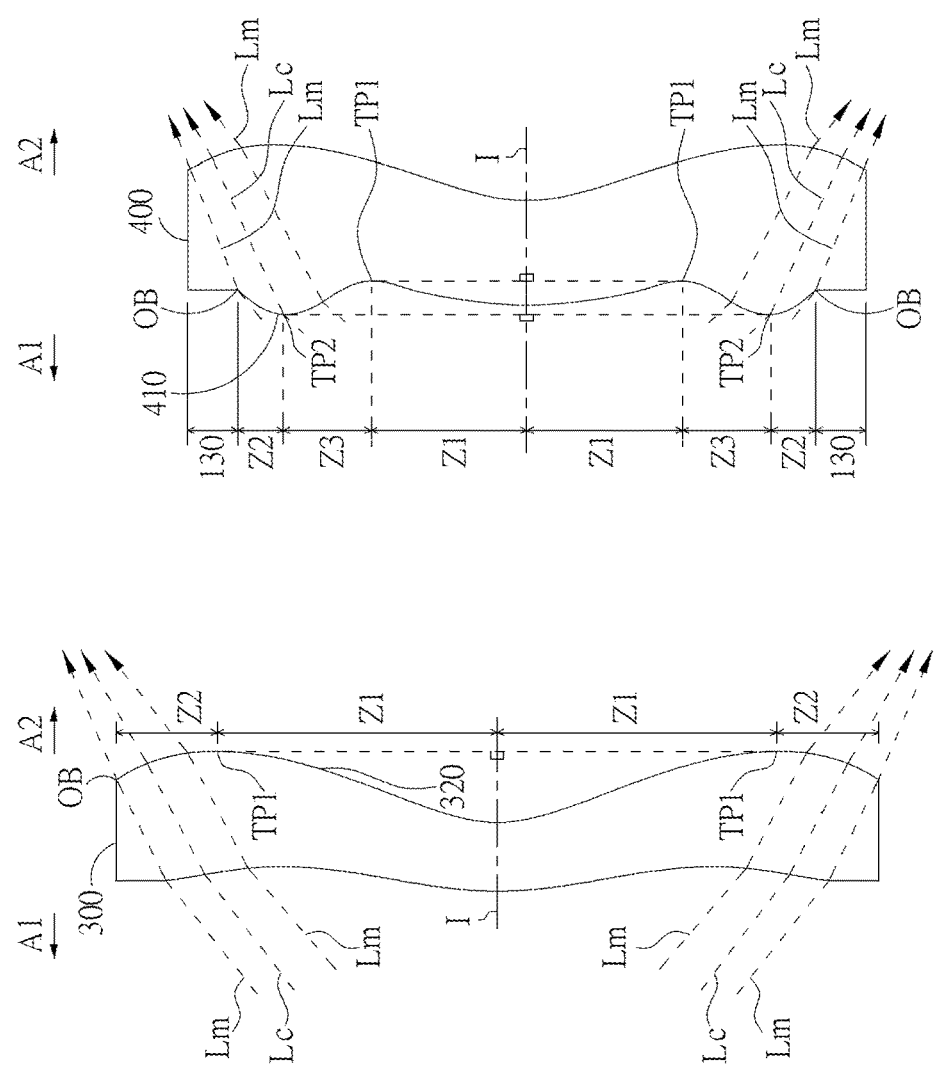
FIG. 4
FIG. 3

| Embodiment 1 ||||||||
| :---: | :---: | :---: | :---: | :---: | :---: | :---: | :---: |
| EFL = 2.551 mm ; HFOV = 53.242 degrees ; TTL = 5.965 mm ||||||||
| Fno = 2.200 ; Image Height = 2.328 mm ||||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 1.034 | 0.272 | 1.545 | 55.987 | -6.435 | Plastic |
| L1A2 | | 0.725 | 0.857 | | | | |
| L2A1 | 2nd lens element | -2.432 | 0.726 | 1.567 | 37.533 | 39.453 | Plastic |
| L2A2 | | -2.432 | 0.174 | | | | |
| STO | Aperture stop | INFINITY | -0.154 | | | | |
| L3A1 | 3rd lens element | 1.745 | 0.845 | 1.535 | 55.635 | 1.980 | Plastic |
| L3A2 | | -2.249 | 0.050 | | | | |
| L4A1 | 4th lens element | 4.758 | 0.288 | 1.642 | 22.409 | -2.818 | Plastic |
| L4A2 | | 1.286 | 0.175 | | | | |
| L5A1 | 5th lens element | 4.757 | 0.886 | 1.535 | 55.635 | 1.710 | Plastic |
| L5A2 | | -1.061 | 0.226 | | | | |
| L6A1 | 6th lens element | -2.132 | 0.310 | 1.545 | 55.987 | -1.888 | Plastic |
| L6A2 | | 2.098 | 0.498 | | | | |
| TFA1 | Filtering unit | INFINITY | 0.210 | 1.517 | 64.167 | | |
| TFA2 | | INFINITY | 0.603 | | | | |
| IMA | Image plane | INFINITY | | | | | |

FIG. 8

| Embodiment 1 |||
|---|---|---|
| Aspherical Parameters |||
| Surface# | K | a2 | a4 |
| L1A1 | -1.902075E+00 | 0.000000E+00 | 1.830125E-03 |
| L1A2 | -1.362917E+00 | 0.000000E+00 | 2.883745E-02 |
| L2A1 | 0.000000E+00 | 0.000000E+00 | -4.949265E-03 |
| L2A2 | 0.000000E+00 | 0.000000E+00 | -2.114973E-02 |
| L3A1 | 1.436440E+00 | 0.000000E+00 | -5.335925E-02 |
| L3A2 | 1.347082E+00 | 0.000000E+00 | -2.521630E-02 |
| L4A1 | 0.000000E+00 | 0.000000E+00 | -4.229690E-01 |
| L4A2 | 1.391592E-01 | 0.000000E+00 | -4.280938E-01 |
| L5A1 | 1.379794E+01 | 0.000000E+00 | 6.945970E-02 |
| L5A2 | -3.032614E+00 | 0.000000E+00 | 1.225528E-01 |
| L6A1 | -2.356019E+00 | 0.000000E+00 | 9.976870E-02 |
| L6A2 | -7.336964E-01 | 0.000000E+00 | -2.903343E-01 |
| Surface# | a6 | a8 | a10 |
| L1A1 | -2.274827E-01 | 2.006890E-01 | -7.807523E-02 |
| L1A2 | -3.687292E-01 | 4.377050E-01 | -2.244193E-01 |
| L2A1 | -3.383132E-02 | 7.094654E-02 | -3.458010E-02 |
| L2A2 | 4.285752E-02 | 2.142114E-02 | -3.142715E-02 |
| L3A1 | 1.097135E-02 | -4.560037E-02 | 3.707025E-02 |
| L3A2 | 1.145912E-01 | -2.008238E-01 | 2.299247E-01 |
| L4A1 | 4.432571E-01 | -3.480637E-01 | 1.218025E-01 |
| L4A2 | 4.044545E-01 | -2.797639E-01 | 7.505915E-03 |
| L5A1 | -1.131004E-01 | 1.097740E-01 | -1.095645E-01 |
| L5A2 | -4.226348E-01 | 5.791583E-01 | -5.442394E-01 |
| L6A1 | -7.345783E-01 | 1.206932E+00 | -1.344699E+00 |
| L6A2 | 2.009760E-01 | -1.146113E-01 | 4.635157E-02 |

FIG. 9

| Embodiment 1 | | | |
|---|---|---|---|
| Aspherical Parameters | | | |
| Surface# | a12 | a14 | a16 |
| L1A1 | 1.438989E-02 | -1.089487E-03 | 0.000000E+00 |
| L1A2 | 5.919041E-02 | 0.000000E+00 | 0.000000E+00 |
| L2A1 | 1.040391E-02 | 0.000000E+00 | 0.000000E+00 |
| L2A2 | 2.471823E-02 | 0.000000E+00 | 0.000000E+00 |
| L3A1 | -3.009144E-02 | 0.000000E+00 | 0.000000E+00 |
| L3A2 | -9.927635E-02 | 0.000000E+00 | 0.000000E+00 |
| L4A1 | 6.803400E-02 | -8.527575E-02 | 0.000000E+00 |
| L4A2 | 1.420017E-01 | -8.025861E-02 | 0.000000E+00 |
| L5A1 | 5.484829E-02 | -1.176861E-02 | 0.000000E+00 |
| L5A2 | 2.803788E-01 | -6.399858E-02 | 0.000000E+00 |
| L6A1 | 8.776910E-01 | -2.884663E-01 | 3.867836E-02 |
| L6A2 | -8.676040E-03 | -1.308860E-04 | 1.925328E-04 |

FIG. 9 (Conti)

| Embodiment 2 |||||||
|---|---|---|---|---|---|---|
| EFL = 2.675 mm ; HFOV = 47.116 degrees ; TTL = 4.984 mm |||||||
| Fno = 2.200 ; Image Height = 2.328 mm |||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 1.232 | 0.200 | 1.545 | 55.987 | -8.403 | Plastic |
| L1A2 | | 0.916 | 0.515 | | | | |
| L2A1 | 2nd lens element | -5.279 | 0.540 | 1.642 | 22.409 | -8.635 | Plastic |
| L2A2 | | -100.551 | 0.172 | | | | |
| STO | Aperture stop | INFINITY | -0.152 | | | | |
| L3A1 | 3rd lens element | 1.644 | 0.430 | 1.535 | 55.635 | 2.100 | Plastic |
| L3A2 | | -3.241 | 0.205 | | | | |
| L4A1 | 4th lens element | 1.699 | 0.239 | 1.642 | 22.409 | 334.404 | Plastic |
| L4A2 | | 1.618 | 0.073 | | | | |
| L5A1 | 5th lens element | 26.246 | 1.116 | 1.535 | 55.635 | 2.128 | Plastic |
| L5A2 | | -1.174 | 0.323 | | | | |
| L6A1 | 6th lens element | -1.539 | 0.318 | 1.545 | 55.987 | -1.533 | Plastic |
| L6A2 | | 1.966 | 0.498 | | | | |
| TFA1 | Filtering unit | INFINITY | 0.210 | 1.517 | 64.167 | | |
| TFA2 | | INFINITY | 0.299 | | | | |
| IMA | Image plane | INFINITY | | | | | |

FIG. 12

| Embodiment 2 |||
|---|---|---|
| Aspherical Parameters |||
| Surface# | K | a2 | a4 |
| L1A1 | -1.268823E+00 | 0.000000E+00 | -1.077176E-01 |
| L1A2 | -1.732796E+00 | 0.000000E+00 | 1.735042E-02 |
| L2A1 | 0.000000E+00 | 0.000000E+00 | -2.271450E-02 |
| L2A2 | 0.000000E+00 | 0.000000E+00 | 7.294743E-03 |
| L3A1 | 2.365116E+00 | 0.000000E+00 | -9.828113E-02 |
| L3A2 | 5.172271E+00 | 0.000000E+00 | -2.849524E-01 |
| L4A1 | 0.000000E+00 | 0.000000E+00 | -6.479191E-01 |
| L4A2 | 1.533353E+00 | 0.000000E+00 | -3.616505E-01 |
| L5A1 | 2.863931E+02 | 0.000000E+00 | 2.241180E-01 |
| L5A2 | -1.411445E+00 | 0.000000E+00 | 2.240091E-01 |
| L6A1 | 1.007587E+00 | 0.000000E+00 | 8.173443E-02 |
| L6A2 | -3.741589E-01 | 0.000000E+00 | -2.880449E-01 |
| Surface# | a6 | a8 | a10 |
| L1A1 | -2.531673E-01 | 2.228105E-01 | -7.504098E-02 |
| L1A2 | -4.743365E-01 | 4.341017E-01 | -2.632831E-01 |
| L2A1 | -5.317285E-02 | -9.173426E-02 | 1.262431E-01 |
| L2A2 | -3.441214E-02 | -5.881517E-02 | 2.638370E-01 |
| L3A1 | 1.023619E-01 | -5.756284E-01 | 8.089826E-01 |
| L3A2 | 7.817378E-01 | -1.135477E+00 | 8.316767E-01 |
| L4A1 | 6.194267E-01 | -4.351882E-01 | -4.059638E-02 |
| L4A2 | 2.924092E-01 | -6.484058E-02 | -6.061091E-02 |
| L5A1 | 1.733004E-02 | 4.278031E-04 | -1.183137E-01 |
| L5A2 | -4.181767E-01 | 5.769223E-01 | -5.529343E-01 |
| L6A1 | -6.386258E-01 | 1.216445E+00 | -1.415030E+00 |
| L6A2 | 1.913345E-01 | -1.031026E-01 | 3.876536E-02 |

FIG. 13

| Embodiment 2 | | | |
|---|---|---|---|
| Aspherical Parameters | | | |
| Surface# | a12 | a14 | a16 |
| L1A1 | 9.976747E-03 | -2.581420E-03 | 0.000000E+00 |
| L1A2 | 7.757558E-02 | 0.000000E+00 | 0.000000E+00 |
| L2A1 | -4.280424E-02 | 0.000000E+00 | 0.000000E+00 |
| L2A2 | -1.594674E-01 | 0.000000E+00 | 0.000000E+00 |
| L3A1 | -5.696961E-01 | 0.000000E+00 | 0.000000E+00 |
| L3A2 | -1.394093E-01 | 0.000000E+00 | 0.000000E+00 |
| L4A1 | 6.883573E-01 | -6.143809E-01 | 0.000000E+00 |
| L4A2 | -6.762356E-03 | -7.192359E-02 | 0.000000E+00 |
| L5A1 | 4.828479E-02 | 1.588002E-02 | 0.000000E+00 |
| L5A2 | 2.659548E-01 | -2.836348E-02 | 0.000000E+00 |
| L6A1 | 8.637430E-01 | -2.135197E-01 | 1.707068E-02 |
| L6A2 | -9.343934E-03 | 1.319051E-03 | -9.064961E-05 |

FIG. 13 (Conti)

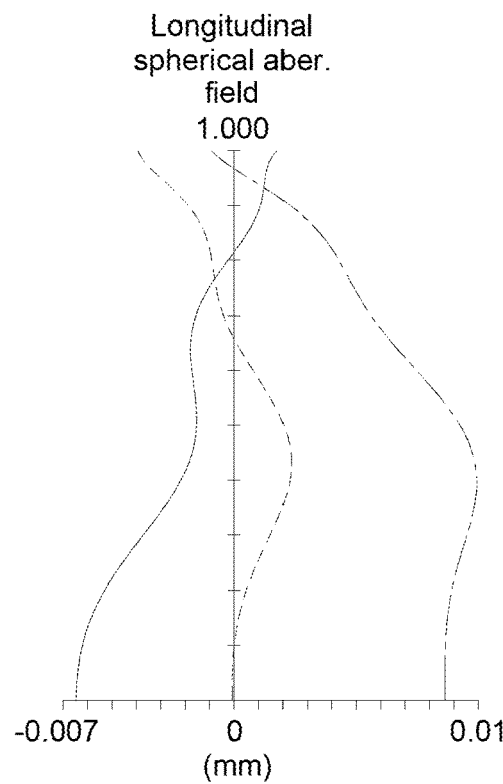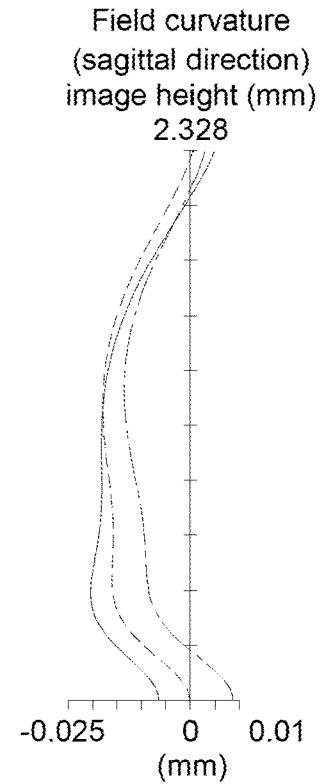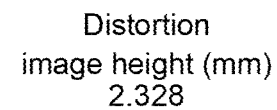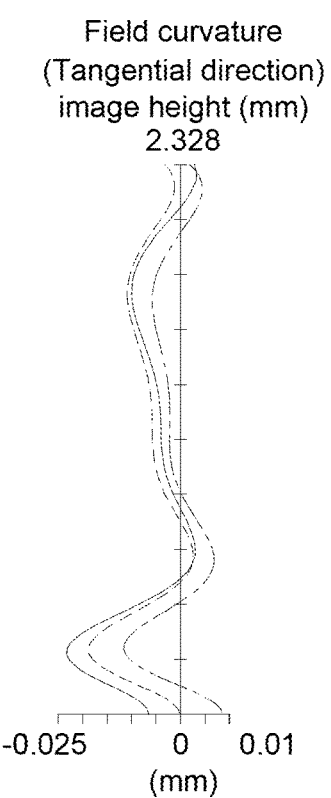
FIG. 15(a)
FIG. 15(b)
FIG. 15(c)
FIG. 15(d)

| Embodiment 3 ||||||||
| --- | --- | --- | --- | --- | --- | --- | --- |
| EFL = 2.749 mm ; HFOV = 55.305 degrees ; TTL = 6.580 mm ||||||||
| Fno = 2.200 ; Image Height = 2.328 mm ||||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 1.258 | 0.401 | 1.545 | 55.987 | -5.155 | Plastic |
| L1A2 | | 0.771 | 0.929 | | | | |
| L2A1 | 2nd lens element | -8.707 | 0.696 | 1.642 | 22.409 | 29.312 | Plastic |
| L2A2 | | -6.154 | 0.248 | | | | |
| STO | Aperture stop | INFINITY | -0.098 | | | | |
| L3A1 | 3rd lens element | 1.906 | 0.705 | 1.535 | 55.635 | 2.057 | Plastic |
| L3A2 | | -2.275 | 0.100 | | | | |
| L4A1 | 4th lens element | 14.467 | 0.299 | 1.642 | 22.409 | -3.118 | Plastic |
| L4A2 | | 1.755 | 0.177 | | | | |
| L5A1 | 5th lens element | 5.363 | 0.928 | 1.535 | 55.635 | 1.382 | Plastic |
| L5A2 | | -0.807 | 0.121 | | | | |
| L6A1 | 6th lens element | -1.829 | 0.421 | 1.545 | 55.987 | -1.484 | Plastic |
| L6A2 | | 1.572 | 0.498 | | | | |
| TFA1 | Filtering unit | INFINITY | 0.210 | 1.517 | 64.167 | | |
| TFA2 | | INFINITY | 0.946 | | | | |
| IMA | Image plane | INFINITY | | | | | |

FIG. 16

| Embodiment 3 | | | |
|---|---|---|---|
| Aspherical Parameters | | | |
| Surface# | K | a2 | a4 |
| L1A1 | -4.404942E+00 | 0.000000E+00 | 9.420190E-02 |
| L1A2 | -2.102178E+00 | 0.000000E+00 | 1.741565E-01 |
| L2A1 | 0.000000E+00 | 0.000000E+00 | 7.970167E-03 |
| L2A2 | 0.000000E+00 | 0.000000E+00 | -3.529305E-03 |
| L3A1 | -3.713001E-01 | 0.000000E+00 | -1.618195E-02 |
| L3A2 | 2.923760E+00 | 0.000000E+00 | 6.294263E-03 |
| L4A1 | 0.000000E+00 | 0.000000E+00 | -2.918362E-01 |
| L4A2 | 1.196039E+00 | 0.000000E+00 | -3.340390E-01 |
| L5A1 | -1.178275E+02 | 0.000000E+00 | 6.270647E-02 |
| L5A2 | -5.363953E+00 | 0.000000E+00 | -3.761138E-02 |
| L6A1 | -4.676854E+01 | 0.000000E+00 | 1.314055E-01 |
| L6A2 | -2.727725E-01 | 0.000000E+00 | -2.940928E-01 |
| Surface# | a6 | a8 | a10 |
| L1A1 | -2.798987E-01 | 2.049134E-01 | -7.621967E-02 |
| L1A2 | -4.940265E-01 | 4.518041E-01 | -2.049782E-01 |
| L2A1 | -4.426286E-02 | 4.002267E-03 | 2.462802E-02 |
| L2A2 | -6.632414E-02 | 1.691622E-01 | -1.459550E-01 |
| L3A1 | -5.587151E-02 | 8.225183E-02 | -7.182352E-02 |
| L3A2 | -4.130674E-02 | 1.248578E-01 | -1.005816E-01 |
| L4A1 | 2.414659E-01 | -1.352513E-01 | 1.350522E-01 |
| L4A2 | 3.422331E-01 | -3.011205E-01 | 1.808570E-01 |
| L5A1 | -5.258191E-02 | 7.118982E-02 | -4.690521E-02 |
| L5A2 | -1.257901E-01 | 3.376570E-01 | -3.904551E-01 |
| L6A1 | -6.202038E-01 | 1.093871E+00 | -1.195669E+00 |
| L6A2 | 2.091451E-01 | -1.333739E-01 | 5.456359E-02 |

FIG. 17

| Embodiment 3 | | | |
|---|---|---|---|
| Aspherical Parameters | | | |
| Surface# | a12 | a14 | a16 |
| L1A1 | 1.500095E-02 | -1.239172E-03 | 0.000000E+00 |
| L1A2 | 4.066944E-02 | 0.000000E+00 | 0.000000E+00 |
| L2A1 | -1.038708E-02 | 0.000000E+00 | 0.000000E+00 |
| L2A2 | 6.605895E-02 | 0.000000E+00 | 0.000000E+00 |
| L3A1 | 3.343797E-02 | 0.000000E+00 | 0.000000E+00 |
| L3A2 | 5.124234E-02 | 0.000000E+00 | 0.000000E+00 |
| L4A1 | -9.618469E-02 | 2.274924E-02 | 0.000000E+00 |
| L4A2 | -5.750189E-02 | -6.590913E-03 | 0.000000E+00 |
| L5A1 | 2.871561E-02 | -1.086803E-02 | 0.000000E+00 |
| L5A2 | 2.344737E-01 | -5.515579E-02 | 0.000000E+00 |
| L6A1 | 7.886828E-01 | -2.826754E-01 | 4.198693E-02 |
| L6A2 | -1.213038E-02 | 9.065523E-04 | 5.242795E-05 |

FIG. 17 (Conti)

| Embodiment 4 ||||||||
|---|---|---|---|---|---|---|---|
| EFL = 1.398 mm ; HFOV = 75.165 degrees ; TTL = 6.534 mm ||||||||
| Fno = 2.200 ; Image Height = 2.328 mm ||||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 1.272 | 0.160 | 1.545 | 55.987 | -1.751 | Plastic |
| L1A2 | | 0.522 | 0.755 | | | | |
| L2A1 | 2nd lens element | -10.068 | 0.408 | 1.642 | 22.409 | 9.029 | Plastic |
| L2A2 | | -3.754 | 0.355 | | | | |
| STO | Aperture stop | INFINITY | -0.029 | | | | |
| L3A1 | 3rd lens element | 4.114 | 0.827 | 1.535 | 55.635 | 2.126 | Plastic |
| L3A2 | | -1.465 | 0.063 | | | | |
| L4A1 | 4th lens element | 17.140 | 0.381 | 1.642 | 22.409 | -2.490 | Plastic |
| L4A2 | | 1.459 | 0.128 | | | | |
| L5A1 | 5th lens element | 2.829 | 1.251 | 1.535 | 55.635 | 1.105 | Plastic |
| L5A2 | | -0.633 | 0.102 | | | | |
| L6A1 | 6th lens element | -1.924 | 0.502 | 1.545 | 55.987 | -1.618 | Plastic |
| L6A2 | | 1.782 | 0.498 | | | | |
| TFA1 | Filtering unit | INFINITY | 0.210 | 1.517 | 64.167 | | |
| TFA2 | | INFINITY | 0.924 | | | | |
| IMA | Image plane | INFINITY | | | | | |

FIG. 20

| Embodiment 4 | | | |
|---|---|---|---|
| Aspherical Parameters | | | |
| Surface# | K | a2 | a4 |
| L1A1 | -1.089600E+01 | 0.000000E+00 | 9.967267E-03 |
| L1A2 | -2.953775E+00 | 0.000000E+00 | 1.142430E+00 |
| L2A1 | 0.000000E+00 | 0.000000E+00 | 4.360047E-01 |
| L2A2 | 0.000000E+00 | 0.000000E+00 | 5.005075E-01 |
| L3A1 | 2.505779E+00 | 0.000000E+00 | 1.457276E-01 |
| L3A2 | 1.603992E+00 | 0.000000E+00 | -4.712781E-01 |
| L4A1 | 0.000000E+00 | 0.000000E+00 | -1.009805E+00 |
| L4A2 | 5.566116E-01 | 0.000000E+00 | -5.853547E-01 |
| L5A1 | 5.171744E-01 | 0.000000E+00 | -2.871272E-02 |
| L5A2 | -4.159197E+00 | 0.000000E+00 | -3.326858E-02 |
| L6A1 | -5.291671E+01 | 0.000000E+00 | 5.147533E-01 |
| L6A2 | -4.825122E-01 | 0.000000E+00 | -1.394129E-01 |
| Surface# | a6 | a8 | a10 |
| L1A1 | -1.896382E-01 | 1.943334E-01 | -9.469686E-02 |
| L1A2 | -1.321921E+00 | 1.204554E+00 | -4.678667E-02 |
| L2A1 | -7.011453E-02 | -3.178043E-02 | 4.189684E-01 |
| L2A2 | -5.484578E-01 | 1.440942E+00 | -2.420806E+00 |
| L3A1 | 6.760307E-02 | -2.571392E+00 | 6.759114E+00 |
| L3A2 | 1.350077E+00 | -2.120816E+00 | 1.452156E+00 |
| L4A1 | 1.687175E+00 | -2.144947E+00 | 2.538900E+00 |
| L4A2 | 5.779802E-01 | -2.486507E-01 | -1.491515E+00 |
| L5A1 | -8.188804E-02 | 1.384857E-01 | -8.615817E-02 |
| L5A2 | -2.517358E-01 | 5.220812E-01 | -5.231193E-01 |
| L6A1 | -1.219478E+00 | 1.703985E+00 | -1.506924E+00 |
| L6A2 | 1.468953E-01 | -1.129932E-01 | 5.494498E-02 |

FIG. 21

| Embodiment 4 |||
| Aspherical Parameters |||
| Surface# | a12 | a14 | a16 |
|---|---|---|---|
| L1A1 | 2.375151E-02 | -2.465852E-03 | 0.000000E+00 |
| L1A2 | -3.580384E-01 | 0.000000E+00 | 0.000000E+00 |
| L2A1 | -4.542966E-01 | 0.000000E+00 | 0.000000E+00 |
| L2A2 | 1.193716E+00 | 0.000000E+00 | 0.000000E+00 |
| L3A1 | -8.998302E+00 | 0.000000E+00 | 0.000000E+00 |
| L3A2 | -5.443112E-01 | 0.000000E+00 | 0.000000E+00 |
| L4A1 | -3.850804E+00 | 2.807192E+00 | 0.000000E+00 |
| L4A2 | 1.790349E-01 | -5.951902E-02 | 0.000000E+00 |
| L5A1 | 2.722457E-02 | -4.063808E-03 | 0.000000E+00 |
| L5A2 | 2.577252E-01 | -4.823071E-02 | 0.000000E+00 |
| L6A1 | 8.071349E-01 | -2.359667E-01 | 2.846100E-02 |
| L6A2 | -1.239300E-02 | -4.474258E-04 | 4.431001E-04 |

FIG. 21 (Conti)

| Embodiment 5 |||||||
|---|---|---|---|---|---|---|
| EFL = 2.081 mm ; HFOV = 62.919 degrees ; TTL = 5.476 mm |||||||
| Fno = 2.200 ; Image Height = 2.328 mm |||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 1.072 | 0.264 | 1.545 | 55.987 | -6.300 | Plastic |
| L1A2 | | 0.746 | 0.851 | | | | |
| L2A1 | 2nd lens element | -3.465 | 0.750 | 1.642 | 22.409 | 28.462 | Plastic |
| L2A2 | | -3.164 | 0.147 | | | | |
| STO | Aperture stop | INFINITY | -0.081 | | | | |
| L3A1 | 3rd lens element | 1.967 | 0.491 | 1.535 | 55.635 | 2.189 | Plastic |
| L3A2 | | -2.651 | 0.013 | | | | |
| L4A1 | 4th lens element | 9.696 | 0.530 | 1.642 | 22.409 | -2.646 | Plastic |
| L4A2 | | 1.423 | 0.035 | | | | |
| L5A1 | 5th lens element | 2.375 | 0.863 | 1.535 | 55.635 | 1.337 | Plastic |
| L5A2 | | -0.896 | 0.312 | | | | |
| L6A1 | 6th lens element | -1.866 | 0.344 | 1.545 | 55.987 | -1.508 | Plastic |
| L6A2 | | 1.568 | 0.498 | | | | |
| TFA1 | Filtering unit | INFINITY | 0.210 | 1.517 | 64.167 | | |
| TFA2 | | INFINITY | 0.251 | | | | |
| IMA | Image plane | INFINITY | | | | | |

FIG. 24

| Embodiment 5 | | | |
|---|---|---|---|
| Aspherical Parameters | | | |
| Surface# | K | a2 | a4 |
| L1A1 | -1.219056E+00 | 0.000000E+00 | -1.256377E-01 |
| L1A2 | -1.681762E+00 | 0.000000E+00 | 4.845325E-02 |
| L2A1 | 0.000000E+00 | 0.000000E+00 | -1.431808E-02 |
| L2A2 | 0.000000E+00 | 0.000000E+00 | 4.492214E-02 |
| L3A1 | 2.291605E+00 | 0.000000E+00 | -2.815044E-02 |
| L3A2 | 8.869052E+00 | 0.000000E+00 | -2.099230E-01 |
| L4A1 | 0.000000E+00 | 0.000000E+00 | -4.342202E-01 |
| L4A2 | 5.976831E-01 | 0.000000E+00 | -3.431893E-01 |
| L5A1 | 2.108808E+00 | 0.000000E+00 | -4.932415E-02 |
| L5A2 | -2.790225E+00 | 0.000000E+00 | 1.390117E-01 |
| L6A1 | 2.441443E+00 | 0.000000E+00 | 3.761879E-01 |
| L6A2 | -1.225338E+00 | 0.000000E+00 | -2.640345E-01 |
| Surface# | a6 | a8 | a10 |
| L1A1 | -1.404356E-01 | 1.810313E-01 | -1.019431E-01 |
| L1A2 | -3.612015E-01 | 5.051992E-01 | -3.931596E-01 |
| L2A1 | 2.555703E-02 | -1.080349E-01 | 1.567012E-01 |
| L2A2 | -1.935908E-01 | 4.594453E-01 | -3.053476E-01 |
| L3A1 | -1.901149E-01 | -5.136388E-01 | 1.810764E+00 |
| L3A2 | 4.486306E-01 | -7.129153E-01 | 8.420938E-02 |
| L4A1 | 7.252267E-01 | -9.336467E-01 | 2.549432E-02 |
| L4A2 | 2.958629E-01 | -2.149309E-01 | 1.490310E-02 |
| L5A1 | 1.803177E-02 | 1.106490E-01 | -1.443294E-01 |
| L5A2 | -3.970056E-01 | 6.121179E-01 | -5.630095E-01 |
| L6A1 | -1.011117E+00 | 1.479285E+00 | -1.461509E+00 |
| L6A2 | 1.803054E-01 | -1.011375E-01 | 3.968091E-02 |

FIG. 25

| Embodiment 5 |||
|---|---|---|---|
| Aspherical Parameters ||||
| Surface# | a12 | a14 | a16 |
| L1A1 | 2.997939E-02 | -3.580531E-03 | 0.000000E+00 |
| L1A2 | 1.248184E-01 | 0.000000E+00 | 0.000000E+00 |
| L2A1 | -6.269140E-02 | 0.000000E+00 | 0.000000E+00 |
| L2A2 | 7.161262E-02 | 0.000000E+00 | 0.000000E+00 |
| L3A1 | -2.680866E+00 | 0.000000E+00 | 0.000000E+00 |
| L3A2 | 2.656201E-01 | 0.000000E+00 | 0.000000E+00 |
| L4A1 | 1.322838E+00 | -8.891658E-01 | 0.000000E+00 |
| L4A2 | 8.161395E-02 | -6.878581E-02 | 0.000000E+00 |
| L5A1 | 4.646286E-02 | 3.533891E-03 | 0.000000E+00 |
| L5A2 | 2.631516E-01 | -5.339435E-02 | 0.000000E+00 |
| L6A1 | 8.430784E-01 | -2.266016E-01 | -2.517392E-02 |
| L6A2 | -9.673451E-03 | 1.295802E-03 | -6.731138E-05 |

FIG. 25 (Conti)

| Embodiment 6 ||||||||
| --- | --- | --- | --- | --- | --- | --- | --- |
| EFL = 1.157 mm ; HFOV = 53.826 degrees ; TTL = 4.564 mm ||||||||
| Fno = 2.000 ; Image Height = 1.178 mm ||||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 2.671 | 0.200 | 1.545 | 55.987 | -1.913 | Plastic |
| L1A2 | | 0.729 | 0.571 | | | | |
| L2A1 | 2nd lens element | -1.872 | 0.622 | 1.545 | 55.987 | 8.659 | Plastic |
| L2A2 | | -1.496 | 0.075 | | | | |
| STO | Aperture stop | INFINITY | 0.023 | | | | |
| L3A1 | 3rd lens element | 1.677 | 0.644 | 1.545 | 55.987 | 1.436 | Plastic |
| L3A2 | | -1.261 | 0.068 | | | | |
| L4A1 | 4th lens element | 2.932 | 0.262 | 1.640 | 23.529 | -1.932 | Plastic |
| L4A2 | | 0.837 | 0.052 | | | | |
| L5A1 | 5th lens element | 2.124 | 0.673 | 1.545 | 55.987 | 1.226 | Plastic |
| L5A2 | | -0.863 | 0.158 | | | | |
| L6A1 | 6th lens element | -64.174 | 0.200 | 1.642 | 22.409 | -1.907 | Plastic |
| L6A2 | | 1.245 | 0.162 | | | | |
| TF2A1 | 2nd Filtering unit | INFINITY | 0.210 | 1.517 | 64.167 | | |
| TF2A2 | | INFINITY | 0.215 | | | | |
| TFA1 | Filtering unit | INFINITY | 0.400 | 1.517 | 64.167 | | |
| TFA2 | | INFINITY | 0.030 | | | | |
| IMA | Image plane | INFINITY | | | | | |

FIG. 28

| Embodiment 6 |||
| Aspherical Parameters |||
| Surface# | K | a2 | a4 |
|---|---|---|---|
| L1A1 | 0.000000E+00 | 0.000000E+00 | 3.688331E-01 |
| L1A2 | 0.000000E+00 | 0.000000E+00 | 5.399559E-01 |
| L2A1 | 0.000000E+00 | 0.000000E+00 | 1.447540E-01 |
| L2A2 | 0.000000E+00 | 0.000000E+00 | 6.582362E-01 |
| L3A1 | 0.000000E+00 | 0.000000E+00 | 6.534451E-01 |
| L3A2 | 6.087151E-02 | 0.000000E+00 | 3.913701E-01 |
| L4A1 | 0.000000E+00 | 0.000000E+00 | -6.947423E-01 |
| L4A2 | 0.000000E+00 | 0.000000E+00 | -7.860180E-01 |
| L5A1 | 0.000000E+00 | 0.000000E+00 | 7.246281E-01 |
| L5A2 | 0.000000E+00 | 0.000000E+00 | 1.364142E+00 |
| L6A1 | 0.000000E+00 | 0.000000E+00 | 4.119339E-01 |
| L6A2 | 0.000000E+00 | 0.000000E+00 | -5.344523E-01 |
| Surface# | a6 | a8 | a10 |
| L1A1 | -8.411560E-01 | 7.439359E-01 | -3.508324E-01 |
| L1A2 | 2.786102E-01 | -6.729803E+00 | 1.599199E+01 |
| L2A1 | -3.155916E-01 | -6.421252E-01 | 1.399962E+00 |
| L2A2 | -2.996631E+00 | 6.716787E+00 | -5.241655E+00 |
| L3A1 | -3.119735E+00 | 7.639554E+00 | -9.743863E+00 |
| L3A2 | -1.892797E+00 | 5.324657E+00 | -8.582254E+00 |
| L4A1 | -1.934075E-01 | 2.358533E+00 | -2.775932E+00 |
| L4A2 | 1.627559E-01 | 2.061132E+00 | -6.290364E+00 |
| L5A1 | -2.236837E+00 | 4.864885E+00 | -7.054933E+00 |
| L5A2 | -4.272143E+00 | 1.035718E+01 | -1.532619E+01 |
| L6A1 | -5.684978E+00 | 1.351635E+01 | -2.080480E+01 |
| L6A2 | -1.270983E+00 | 3.800925E+00 | -4.724005E+00 |

FIG. 29

| \multicolumn{4}{c}{Embodiment 6} |
| --- | --- | --- | --- |
| \multicolumn{4}{c}{Aspherical Parameters} |
| Surface# | a12 | a14 | a16 |
| L1A1 | 7.336010E-02 | 0.000000E+00 | 0.000000E+00 |
| L1A2 | -2.034037E+01 | 0.000000E+00 | 0.000000E+00 |
| L2A1 | 0.000000E+00 | 0.000000E+00 | 0.000000E+00 |
| L2A2 | 0.000000E+00 | 0.000000E+00 | 0.000000E+00 |
| L3A1 | 6.036026E+00 | 0.000000E+00 | 0.000000E+00 |
| L3A2 | 8.161418E+00 | 0.000000E+00 | 0.000000E+00 |
| L4A1 | 1.457349E+00 | 0.000000E+00 | 0.000000E+00 |
| L4A2 | 8.047072E+00 | -5.691318E+00 | 0.000000E+00 |
| L5A1 | 6.330932E+00 | -2.689127E+00 | 0.000000E+00 |
| L5A2 | 1.184049E+01 | -2.263349E+00 | 0.000000E+00 |
| L6A1 | 1.660945E+01 | -3.635275E+00 | 0.000000E+00 |
| L6A2 | 2.861184E+00 | -6.139236E-01 | 0.000000E+00 |

FIG. 29 (Conti)

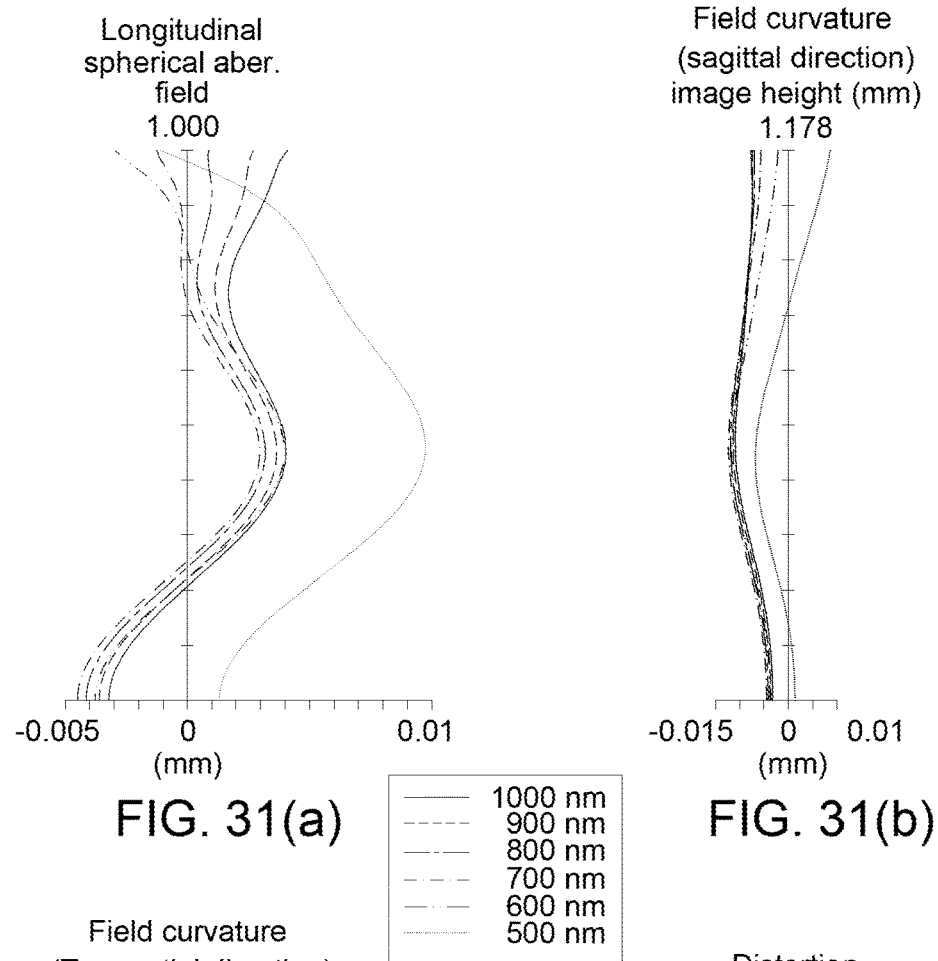
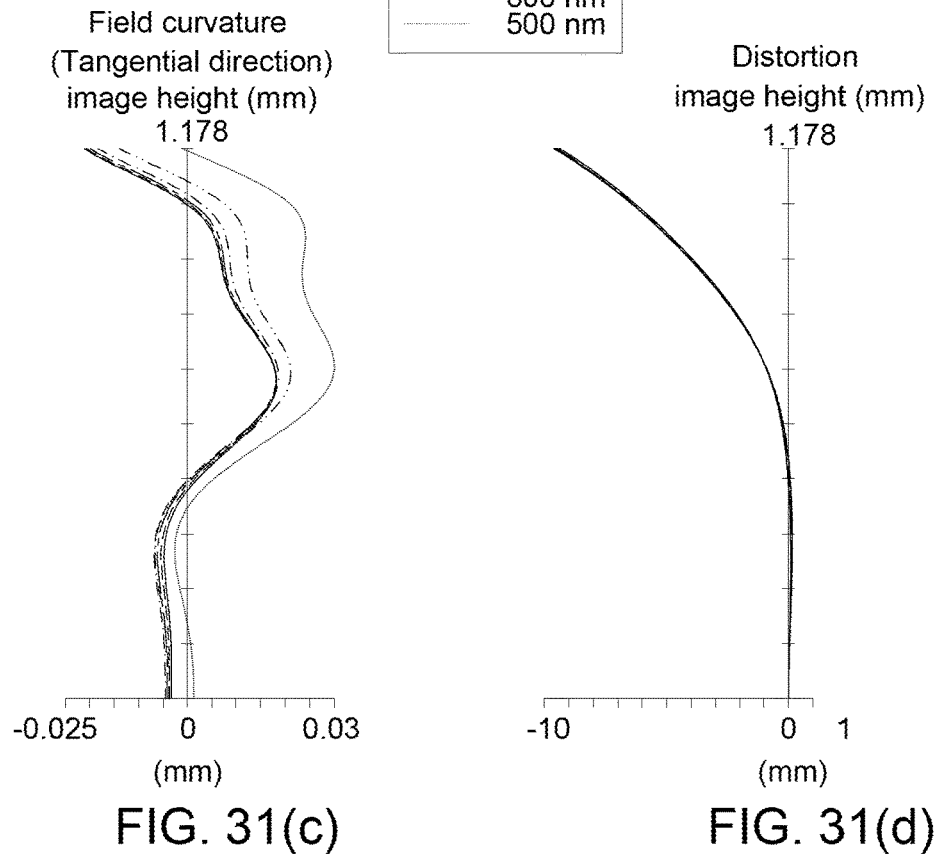
FIG. 31(a) FIG. 31(b) FIG. 31(c) FIG. 31(d)

| Embodiment 7 ||||||||
|---|---|---|---|---|---|---|---|
| EFL = 1.424 mm ; HFOV = 42.332 degrees ; TTL = 4.547 mm ||||||||
| Fno = 2.000 ; Image Height = 1.178 mm ||||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 2.265 | 0.240 | 1.545 | 55.987 | -2.184 | Plastic |
| L1A2 | | 0.750 | 0.473 | | | | |
| L2A1 | 2nd lens element | -4.604 | 0.450 | 1.535 | 55.994 | 9.620 | Plastic |
| L2A2 | | -2.511 | 0.049 | | | | |
| STO | Aperture stop | INFINITY | 0.058 | | | | |
| L3A1 | 3rd lens element | 2.824 | 0.574 | 1.545 | 55.987 | 1.422 | Plastic |
| L3A2 | | -0.987 | 0.029 | | | | |
| L4A1 | 4th lens element | 2.188 | 0.381 | 1.661 | 20.373 | -2.374 | Plastic |
| L4A2 | | 0.849 | 0.128 | | | | |
| L5A1 | 5th lens element | 4.853 | 0.651 | 1.545 | 55.987 | 1.414 | Plastic |
| L5A2 | | -0.870 | 0.174 | | | | |
| L6A1 | 6th lens element | -10.138 | 0.340 | 1.642 | 22.409 | -2.127 | Plastic |
| L6A2 | | 1.593 | 0.173 | | | | |
| TF2A1 | 2nd Filtering unit | INFINITY | 0.210 | 1.517 | 64.167 | | |
| TF2A2 | | INFINITY | 0.200 | | | | |
| TFA1 | Filtering unit | INFINITY | 0.400 | 1.517 | 64.167 | | |
| TFA2 | | INFINITY | 0.017 | | | | |
| IMA | Image plane | INFINITY | | | | | |

FIG. 32

| Embodiment 7 | | | |
|---|---|---|---|
| Aspherical Parameters | | | |
| Surface# | K | a2 | a4 |
| L1A1 | 0.000000E+00 | 0.000000E+00 | 1.808383E-01 |
| L1A2 | 0.000000E+00 | 0.000000E+00 | 2.389424E-01 |
| L2A1 | 0.000000E+00 | 0.000000E+00 | -1.614838E-02 |
| L2A2 | 0.000000E+00 | 0.000000E+00 | 5.926828E-01 |
| L3A1 | 0.000000E+00 | 0.000000E+00 | 7.673243E-01 |
| L3A2 | -2.800109E-01 | 0.000000E+00 | 4.957708E-01 |
| L4A1 | 0.000000E+00 | 0.000000E+00 | -4.657082E-01 |
| L4A2 | 0.000000E+00 | 0.000000E+00 | -8.274914E-01 |
| L5A1 | 0.000000E+00 | 0.000000E+00 | 6.444893E-01 |
| L5A2 | 0.000000E+00 | 0.000000E+00 | 1.335828E+00 |
| L6A1 | 0.000000E+00 | 0.000000E+00 | 7.639673E-01 |
| L6A2 | 0.000000E+00 | 0.000000E+00 | -3.814905E-02 |
| Surface# | a6 | a8 | a10 |
| L1A1 | -6.212718E-01 | 7.009159E-01 | -3.870608E-01 |
| L1A2 | -1.548996E-01 | -6.728546E+00 | 1.907110E+01 |
| L2A1 | -8.109191E-01 | -3.816323E-01 | 1.477739E+00 |
| L2A2 | -3.183084E+00 | 5.810441E+00 | -1.949148E+00 |
| L3A1 | -3.376905E+00 | 7.414525E+00 | -8.723013E+00 |
| L3A2 | -1.738254E+00 | 4.825780E+00 | -8.971814E+00 |
| L4A1 | -2.255641E-01 | 2.037547E+00 | -3.396280E+00 |
| L4A2 | 1.568030E-01 | 2.105903E+00 | -6.370120E+00 |
| L5A1 | -2.105458E+00 | 4.882653E+00 | -6.742797E+00 |
| L5A2 | -4.075217E+00 | 1.048866E+01 | -1.517908E+01 |
| L6A1 | -5.536837E+00 | 1.360308E+01 | -1.989665E+01 |
| L6A2 | -1.673291E+00 | 3.919858E+00 | -4.493353E+00 |

FIG. 33

| Embodiment 7 | | | |
|---|---|---|---|
| Aspherical Parameters | | | |
| Surface# | a12 | a14 | a16 |
| L1A1 | 6.453026E-02 | 0.000000E+00 | 0.000000E+00 |
| L1A2 | -2.477260E+01 | 0.000000E+00 | 0.000000E+00 |
| L2A1 | 0.000000E+00 | 0.000000E+00 | 0.000000E+00 |
| L2A2 | 0.000000E+00 | 0.000000E+00 | 0.000000E+00 |
| L3A1 | 5.538836E+00 | 0.000000E+00 | 0.000000E+00 |
| L3A2 | 8.080121E+00 | 0.000000E+00 | 0.000000E+00 |
| L4A1 | 1.883252E+00 | 0.000000E+00 | 0.000000E+00 |
| L4A2 | 8.246553E+00 | -5.965261E+00 | 0.000000E+00 |
| L5A1 | 6.355808E+00 | -3.313230E+00 | 0.000000E+00 |
| L5A2 | 1.170503E+01 | -2.481583E+00 | 0.000000E+00 |
| L6A1 | 1.685797E+01 | -6.527620E+00 | 0.000000E+00 |
| L6A2 | 2.637512E+00 | -6.366913E-01 | 0.000000E+00 |

FIG. 33 (Conti)

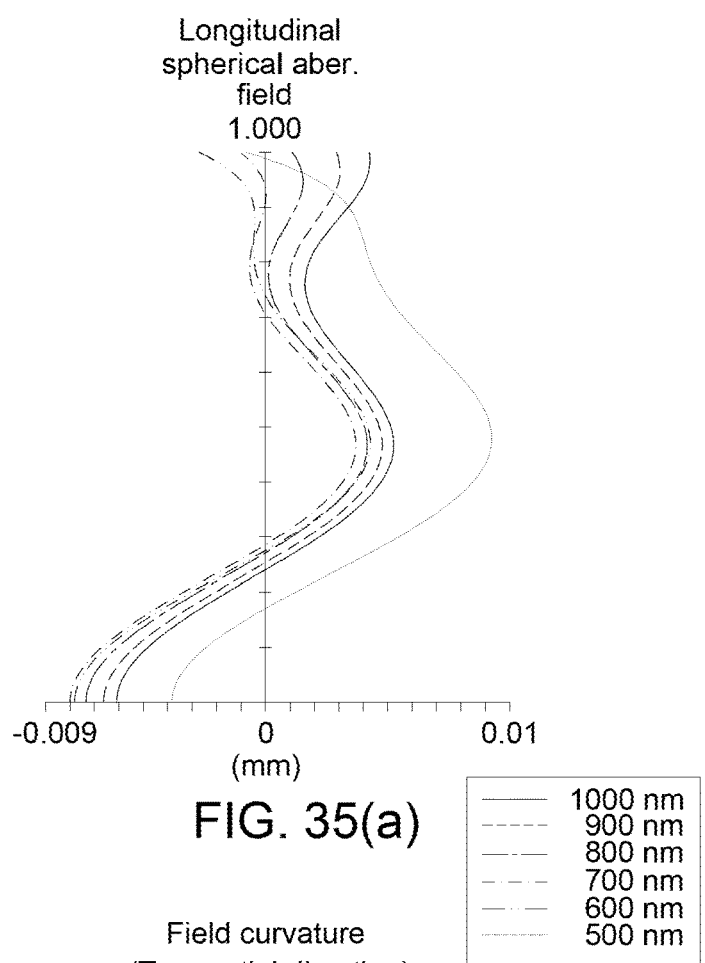
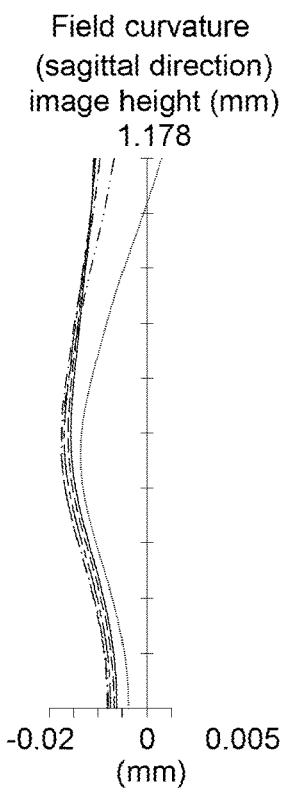
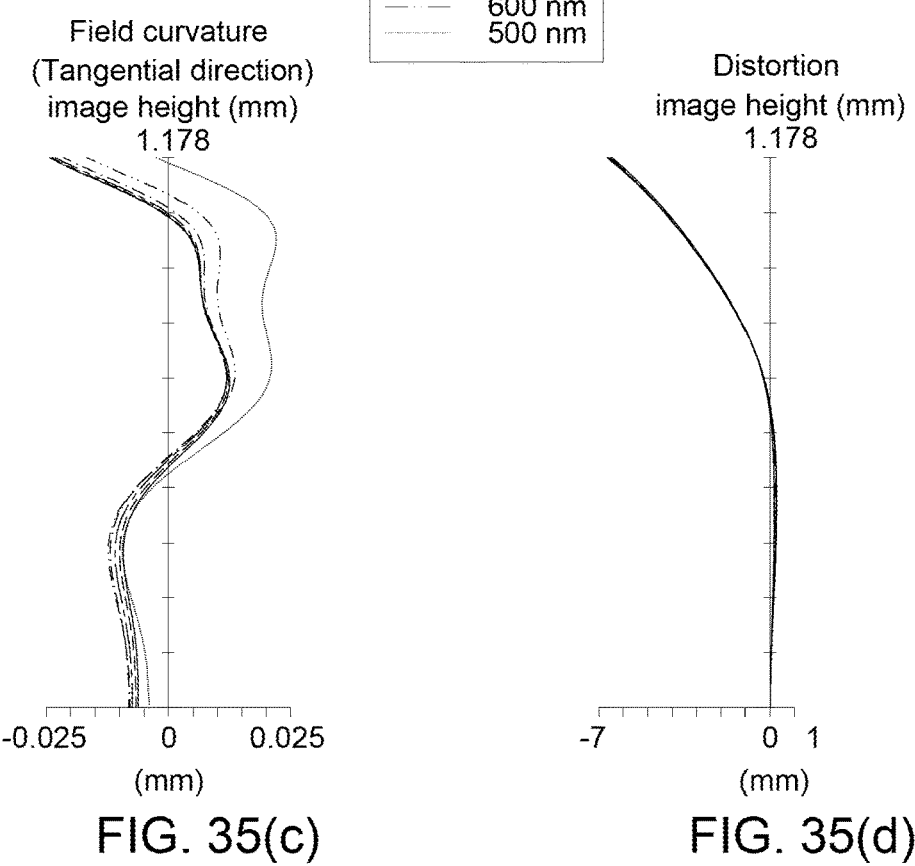
FIG. 35(a)
FIG. 35(b)
FIG. 35(c)
FIG. 35(d)

| Embodiment 8 ||||||||
| :---: | :---: | :---: | :---: | :---: | :---: | :---: | :---: |
| EFL = 1.453 mm ; HFOV = 40.803 degrees ; TTL = 4.477 mm ||||||||
| Fno = 2.000 ; Image Height = 1.178 mm ||||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 2.049 | 0.240 | 1.545 | 55.987 | -2.241 | Plastic |
| L1A2 | | 0.732 | 0.484 | | | | |
| L2A1 | 2nd lens element | -4.043 | 0.395 | 1.535 | 55.994 | 8.766 | Plastic |
| L2A2 | | -2.243 | 0.059 | | | | |
| STO | Aperture stop | INFINITY | 0.058 | | | | |
| L3A1 | 3rd lens element | 2.574 | 0.557 | 1.545 | 55.987 | 1.456 | Plastic |
| L3A2 | | -1.055 | 0.029 | | | | |
| L4A1 | 4th lens element | 2.201 | 0.413 | 1.661 | 20.373 | -2.353 | Plastic |
| L4A2 | | 0.842 | 0.135 | | | | |
| L5A1 | 5th lens element | 4.344 | 0.637 | 1.545 | 55.987 | 1.378 | Plastic |
| L5A2 | | -0.858 | 0.170 | | | | |
| L6A1 | 6th lens element | -11.652 | 0.300 | 1.642 | 22.409 | -2.130 | Plastic |
| L6A2 | | 1.559 | 0.173 | | | | |
| TF2A1 | 2nd Filtering unit | INFINITY | 0.210 | 1.517 | 64.167 | | |
| TF2A2 | | INFINITY | 0.200 | | | | |
| TFA1 | Filtering unit | INFINITY | 0.400 | 1.517 | 64.167 | | |
| TFA2 | | INFINITY | 0.017 | | | | |
| IMA | Image plane | INFINITY | | | | | |

FIG. 36

| Embodiment 8 | | |
|---|---|---|
| Aspherical Parameters | | |
| Surface# | K | a2 | a4 |
| L1A1 | 0.000000E+00 | 0.000000E+00 | 1.796101E-01 |
| L1A2 | 0.000000E+00 | 0.000000E+00 | 2.566139E-01 |
| L2A1 | 0.000000E+00 | 0.000000E+00 | 3.903185E-04 |
| L2A2 | 0.000000E+00 | 0.000000E+00 | 5.851285E-01 |
| L3A1 | 0.000000E+00 | 0.000000E+00 | 7.729942E-01 |
| L3A2 | -1.962751E-01 | 0.000000E+00 | 4.715200E-01 |
| L4A1 | 0.000000E+00 | 0.000000E+00 | -4.611091E-01 |
| L4A2 | 0.000000E+00 | 0.000000E+00 | -8.375065E-01 |
| L5A1 | 0.000000E+00 | 0.000000E+00 | 6.063631E-01 |
| L5A2 | 0.000000E+00 | 0.000000E+00 | 1.367402E+00 |
| L6A1 | 0.000000E+00 | 0.000000E+00 | 6.835864E-01 |
| L6A2 | 0.000000E+00 | 0.000000E+00 | -1.537726E-01 |
| Surface# | a6 | a8 | a10 |
| L1A1 | -6.221494E-01 | 6.727114E-01 | -3.764485E-01 |
| L1A2 | -2.754129E-01 | -6.377220E+00 | 1.872424E+01 |
| L2A1 | -8.742338E-01 | -6.511602E-01 | 1.846278E+00 |
| L2A2 | -3.447325E+00 | 6.335547E+00 | -2.669763E+00 |
| L3A1 | -3.355689E+00 | 7.329405E+00 | -8.879870E+00 |
| L3A2 | -1.733339E+00 | 4.761777E+00 | -8.928275E+00 |
| L4A1 | -2.962884E-01 | 2.046484E+00 | -3.391318E+00 |
| L4A2 | 1.283192E-01 | 2.101665E+00 | -6.371738E+00 |
| L5A1 | -2.056448E+00 | 4.879174E+00 | -6.761931E+00 |
| L5A2 | -4.099179E+00 | 1.050814E+01 | -1.510988E+01 |
| L6A1 | -5.586410E+00 | 1.354432E+01 | -1.964381E+01 |
| L6A2 | -1.577827E+00 | 3.914115E+00 | -4.521372E+00 |

FIG. 37

| Embodiment 8 | | | |
|---|---|---|---|
| Aspherical Parameters | | | |
| Surface# | a12 | a14 | a16 |
| L1A1 | 5.484040E-02 | 0.000000E+00 | 0.000000E+00 |
| L1A2 | -2.739086E+01 | 0.000000E+00 | 0.000000E+00 |
| L2A1 | 0.000000E+00 | 0.000000E+00 | 0.000000E+00 |
| L2A2 | 0.000000E+00 | 0.000000E+00 | 0.000000E+00 |
| L3A1 | 5.822119E+00 | 0.000000E+00 | 0.000000E+00 |
| L3A2 | 8.163790E+00 | 0.000000E+00 | 0.000000E+00 |
| L4A1 | 2.010104E+00 | 0.000000E+00 | 0.000000E+00 |
| L4A2 | 8.214252E+00 | -6.069682E+00 | 0.000000E+00 |
| L5A1 | 6.361451E+00 | -3.297698E+00 | 0.000000E+00 |
| L5A2 | 1.179407E+01 | -2.415207E+00 | 0.000000E+00 |
| L6A1 | 1.714555E+01 | -7.173735E+00 | 0.000000E+00 |
| L6A2 | 2.652624E+00 | -6.416514E-01 | 0.000000E+00 |

FIG. 37 (Conti)

| Embodiment 9 | | | | | | | |
|---|---|---|---|---|---|---|---|
| EFL = 1.415 mm ; HFOV = 42.274 degrees ; TTL = 4.486 mm | | | | | | | |
| Fno = 2.000 ; Image Height = 1.178 mm | | | | | | | |
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 2.214 | 0.240 | 1.545 | 55.987 | -2.178 | Plastic |
| L1A2 | | 0.742 | 0.476 | | | | |
| L2A1 | 2nd lens element | -4.038 | 0.437 | 1.544 | 49.922 | 8.590 | Plastic |
| L2A2 | | -2.248 | 0.062 | | | | |
| STO | Aperture stop | INFINITY | 0.060 | | | | |
| L3A1 | 3rd lens element | 2.536 | 0.561 | 1.545 | 55.987 | 1.480 | Plastic |
| L3A2 | | -1.086 | 0.029 | | | | |
| L4A1 | 4th lens element | 2.046 | 0.382 | 1.661 | 20.373 | -2.463 | Plastic |
| L4A2 | | 0.838 | 0.120 | | | | |
| L5A1 | 5th lens element | 3.791 | 0.657 | 1.545 | 55.987 | 1.356 | Plastic |
| L5A2 | | -0.859 | 0.170 | | | | |
| L6A1 | 6th lens element | -11.496 | 0.294 | 1.642 | 22.409 | -1.987 | Plastic |
| L6A2 | | 1.444 | 0.172 | | | | |
| TF2A1 | 2nd Filtering unit | INFINITY | 0.210 | 1.517 | 64.167 | | |
| TF2A2 | | INFINITY | 0.200 | | | | |
| TFA1 | Filtering unit | INFINITY | 0.400 | 1.517 | 64.167 | | |
| TFA2 | | INFINITY | 0.018 | | | | |
| IMA | Image plane | INFINITY | | | | | |

FIG. 40

| Embodiment 9 ||||
|---|---|---|---|
| Aspherical Parameters ||||
| Surface# | K | a2 | a4 |
| L1A1 | 0.000000E+00 | 0.000000E+00 | 1.718000E-01 |
| L1A2 | 0.000000E+00 | 0.000000E+00 | 2.467427E-01 |
| L2A1 | 0.000000E+00 | 0.000000E+00 | 5.044651E-02 |
| L2A2 | 0.000000E+00 | 0.000000E+00 | 6.241597E-01 |
| L3A1 | 0.000000E+00 | 0.000000E+00 | 7.746038E-01 |
| L3A2 | -1.504471E-01 | 0.000000E+00 | 4.706675E-01 |
| L4A1 | 0.000000E+00 | 0.000000E+00 | -4.859776E-01 |
| L4A2 | 0.000000E+00 | 0.000000E+00 | -8.464556E-01 |
| L5A1 | 0.000000E+00 | 0.000000E+00 | 6.056029E-01 |
| L5A2 | 0.000000E+00 | 0.000000E+00 | 1.371827E+00 |
| L6A1 | 0.000000E+00 | 0.000000E+00 | 6.461929E-01 |
| L6A2 | 0.000000E+00 | 0.000000E+00 | -2.197167E-01 |
| Surface# | a6 | a8 | a10 |
| L1A1 | -6.212213E-01 | 6.854169E-01 | -3.718416E-01 |
| L1A2 | -1.880751E-01 | -6.583217E+00 | 1.845974E+01 |
| L2A1 | -8.594699E-01 | -3.636082E-01 | 1.348277E+00 |
| L2A2 | -3.375597E+00 | 6.318683E+00 | -2.992650E+00 |
| L3A1 | -3.353548E+00 | 7.222549E+00 | -9.003607E+00 |
| L3A2 | -1.788163E+00 | 4.724005E+00 | -8.657842E+00 |
| L4A1 | -2.835736E-01 | 2.055847E+00 | -3.422860E+00 |
| L4A2 | 1.508625E-01 | 2.035506E+00 | -6.337408E+00 |
| L5A1 | -2.043913E+00 | 4.842497E+00 | -6.757841E+00 |
| L5A2 | -4.088886E+00 | 1.047315E+01 | -1.515919E+01 |
| L6A1 | -5.498036E+00 | 1.338048E+01 | -1.949409E+01 |
| L6A2 | -1.471477E+00 | 3.824204E+00 | -4.510245E+00 |

FIG. 41

| Embodiment 9 | | | |
|---|---|---|---|
| Aspherical Parameters | | | |
| Surface# | a12 | a14 | a16 |
| L1A1 | 5.786365E-02 | 0.000000E+00 | 0.000000E+00 |
| L1A2 | -2.494741E+01 | 0.000000E+00 | 0.000000E+00 |
| L2A1 | 0.000000E+00 | 0.000000E+00 | 0.000000E+00 |
| L2A2 | 0.000000E+00 | 0.000000E+00 | 0.000000E+00 |
| L3A1 | 6.150072E+00 | 0.000000E+00 | 0.000000E+00 |
| L3A2 | 7.809824E+00 | 0.000000E+00 | 0.000000E+00 |
| L4A1 | 2.217223E+00 | 0.000000E+00 | 0.000000E+00 |
| L4A2 | 8.386251E+00 | -6.283083E+00 | 0.000000E+00 |
| L5A1 | 6.296665E+00 | -3.250959E+00 | 0.000000E+00 |
| L5A2 | 1.179454E+01 | -2.538664E+00 | 0.000000E+00 |
| L6A1 | 1.706236E+01 | -7.424331E+00 | 0.000000E+00 |
| L6A2 | 2.662899E+00 | -6.398087E-01 | 0.000000E+00 |

FIG. 41 (Conti)

| Embodiment 10 |||||||
|---|---|---|---|---|---|---|
| EFL = 1.397 mm ; HFOV = 44.275 degrees ; TTL = 4.402 mm |||||||
| Fno = 2.000 ; Image Height = 1.178 mm |||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 2.913 | 0.240 | 1.545 | 55.987 | -1.889 | Plastic |
| L1A2 | | 0.737 | 0.485 | | | | |
| L2A1 | 2nd lens element | -3.259 | 0.368 | 1.544 | 49.922 | 5.561 | Plastic |
| L2A2 | | -1.631 | 0.080 | | | | |
| STO | Aperture stop | INFINITY | 0.051 | | | | |
| L3A1 | 3rd lens element | 2.548 | 0.538 | 1.545 | 55.987 | 1.584 | Plastic |
| L3A2 | | -1.203 | 0.029 | | | | |
| L4A1 | 4th lens element | 1.897 | 0.346 | 1.661 | 20.373 | -2.574 | Plastic |
| L4A2 | | 0.831 | 0.109 | | | | |
| L5A1 | 5th lens element | 3.175 | 0.662 | 1.545 | 55.987 | 1.304 | Plastic |
| L5A2 | | -0.846 | 0.159 | | | | |
| L6A1 | 6th lens element | -11.652 | 0.241 | 1.642 | 22.409 | -1.910 | Plastic |
| L6A2 | | 1.377 | 0.220 | | | | |
| TF2A1 | 2nd Filtering unit | INFINITY | 0.210 | 1.517 | 64.167 | | |
| TF2A2 | | INFINITY | 0.200 | | | | |
| TFA1 | Filtering unit | INFINITY | 0.400 | 1.517 | 64.167 | | |
| TFA2 | | INFINITY | 0.064 | | | | |
| IMA | Image plane | INFINITY | | | | | |

FIG. 44

| Embodiment 10 |||
|---|---|---|
| Aspherical Parameters |||
| Surface# | K | a2 | a4 |
| L1A1 | 0.000000E+00 | 0.000000E+00 | 1.082425E-01 |
| L1A2 | 0.000000E+00 | 0.000000E+00 | 2.014718E-01 |
| L2A1 | 0.000000E+00 | 0.000000E+00 | 1.079642E-01 |
| L2A2 | 0.000000E+00 | 0.000000E+00 | 6.349702E-01 |
| L3A1 | 0.000000E+00 | 0.000000E+00 | 7.913291E-01 |
| L3A2 | -9.007584E-02 | 0.000000E+00 | 4.846953E-01 |
| L4A1 | 0.000000E+00 | 0.000000E+00 | -5.150435E-01 |
| L4A2 | 0.000000E+00 | 0.000000E+00 | -8.907170E-01 |
| L5A1 | 0.000000E+00 | 0.000000E+00 | 5.954079E-01 |
| L5A2 | 0.000000E+00 | 0.000000E+00 | 1.401075E+00 |
| L6A1 | 0.000000E+00 | 0.000000E+00 | 5.035826E-01 |
| L6A2 | 0.000000E+00 | 0.000000E+00 | -4.219912E-01 |
| Surface# | a6 | a8 | a10 |
| L1A1 | -5.858615E-01 | 6.910745E-01 | -3.949068E-01 |
| L1A2 | -1.770894E-01 | -6.460640E+00 | 1.763661E+01 |
| L2A1 | -8.209108E-01 | -8.668649E-01 | 1.304440E+00 |
| L2A2 | -3.122743E+00 | 4.929880E+00 | -1.760250E+00 |
| L3A1 | -3.253590E+00 | 6.969960E+00 | -9.159951E+00 |
| L3A2 | -1.850362E+00 | 4.268188E+00 | -7.333098E+00 |
| L4A1 | -2.594586E-01 | 1.776466E+00 | -3.192932E+00 |
| L4A2 | 1.747135E-01 | 1.837478E+00 | -6.180533E+00 |
| L5A1 | -2.062032E+00 | 4.785218E+00 | -6.608443E+00 |
| L5A2 | -4.079675E+00 | 1.043161E+01 | -1.536978E+01 |
| L6A1 | -5.348746E+00 | 1.318420E+01 | -1.925214E+01 |
| L6A2 | -1.122607E+00 | 3.598694E+00 | -4.652922E+00 |

FIG. 45

| Embodiment 10 | | | |
|---|---|---|---|
| Aspherical Parameters | | | |
| Surface# | a12 | a14 | a16 |
| L1A1 | 7.848328E-02 | 0.000000E+00 | 0.000000E+00 |
| L1A2 | -2.496452E+01 | 0.000000E+00 | 0.000000E+00 |
| L2A1 | 0.000000E+00 | 0.000000E+00 | 0.000000E+00 |
| L2A2 | 0.000000E+00 | 0.000000E+00 | 0.000000E+00 |
| L3A1 | 6.392883E+00 | 0.000000E+00 | 0.000000E+00 |
| L3A2 | 6.550021E+00 | 0.000000E+00 | 0.000000E+00 |
| L4A1 | 2.454861E+00 | 0.000000E+00 | 0.000000E+00 |
| L4A2 | 8.498724E+00 | -6.529683E+00 | 0.000000E+00 |
| L5A1 | 6.068662E+00 | -3.048348E+00 | 0.000000E+00 |
| L5A2 | 1.230334E+01 | -2.515843E+00 | 0.000000E+00 |
| L6A1 | 1.617429E+01 | -6.198951E+00 | 0.000000E+00 |
| L6A2 | 2.975399E+00 | -7.584075E-01 | 0.000000E+00 |

FIG. 45 (Conti)

| Embodiment | 1st | 2nd | 3rd | 4th | 5th |
|---|---|---|---|---|---|
| HFOV/(AAG+BFL) | 20.180 | 21.993 | 17.668 | 25.014 | 28.154 |
| G12/(G45+G56) | 2.135 | 1.301 | 3.121 | 3.288 | 2.454 |
| TTL/AAG | 4.492 | 4.389 | 4.455 | 4.758 | 4.290 |
| Fno*ImgH/EFL | 2.008 | 1.915 | 1.863 | 3.664 | 2.461 |
| V2+V4+V5 | 115.576 | 100.452 | 100.452 | 100.452 | 100.452 |
| (T2+T6)/G12 | 1.208 | 1.665 | 1.203 | 1.205 | 1.285 |
| ALT/(G34+T4+G45) | 6.484 | 5.499 | 5.996 | 6.175 | 5.613 |
| (G23+T3+G34)/T4 | 3.177 | 2.740 | 3.197 | 3.190 | 1.075 |
| TTL/(T2+T6) | 5.761 | 5.813 | 5.890 | 7.180 | 5.010 |
| HFOV/(Fno*EFL) | 9.486 | 8.006 | 9.146 | 24.444 | 13.743 |
| V1+V2+V4 | 115.928 | 100.805 | 100.805 | 100.805 | 100.805 |
| (T3+T5)/T1 | 6.374 | 7.742 | 4.075 | 13.021 | 5.128 |
| (ALT+G12)/BFL | 3.193 | 3.334 | 2.648 | 2.626 | 4.270 |
| (G12+T3+T5)/(G23+G56) | 10.524 | 6.017 | 9.434 | 6.631 | 5.828 |
| TL/G12 | 5.431 | 7.722 | 5.305 | 6.490 | 5.311 |
| HFOV/ALT | 16.005 | 16.581 | 16.033 | 21.299 | 19.410 |
| TL/AAG | 3.505 | 3.503 | 3.336 | 3.570 | 3.540 |
| (T1+T4)/(G45+G56) | 1.395 | 1.108 | 2.350 | 2.353 | 2.291 |
| (T2+EFL)/BFL | 2.501 | 3.193 | 2.083 | 1.107 | 2.953 |
| V2+V3+V4 | 115.576 | 100.452 | 100.452 | 100.452 | 100.452 |

FIG. 46A

| Embodiment | 6th | 7th | 8th | 9th | 10th |
|---|---|---|---|---|---|
| HFOV/(AAG+BFL) | 27.417 | 22.158 | 21.092 | 22.062 | 22.062 |
| G12/(G45+G56) | 2.729 | 1.562 | 1.586 | 1.643 | 1.810 |
| TTL/AAG | 4.821 | 4.994 | 4.791 | 4.897 | 4.821 |
| Fno*ImgH/EFL | 2.037 | 1.654 | 1.621 | 1.665 | 1.687 |
| V2+V4+V5 | 135.503 | 132.354 | 132.354 | 126.282 | 126.282 |
| (T2+T6)/G12 | 1.439 | 1.672 | 1.438 | 1.536 | 1.255 |
| ALT/(G34+T4+G45) | 6.810 | 4.894 | 4.405 | 4.847 | 4.949 |
| (G23+T3+G34)/T4 | 3.094 | 1.860 | 1.701 | 1.864 | 2.017 |
| TTL/(T2+T6) | 5.553 | 5.756 | 6.439 | 6.138 | 7.231 |
| HFOV/(Fno*EFL) | 23.266 | 14.864 | 14.041 | 14.936 | 15.848 |
| V1+V2+V4 | 135.503 | 132.354 | 132.354 | 126.282 | 126.282 |
| (T3+T5)/T1 | 6.574 | 5.104 | 4.975 | 5.068 | 5.001 |
| (ALT+G12)/BFL | 3.121 | 3.109 | 3.026 | 3.046 | 2.633 |
| (G12+T3+T5)/(G23+G56) | 7.390 | 6.046 | 5.850 | 5.805 | 5.810 |
| TL/G12 | 6.211 | 7.506 | 7.189 | 7.327 | 6.819 |
| HFOV/ALT | 20.693 | 16.057 | 16.050 | 16.447 | 18.486 |
| TL/AAG | 3.748 | 3.896 | 3.720 | 3.806 | 3.623 |
| (T1+T4)/(G45+G56) | 2.208 | 2.055 | 2.141 | 2.147 | 2.187 |
| (T2+EFL)/BFL | 1.750 | 1.874 | 1.848 | 1.853 | 1.613 |
| V2+V3+V4 | 135.503 | 132.354 | 132.354 | 126.282 | 126.282 |

FIG. 46B

OPTICAL IMAGING LENS

CROSS-REFERENCE TO RELATED APPLICATIONS

This application claims priority to P.R.C. Patent Application No. 202010863979.0 titled "Optical Imaging Lens," filed on Aug. 25, 2020, with the State Intellectual Property Office of the People's Republic of China (SIPO).

TECHNICAL FIELD

The present disclosure relates to an optical imaging lens, and particularly, to an optical imaging lens having at least six lens elements.

BACKGROUND

Recently, optical imaging lenses continue to evolve, and the scope of the application is wider. In addition to requiring the lens to be thin and short, a small F-number (Fno) design is beneficial to increase the luminous flux and a large field of view has gradually become a market trend. Therefore, how to design an optical imaging lens with small F-number and large field of view in addition to pursuing a light, thin and short lens is also the focus of research and development.

SUMMARY

In view of the above-mentioned problems, in addition to the good imaging quality of the optical imaging lens, shortening the length of the lens, decreasing the F-number, and expanding the angle of the field of view are the key points of improvement of the present invention.

The present disclosure provides an optical imaging lens for capturing images and videos such as the optical imaging lens of cell phones, cameras, tablets, and personal digital assistants. By controlling the convex or concave shape of the surfaces of at least six lens elements, the length of the optical imaging lens may be shortened, the F-number may be decreased, and the field of view may be enlarged while maintaining good optical characteristics.

In the specification, parameters used herein may include:

| Parameter | Definition |
|---|---|
| T1 | A thickness of the first lens element along the optical axis |
| G12 | A distance from the image-side surface of the first lens element to the object-side surface of the second lens element along the optical axis, i.e., an air gap between the first lens element and the second lens element along the optical axis |
| T2 | A thickness of the second lens element along the optical axis |
| G23 | A distance from the image-side surface of the second lens element to the object-side surface of the third lens element along the optical axis, i.e., an air gap between the second lens element and the third lens element along the optical axis |
| T3 | A thickness of the third lens element along the optical axis |
| G34 | A distance from the image-side surface of the third lens element to the object-side surface of the fourth lens element along the optical axis, i.e., an air gap between the third lens element and the fourth lens element along the optical axis |
| T4 | A thickness of the fourth lens element along the optical axis |
| G45 | A distance from the image-side surface of the fourth lens element to the object-side surface of the fifth lens element along the optical axis, i.e., an air gap between the fourth lens element and the fifth lens element along the optical axis |
| T5 | A thickness of the fifth lens element along the optical axis |
| G56 | A distance from the image-side surface of the fifth lens element to the object-side surface of the sixth lens element along the optical axis, i.e., an air gap between the fifth lens element and the sixth lens element along the optical axis |
| T6 | A thickness of the sixth lens element along the optical axis |
| G6F | A distance from the image-side surface of the sixth lens element to the object-side surface of the filtering unit along the optical axis |
| TTF | A thickness of the filtering unit along the optical axis |
| GFP | An air gap between the filtering unit and the image plane along the optical axis |
| TTF2 | A thickness of the second filtering unit along the optical axis |
| GFP2 | An air gap between the second filtering unit and the filtering unit |
| f1 | A focal length of the first lens element |
| f2 | A focal length of the second lens element |
| f3 | A focal length of the third lens element |
| f4 | A focal length of the fourth lens element |
| f5 | A focal length of the fifth lens element |
| f6 | A focal length of the sixth lens element |
| n1 | A refractive index of the first lens element |
| n2 | A refractive index of the second lens element |
| n3 | A refractive index of the third lens element |
| n4 | A refractive index of the fourth lens element |
| n5 | A refractive index of the fifth lens element |
| n6 | A refractive index of the sixth lens element |
| V1 | An Abbe number of the first lens element |
| V2 | An Abbe number of the second lens element |
| V3 | An Abbe number of the third lens element |
| V4 | An Abbe number of the fourth lens element |
| V5 | An Abbe number of the fifth lens element |
| V6 | An Abbe number of the sixth lens element |
| HFOV | Half Field of View of the optical imaging lens |
| Fno | F-number of the optical imaging lens |
| EFL | An effective focal length of the optical imaging lens |
| TTL | A distance from the object-side surface of the first lens element to the image plane along the optical axis, i.e., the system length of the optical imaging lens |

| Parameter | Definition |
|---|---|
| ALT | A sum of the thicknesses of the first lens element, the second lens element, the third lens element, the fourth lens element, the fifth lens element, and the sixth lens element along the optical axis, i.e., a sum of six thicknesses from the first lens element to the sixth lens element along the optical axis |
| AAG | A sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis, and a distance from the image-side surface of the fifth lens element to the object-side surface of the sixth lens element along the optical axis, i.e., a sum of five air gaps from the first lens element to the sixth lens element along the optical axis |
| BFL | A back focal length of the optical imaging lens, i.e., a distance from the image-side surface of the sixth lens element to the image plane along the optical axis |
| TL | A distance from the object-side surface of the first lens element to the image-side surface of the sixth lens element along the optical axis |
| ImgH | An image height of the optical imaging lens |

According to one embodiment of the optical imaging lens of the present disclosure, an optical imaging lens may comprise a first lens element, a second lens element, a third lens element, a fourth lens element, a fifth lens element, and a sixth lens element sequentially from an object side to an image side along an optical axis. The first lens element to the sixth lens element may each comprise an object-side surface facing toward the object side and allowing imaging rays to pass through and an image-side surface facing toward the image side and allowing the imaging rays to pass through. The first lens element may have negative refracting power. The optical axis region of the object-side surface of the second lens element may be concave. The periphery region of the image-side surface of the fifth lens element may be convex. The optical axis region of the object-side surface of the sixth lens element may be concave. The optical axis region of the image-side surface of the sixth lens element may be concave. Lens elements included by the optical imaging lens are only the six lens elements described above. The optical imaging lens may satisfy Inequality (1): HFOV/(AAG+BFL)≥16.000 degrees/mm and Inequality (2): G12/(G45+G56)≥1.300.

According to another embodiment of the optical imaging lens of the present disclosure, an optical imaging lens may comprise a first lens element, a second lens element, a third lens element, a fourth lens element, a fifth lens element, and a sixth lens element sequentially from an object side to an image side along an optical axis. The first lens element to the sixth lens element may each comprise an object-side surface facing toward the object side and allowing imaging rays to pass through and an image-side surface facing toward the image side and allowing the imaging rays to pass through. The first lens element may have negative refracting power. The optical axis region of the object-side surface of the first lens element may be convex. The optical axis region of the object-side surface of the second lens element may be concave. The optical axis region of the object-side surface of the fourth lens element may be convex. The periphery region of the image-side surface of the fourth lens element may be concave. The optical axis region of the object-side surface of the fifth lens element may be convex. The optical axis region of the image-side surface of the sixth lens element may be concave. Lens elements included by the optical imaging lens are only the six lens elements described above. The optical imaging lens may satisfy Inequality (1): HFOV/(AAG+BFL)≥16.000 degrees/mm and Inequality (2): G12/(G45+G56)≥1.300.

According to another embodiment of the optical imaging lens of the present disclosure, an optical imaging lens may comprise a first lens element, a second lens element, a third lens element, a fourth lens element, a fifth lens element, and a sixth lens element sequentially from an object side to an image side along an optical axis. The first lens element to the sixth lens element may each comprise an object-side surface facing toward the object side and allowing imaging rays to pass through and an image-side surface facing toward the image side and allowing the imaging rays to pass through. The optical axis region of the image-side surface of the second lens element may be convex. The optical axis region of the object-side surface of the fourth lens element may be convex. The periphery region of the object-side surface of the fifth lens element may be convex. The optical axis region of the object-side surface of the six the lens element may be concave. The optical axis region of the image-side surface of the sixth lens element may be concave. Lens elements included by the optical imaging lens are only the six lens elements described above. The optical imaging lens may satisfy Inequality (1): HFOV/(AAG+BFL)≥16.000 degrees/mm and Inequality (2): G12/(G45+G56)≥1.300.

In above three embodiments, some Inequalities could be taken into consideration as follows:

$$V2+V4+V5 \leq 135.000 \qquad \text{Inequality (3);}$$

$$V1+V2+V4 \leq 140.000 \qquad \text{Inequality (4);}$$

$$V2+V3+V4 \leq 120.000 \qquad \text{Inequality (5);}$$

$$Fno*ImgH/EFL \geq 1.600 \qquad \text{Inequality (6);}$$

$$HFOV/(Fno*EFL) \geq 8.000 \text{ degrees/mm} \qquad \text{Inequality (7);}$$

$$HFOV/ALT \geq 16.000 \text{ degrees/mm} \qquad \text{Inequality (8);}$$

$$(T2+EFL)/BFL \geq 1.100 \qquad \text{Inequality (9);}$$

$$TTL/AAG \geq 4.000 \qquad \text{Inequality (10);}$$

$$(T2+T6)/G12 \geq 1.200 \qquad \text{Inequality (11);}$$

$$ALT/(G34+T4+G45) \geq 4.400 \qquad \text{Inequality (12);}$$

$(G23+T3+G34)/T4 \leq 3.200$  Inequality (13);

$TTL/(T2+T6) \geq 5.000$  Inequality (14);

$(T3+T5)/T1 \geq 4.000$  Inequality (15);

$(ALT+G12)/BFL \geq 2.600$  Inequality (16);

$(G12+T3+T5)/(G23+G56) \geq 5.800$  Inequality (17);

$TL/G12 \geq 5.300$  Inequality (18).

Any one of the aforementioned inequalities may be selectively incorporated in other inequalities to apply to the present embodiments, and as such are not limiting. In some example embodiments, more details about the convex or concave surface structure, refracting power or chosen material etc. could be incorporated for one specific lens element or broadly for plural lens elements to enhance the control for the system performance and/or resolution. It is noted that the details listed here could be incorporated in example embodiments if no inconsistency occurs.

According to above illustration, the length of the optical imaging lens may be shortened, the F-number may be decreased, and the field of view may be extended may be enlarged while maintaining good optical characteristics by controlling the convex or concave shape of the surfaces of lens elements.

BRIEF DESCRIPTION OF THE DRAWINGS

Exemplary embodiments will be more readily understood from the following detailed description when read in conjunction with the appended drawings, in which:

FIG. 1 depicts a cross-sectional view of one single lens element according to one embodiment of the present disclosure;

FIG. 2 depicts a schematic view of a relation between a surface shape and an optical focus of a lens element;

FIG. 3 depicts a schematic view of a first example of a surface shape and an effective radius of a lens element;

FIG. 4 depicts a schematic view of a second example of a surface shape and an effective radius of a lens element;

FIG. 5 depicts a schematic view of a third example of a surface shape and an effective radius of a lens element;

FIG. 8 depicts a table of optical data for each lens element of an optical imaging lens of the first embodiment of the present disclosure;

FIG. 9 depicts a table of aspherical data of the first embodiment of an optical imaging lens according to the present disclosure;

FIG. 12 depicts a table of optical data for each lens element of an optical imaging lens of the second embodiment of the present disclosure;

FIG. 13 depicts a table of aspherical data of the second embodiment of the optical imaging lens according to the present disclosure;

FIGS. 15(a)-15(d) depict a chart of a longitudinal spherical aberration and other kinds of optical aberrations of the third embodiment of an optical imaging lens according to the present disclosure;

FIG. 16 depicts a table of optical data for each lens element of the optical imaging lens of the third embodiment of the present disclosure;

FIG. 17 depicts a table of aspherical data of the third embodiment of the optical imaging lens according to the present disclosure;

FIG. 20 depicts a table of optical data for each lens element of an optical imaging lens of the fourth embodiment of the present disclosure;

FIG. 21 depicts a table of aspherical data of the fourth embodiment of the optical imaging lens according to the present disclosure;

FIG. 24 depicts a table of optical data for each lens element of the optical imaging lens of the fifth embodiment of the present disclosure;

FIG. 25 depicts a table of aspherical data of the fifth embodiment of the optical imaging lens according to the present disclosure;

FIG. 28 depicts a table of optical data for each lens element of the sixth embodiment of an optical imaging lens according to the present disclosure;

FIG. 29 depicts a table of aspherical data of the sixth embodiment of the optical imaging lens according to the present disclosure;

FIGS. 31(a)-31(d) depict a chart of a longitudinal spherical aberration and other kinds of optical aberrations of the seventh embodiment of the optical imaging lens according to the present disclosure;

FIG. 32 depicts a table of optical data for each lens element of the seventh embodiment of an optical imaging lens according to the present disclosure;

FIG. 33 depicts a table of aspherical data of the seventh embodiment of the optical imaging lens according to the present disclosure;

FIGS. 35(a)-35(d) depict a chart of a longitudinal spherical aberration and other kinds of optical aberrations of the eighth embodiment of the optical imaging lens according to the present disclosure;

FIG. 36 depicts a table of optical data for each lens element of the eighth embodiment of an optical imaging lens according to the present disclosure;

FIG. 37 depicts a table of aspherical data of the eighth embodiment of the optical imaging lens according to the present disclosure;

FIG. 40 depicts a table of optical data for each lens element of the ninth embodiment of an optical imaging lens according to the present disclosure;

FIG. 41 depicts a table of aspherical data of the ninth embodiment of the optical imaging lens according to the present disclosure;

FIG. 44 depicts a table of optical data for each lens element of the tenth embodiment of an optical imaging lens according to the present disclosure;

FIG. 45 depicts a table of aspherical data of the tenth embodiment of the optical imaging lens according to the present disclosure;

FIG. 46A is a table for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 as determined in the first to fifth embodiments.

FIG. 46B is a table for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 as determined in the sixth to tenth embodiments.

DETAILED DESCRIPTION

Figure 6:
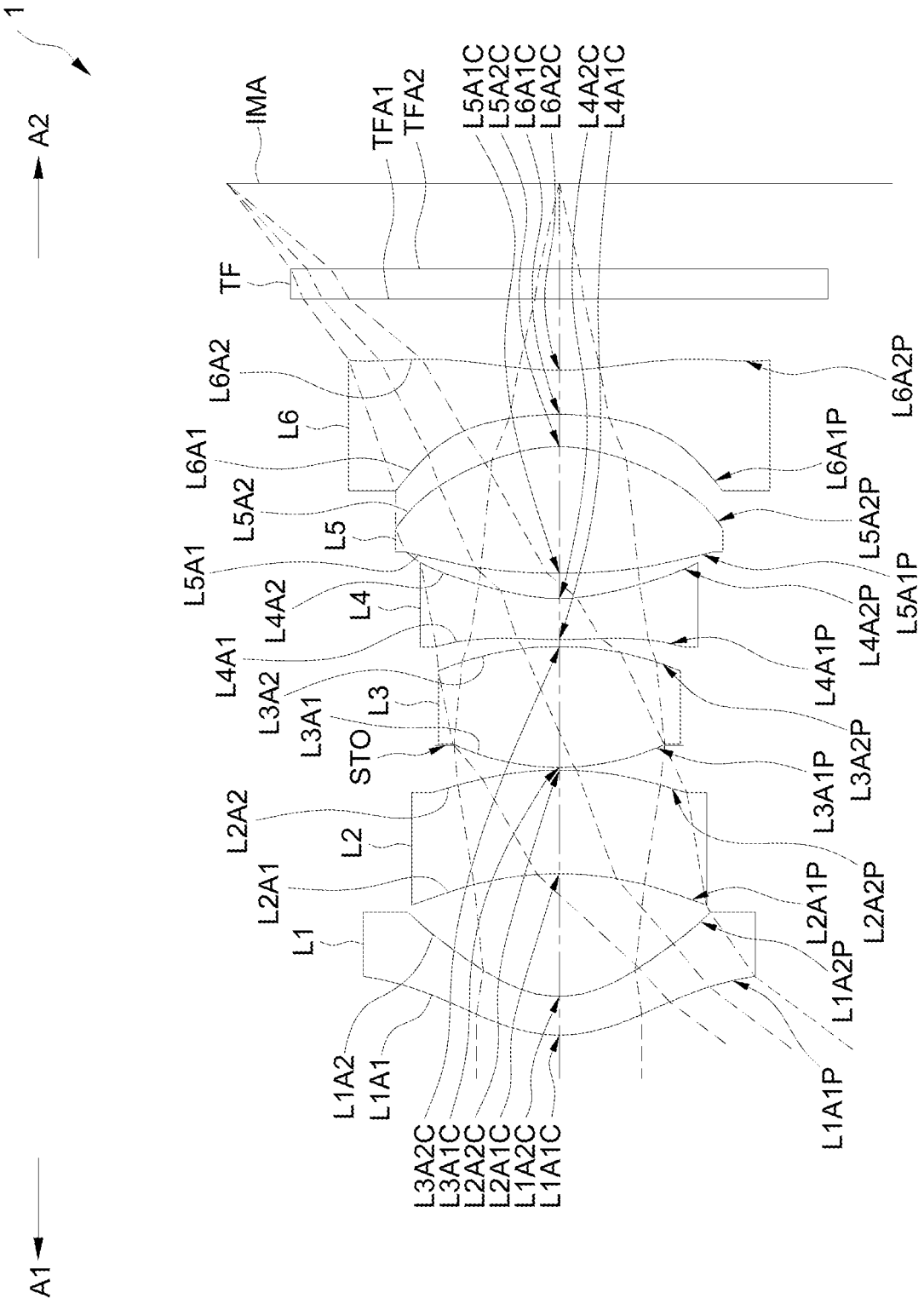
FIG. 6 depicts a cross-sectional view of the first embodiment of an optical imaging lens according to the present disclosure.

The terms "optical axis region", "periphery region", "concave", and "convex" used in this specification and claims should be interpreted based on the definition listed in the specification by the principle of lexicographer.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

The optical imaging lens of the present disclosure may comprise at least six lens elements, in which a first lens element, a second lens element, a third lens element, a fourth lens element, a fifth lens element, and a sixth lens element are arranged sequentially from an object side to an image side along an optical axis. The first lens element to the sixth lens element may each comprise an object-side surface facing toward the object side and allowing imaging rays to pass through and an image-side surface facing toward the image side and allowing the imaging rays to pass through.

Through designing concave and/or convex surfaces of each lens elements described below, the optical imaging lens may provide improved imaging quality, reduced length of the optical imaging lens, decreased F-number, and extended field of view.

According to some embodiments of the present invention, extending the field of view of the optical lens system while maintaining the imaging quality can be effectively achieved through the concave-convex design of the following surface shape and the limitation of the refracting power of lens elements: an optical axis region of the image-side surface of the sixth lens element being concave, and the optical imaging lens satisfying Inequality (1) and Inequality (2). Further, a preferable range of Inequality (1) may be 16.000 degrees/mm≤HFOV/(AAG+BFL)≤32.000 degrees/mm and preferable range of Inequality (2) may be 1.300≤G12/(G45+G56) ≤3.600. The above mentioned conditions may be further combine with the surface shape combination of one of the following conditions (a) to (c), which can help the imaging rays converge, improve the aberration and reduce the distortion:

(a) the first lens element may have negative refracting power, the optical axis region of the object-side surface of the second lens element may be concave, the periphery region of the image-side surface of the fifth lens element may be convex, and the optical axis region of the object-side surface of the sixth lens element may be concave;

(b) the first lens element may have negative refracting power, the optical axis region of the object-side surface of the first lens element may be convex, the optical axis region of the object-side surface of the second lens element may be concave, the optical axis region of the object-side surface of the fourth lens element may be convex, the periphery region of the image-side surface of the fourth lens element may be concave, and the optical axis region of the object-side surface of the fifth lens element may be convex;

(c) the optical axis region of the image-side surface of the second lens element may be convex, the optical axis region of the object-side surface of the fourth lens element may be convex, the periphery region of the object-side surface of the fifth lens element may be convex, and the optical axis region of the object-side surface of the sixth lens element may be concave.

When the optical imaging lens satisfies Inequality (3), Inequality (4), and Inequality (5) by selecting the appropriate lens materials, the chromatic aberration of the optical imaging lens can be improved, and the good imaging quality can be obtained at the dual band of visible light and near infrared light (NIR). Further, a preferable range of Inequality (3) may be 90.500≤V2+V4+V5≤135.000, a preferable range of Inequality (4) may be 90.500≤V1+V2+V4≤140.000, and a preferable range of Inequality (5) may be 90.500≤V2+V3+V4≤120.000.

According to some embodiments of the present invention, when HFOV and EFL meet the Inequality (6), Inequality (7), Inequality (8), and Inequality (9), the field of view can be extended. Further, a preferable range of Inequality (6) may be 1.600≤Fno*ImgH/EFL≤4.000, a preferable range of Inequality (7) may be 8.000 degrees/mm≤HFOV/(Fno*EFL)≤28.500 degrees/mm, a preferable range of Inequality (8) may be 16.000 degrees/mm≤HFOV/ALT≤23.400 degrees/mm, and a preferable range of Inequality (9) may be 1.100≤(T2+EFL)/BFL≤3.500.

According to some embodiments of the present invention, to achieve a shortened length of lens system while maintaining image quality, values of the air gap between lens elements or the thickness of each lens element may be adjusted appropriately. The optical imaging lens may be designed to selectively satisfy Inequalities (10)-(18). To consider ease of manufacturing the optical imaging lens, an optical imaging lens of the present disclosure may also satisfy one or more of the inequalities below:

$$4.000 \leq TTL/AAG \leq 5.500;$$

$$1.200 \leq (T2+T6)/G12 \leq 1.850;$$

$$4.400 \leq ALT/(G34+T4+G45) \leq 7.500;$$

$$0.950 \leq (G23+T3+G34)/T4 \leq 3.200;$$

$$5.000 \leq TTL/(T2+T6) \leq 7.900;$$

$$4.000 \leq (T3+T5)/T1 \leq 14.300;$$

$$2.600 \leq (ALT+G12)/BFL \leq 4.700;$$

$$5.800 \leq (G12+T3+T5)/(G23+G56) \leq 11.600;$$

$$5.300 \leq TL/G12 \leq 8.500.$$

In addition, any combination of the embodiment parameters can be selected to increase the limitations of the optical imaging lens, so as to facilitate the design of the optical imaging lens of the same architecture of the present invention. In light of the unpredictability in an optical system, in the present disclosure, satisfying these inequalities listed above may result in promoting the imaging quality, shortening the system length, increasing the field of view and/or increasing the yield in the assembly process.

Several exemplary embodiments and associated optical data will now be provided to illustrate non-limiting examples of optical imaging lens systems having good optical characteristics, extended field of view, and reduced F-number.

Reference is now made to FIGS. 6-9. FIG. 6 illustrates an example cross-sectional view of an optical imaging lens 1 according to a first example embodiment. FIGS. 7(a)-7(d) show example charts of a longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, a first lens element L1, a second lens element L2, an aperture stop STO, a third lens element L3, a fourth lens element L4, a fifth lens element L5, and a sixth lens element L6. A filtering unit TF and an image plane IMA of an image sensor (not shown) are positioned at the image side A2 of the optical imaging lens 1. Each of the first, second, third, fourth, fifth, and sixth lens elements L1, L2, L3, L4, L5, L6 and the filtering unit TF may comprise an object-side surface L1A1/L2A1/L3A1/L4A1/L5A1/L6A1/TFA1 facing toward the object side A1 and an image-side surface L1A2/L2A2/L3A2/L4A2/L5A2/L6A2/TFA2 facing toward the image side A2. The example embodiment of the filtering unit TF illustrated may be positioned between the sixth lens element L6 and the image plane IMA. The filtering unit TF may be an IR cut filter (infrared cut filter) selectively absorbs light passing optical imaging lens 1 that has a specific wavelength to prevent the infrared ray in the light from being transmitted to the image plane and affecting the imaging quality, and may also be a protective glass (cover glass) to protect the optical imaging lens, but is not limit thereto.

Exemplary embodiments of each lens element of the optical imaging lens 1 will now be described with reference to the drawings. The lens elements L1, L2, L3, L4, L5, L6 of the optical imaging lens 1 may be constructed using plastic materials in this embodiment for the purpose of lightweight product and cost down, but is not limit thereto.

An example embodiment of the first lens element L1 may have negative refracting power. The optical axis region L1A1C and the periphery region L1A1P of the object-side surface L1A1 of the first lens element L1 may be convex. The optical axis region L1A2C and the periphery region L1A2P of the image-side surface L1A2 of the first lens element L1 may be concave.

An example embodiment of the second lens element L2 may have positive refracting power. The optical axis region L2A1C and the periphery region L2A1P of the object-side surface L2A1 of the second lens element L2 may be concave. The optical axis region L2A2C and the periphery region L2A2P of the image-side surface L2A2 of the second lens element L2 may be convex.

An example embodiment of the third lens element L3 may have positive refracting power. The optical axis region L3A1C and the periphery region L3A1P of the object-side surface L3A1 of the third lens element L3 may be convex. The optical axis region L3A2C and the periphery region L3A2P of the image-side surface L3A2 of the third lens element L3 may be convex.

An example embodiment of the fourth lens element L4 may have negative refracting power. The optical axis region L4A1C of the object-side surface L4A1 of the fourth lens element L4 may be convex. The periphery region L4A1P of the object-side surface L4A1 of the fourth lens element L4 may be concave. The optical axis region L4A2C and the periphery region L4A2P of the image-side surface L4A2 of the fourth lens element L4 may be concave.

An example embodiment of the fifth lens element L5 may have positive refracting power. The optical axis region L5A1C and the periphery region L5A1P of the object-side surface L5A1 of the fifth lens element L5 may be convex. The optical axis region L5A2C and the periphery region L5A2P of the image-side surface L5A2 of the fifth lens element L5 may be convex.

An example embodiment of the sixth lens element L6 may have negative refracting power. The optical axis region L6A1C and the periphery region L6A1P of the object-side surface L6A1 of the sixth lens element L6 may be concave. The optical axis region L6A2C and the periphery region L6A2P of the image-side surface L6A2 of the sixth lens element L6 may be concave.

The totaled 12 aspherical surfaces including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4, the object-side surface L5A1 and the image-side surface L5A2 of the fifth lens element L5, and the object-side surface L6A1 and the image-side surface L6A2 of the sixth lens element L6 may all be defined by the following aspherical formula (1):

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad \text{formula (1)}$$

wherein,

Z represents the depth of the aspherical surface (the perpendicular distance between the point of the aspherical surface at a distance Y from the optical axis and the tangent plane of the vertex on the optical axis of the aspherical surface);

R represents the radius of curvature of the surface of the lens element;

Y represents the perpendicular distance between the point of the aspherical surface and the optical axis;

K represents a conic constant; and $a_{2i}$ represents an aspherical coefficient of $2i^{th}$ level.

The values of each aspherical parameter are shown in FIG. 9.

Figure 7A:
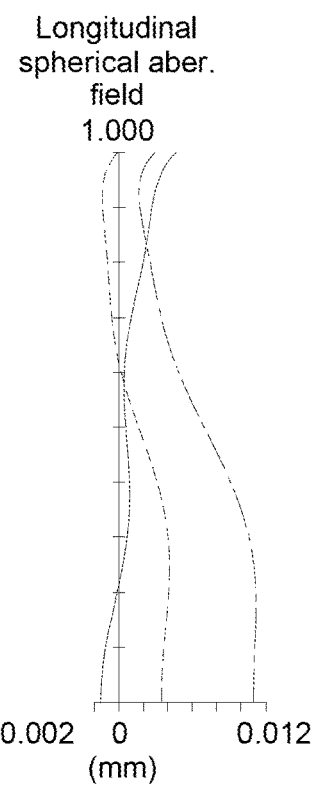
FIGS. 7(a)-7(d) depict a chart of a longitudinal spherical aberration and other kinds of optical aberrations of the first embodiment of an optical imaging lens according to the present disclosure.
Figure 7B:
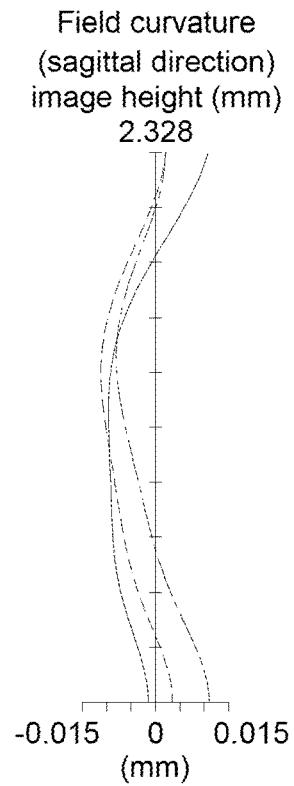
Figure 7C:
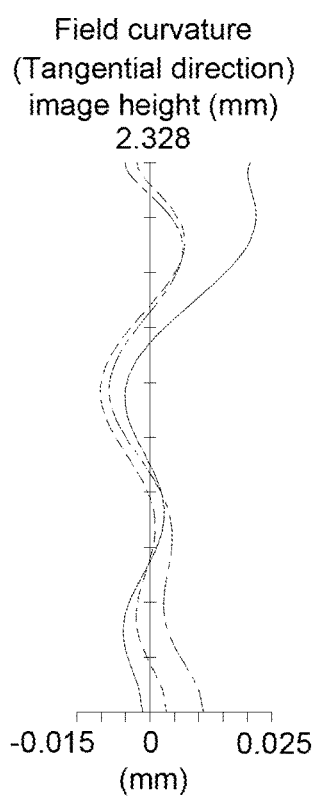
Figure 7D:
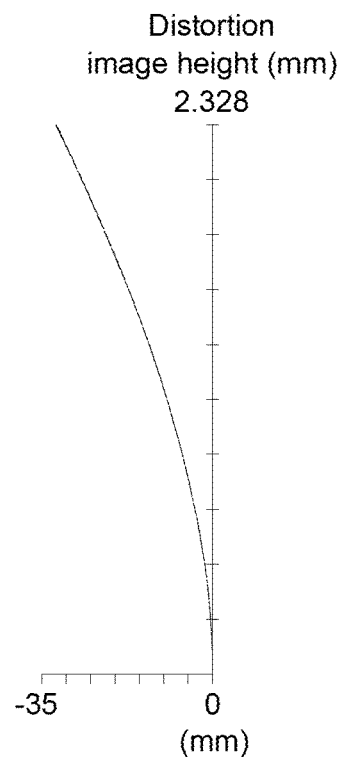

FIG. 7(a) shows a longitudinal spherical aberration for three representative wavelengths (470 nm, 555 nm, 650 nm), wherein the vertical axis of FIG. 7(a) defines the field of view. FIG. 7(b) shows the field curvature aberration in the sagittal direction for three representative wavelengths, wherein the vertical axis of FIG. 7(b) defines the image height. FIG. 7(c) shows the field curvature aberration in the tangential direction for three representative wavelengths, wherein the vertical axis of FIG. 7(c) defines the image height. FIG. 7(d) shows a variation of the distortion aberration, wherein the vertical axis of FIG. 7(d) defines the image height. The three curves with different wavelengths may represent that off-axis light with respect to these wavelengths may be focused around an image point. From the vertical deviation of each curve shown in FIG. 7(a), the offset of the off-axis light relative to the image point may be within ±0.012 mm. Therefore, the first embodiment may improve the longitudinal spherical aberration with respect to different wavelengths. Referring to FIG. 7(b), the focus variation with respect to the three different wavelengths in the whole field may fall within ±0.015 mm. Referring to FIG. 7(c), and the focus variation with respect to the three different wavelengths in the whole field may fall within ±0.025 m Referring to FIG. 7(d), the horizontal axis of FIG. 7(d), the variation of the distortion aberration may be within ±35%.

The unit of the optical imaging lens for the image height, curvature radius, the thickness and the focal length is in millimetres (mm). As shown in FIG. 8, the distance from the object-side surface L1A1 of the first lens element L1 to the image plane IMA along the optical axis (TTL) may be 5.965 mm, Fno may be 2.200, HFOV may be 53.242 degrees, the effective length (EFL) may be 2.551 mm, and the image height (ImgH) may be 2.328 mm. In conjunction with values of aberrations in FIGS. 7(a)-7(d), the present embodiment may provide an optical imaging lens 1 having a shortened length and an extended field of view while improving optical performance.

Please refer to FIG. 46A for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 of the present embodiment.

Figure 10:
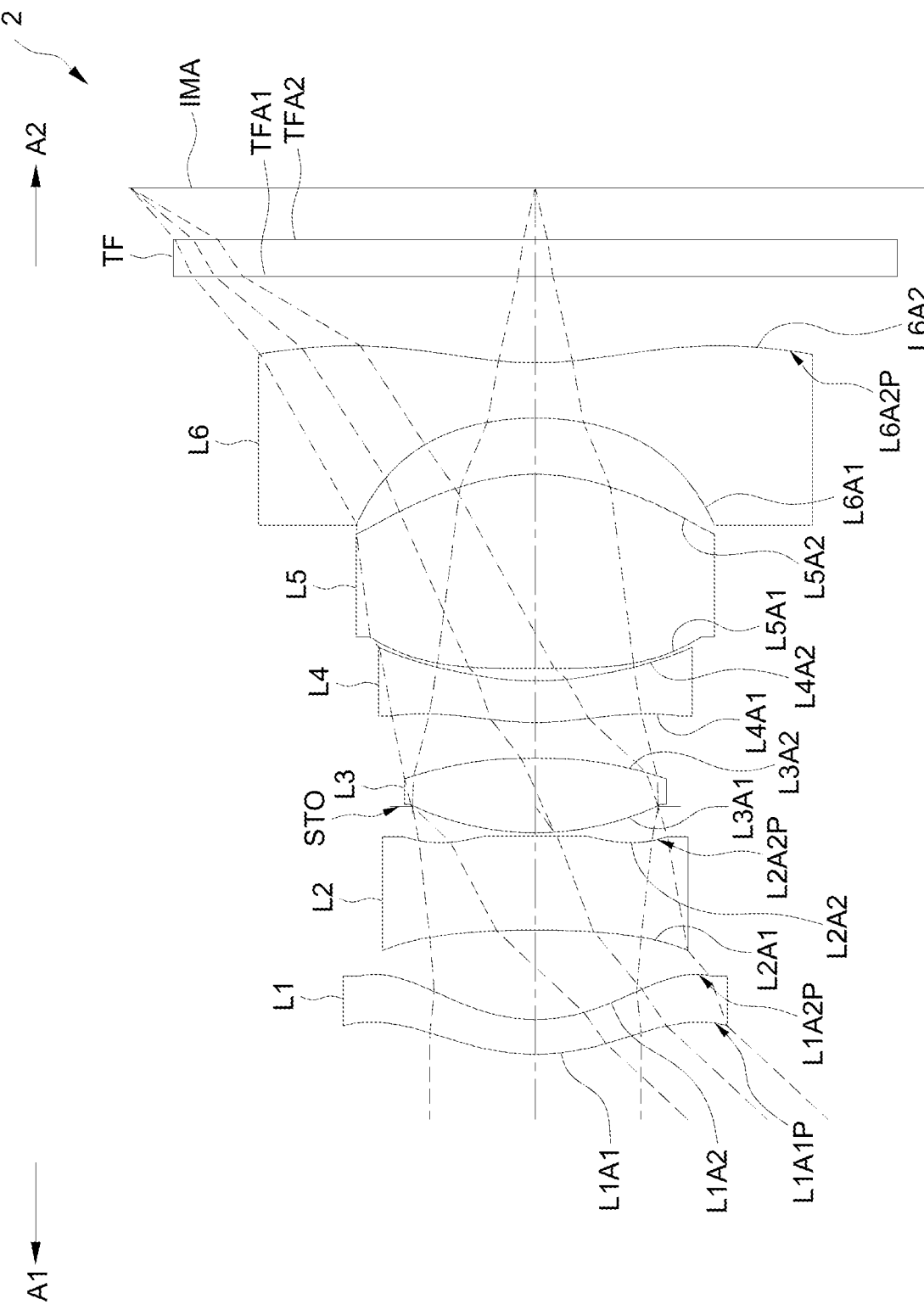
FIG. 10 depicts a cross-sectional view of the second embodiment of an optical imaging lens according to the present disclosure.
Figure 11A:
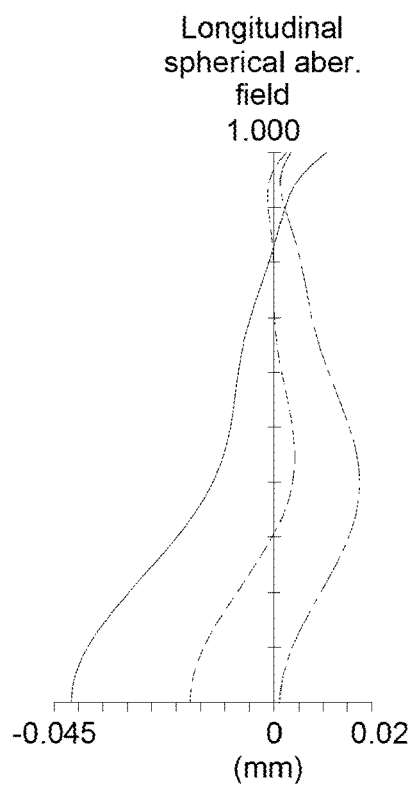
FIGS. 11(a)-11(d) depict a chart of a longitudinal spherical aberration and other kinds of optical aberrations of the second embodiment of an optical imaging lens according to the present disclosure.
Figure 11B:
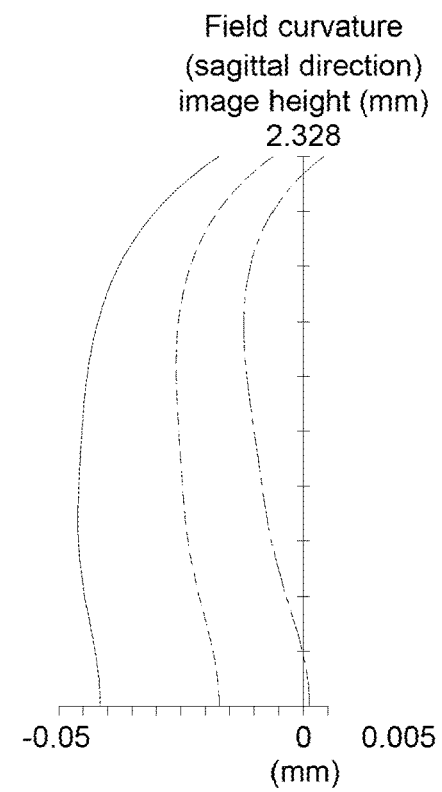
Figure 11C:
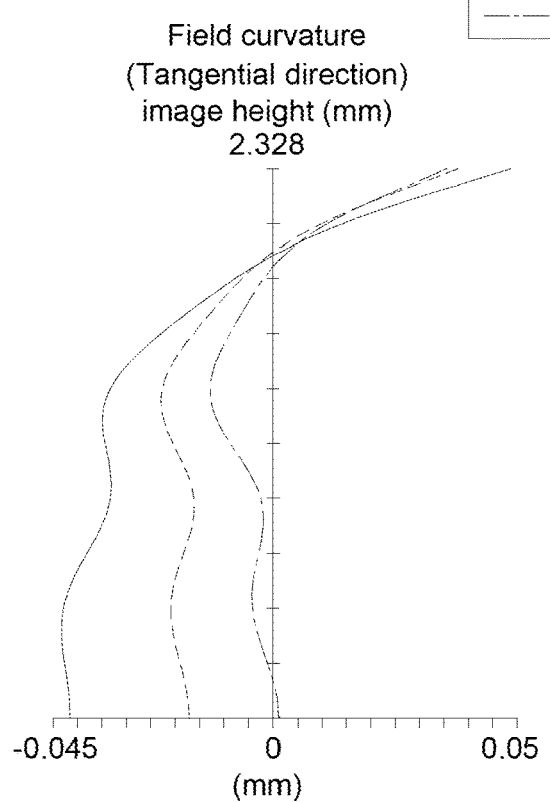
Figure 11D:
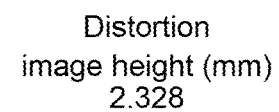

Reference is now made to FIGS. 10-13. FIG. 10 illustrates an example cross-sectional view of an optical imaging lens 2 according to a second example embodiment. FIGS. 11(*a*)-11(*d*) show example charts of a longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment.

As shown in FIG. 10, the optical imaging lens 2 of the present embodiment, in an order from an object side A1 to an image side A2 along an optical axis, may comprise a first lens element L1, a second lens element L2, an aperture stop STO, a third lens element L3, a fourth lens element L4, a fifth lens element L5, and a sixth lens element L6.

The arrangement of the convex or concave surface structures of the lens elements, including the object-side surfaces L2A1, L3A1, L4A1, L5A1, and L6A1 and the image-side surfaces L3A2, L4A2, and L5A2, and the refracting powers of the lens elements of the present embodiment may be generally similar to the optical imaging lens 1, but the differences between the optical imaging lens 1 and the optical imaging lens 2 may include refracting powers of the second lens element L2 and the fourth lens element L4, the concave or convex surface structures of the object-side surface L1A1, and the image-side surfaces L1A2, L2A2, and L6A2. Additional differences may include a radius of curvature, a thickness, aspherical data, and/or an effective focal length of each lens element. More specifically, the second lens element L2 may have negative refracting power, the fourth lens element L4 may have positive refracting power, the periphery region L1A1P of the object-side surface L1A1 of the first lens element L1 may be concave, the periphery region L1A2P of the image-side surface L1A2 of the first lens element L1 may be convex, the periphery region L2A2P of the image-side surface L2A2 of the second lens element L2 may be concave, and the periphery region L6A2P of the image-side surface L6A2 of the sixth lens element L6 may be convex.

Here, in the interest of clearly showing the drawings of the present embodiment, only the surface shapes which are different from that in the first embodiment may be labeled. Please refer to FIG. 12 for the optical characteristics of each lens element in the optical imaging lens 2 of the present embodiment.

FIG. 11(*a*) shows a longitudinal spherical aberration for three representative wavelengths (470 nm, 555 nm, 650 nm), wherein the offset of the off-axis light relative to the image point may be within ±0.045 mm. Referring to FIG. 11(*b*), and the focus variation with respect to the three different wavelengths in the whole field may fall within ±0.05 mm. Referring to FIG. 11(*c*), the focus variation with respect to the three different wavelengths in the whole field may fall within ±0.05 mm. Referring to FIG. 11(*d*), the variation of the distortion aberration of the optical imaging lens 2 may be within ±25%.

As shown in FIGS. 11(*a*)-11(*d*) and FIG. 12, in comparison with the first embodiment, the distortion aberration in the second embodiment may be smaller, the system length in the second embodiment may be shorter.

Please refer to FIG. 46A for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 of the present embodiment.

Figure 14:
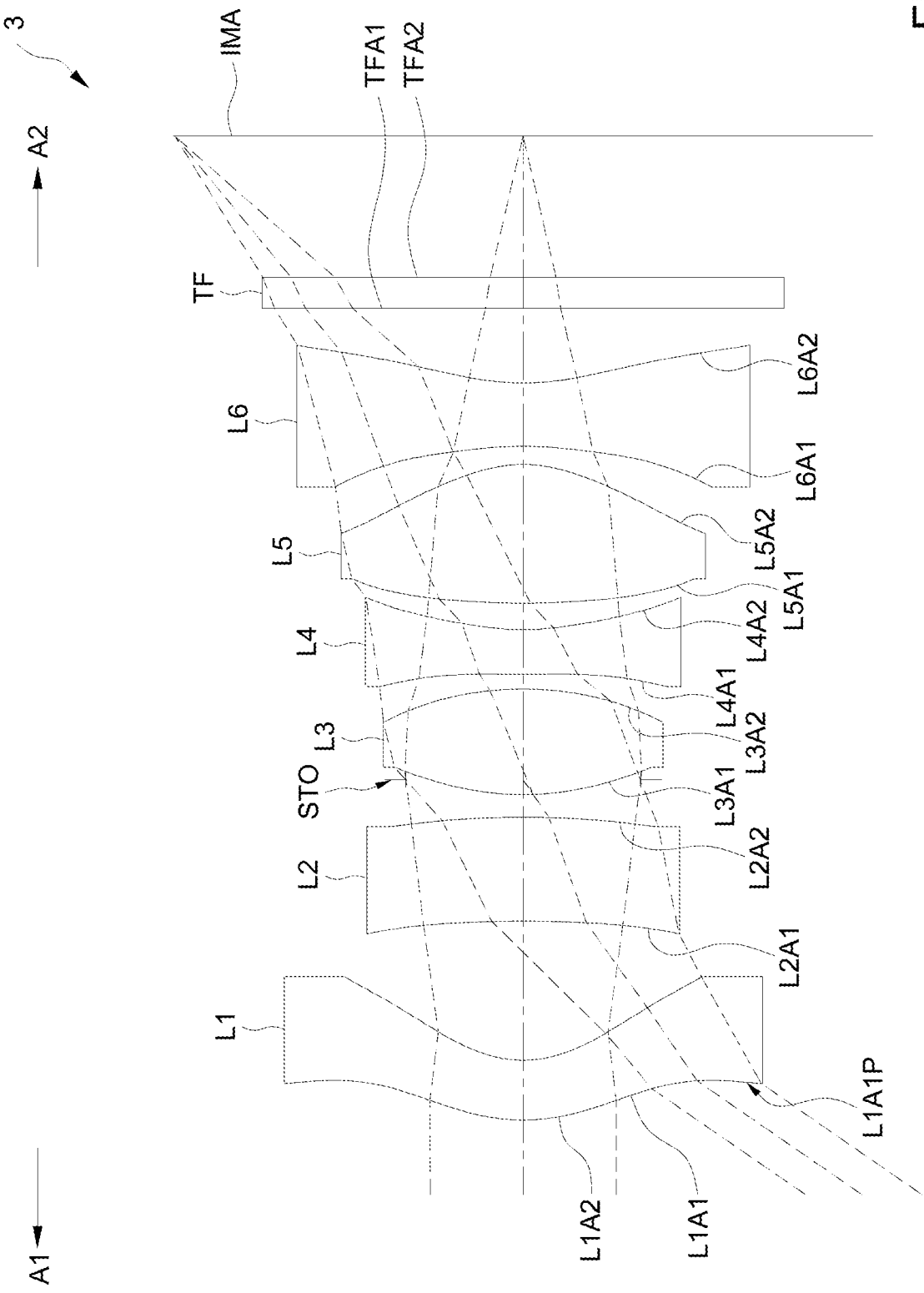
FIG. 14 depicts a cross-sectional view of the third embodiment of an optical imaging lens according to the present disclosure.

Reference is now made to FIGS. 14-17. FIG. 14 illustrates an example cross-sectional view of an optical imaging lens 3 according to a third example embodiment. FIGS. 15(*a*)-15(*d*) show example charts of a longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 13 shows an example table of aspherical data of the optical imaging lens 3 according to the third example embodiment.

As shown in FIG. 14, the optical imaging lens 3 of the present embodiment, in an order from an object side A1 to an image side A2 along an optical axis, may comprise a first lens element L1, a second lens element L2, an aperture stop STO, a third lens element L3, a fourth lens element L4, a fifth lens element L5, and a sixth lens element L6.

The arrangement of the convex or concave surface structures of the lens elements, including the object-side surfaces L2A1, L3A1, L4A1, L5A1, and L6A1 and the image-side surfaces L1A2, L2A2, L3A2, L4A2, L5A2, and L6A2, and the refracting powers of the lens elements of the present embodiment may be generally similar to the optical imaging lens 1, but the differences between the optical imaging lens 1 and the optical imaging lens 3 may include the concave or convex surface structures of the object-side surface L1A1. Additional differences may include a radius of curvature, a thickness, aspherical data, and/or an effective focal length of each lens element. More specifically, the periphery region L1A1P of the object-side surface L1A1 of the first lens element L1 may be concave.

Here, in the interest of clearly showing the drawings of the present embodiment, only the surface shapes which are different from that in the first embodiment may be labeled. Please refer to FIG. 16 for the optical characteristics of each lens element in the optical imaging lens 3 of the present embodiment.

FIG. 15(*a*) shows a longitudinal spherical aberration for three representative wavelengths (470 nm, 555 nm, 650 nm), wherein the offset of the off-axis light relative to the image point may be within ±0.01 mm. Referring to FIG. 15(*b*), and the focus variation with respect to the three different wavelengths in the whole field may fall within ±0.025 mm. Referring to FIG. 15(*c*), the focus variation with respect to the three different wavelengths in the whole field may fall within ±0.025 mm. Referring to FIG. 15(*d*), the variation of the distortion aberration of the optical imaging lens 3 may be within ±45%.

As shown in FIGS. 15(*a*)-15(*d*) and FIG. 16, in comparison with the first embodiment, the longitudinal spherical aberration in the third embodiment may be smaller, and the field of view in the third embodiment may be larger.

Please refer to FIG. 46A for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 of the present embodiment.

Figure 18:
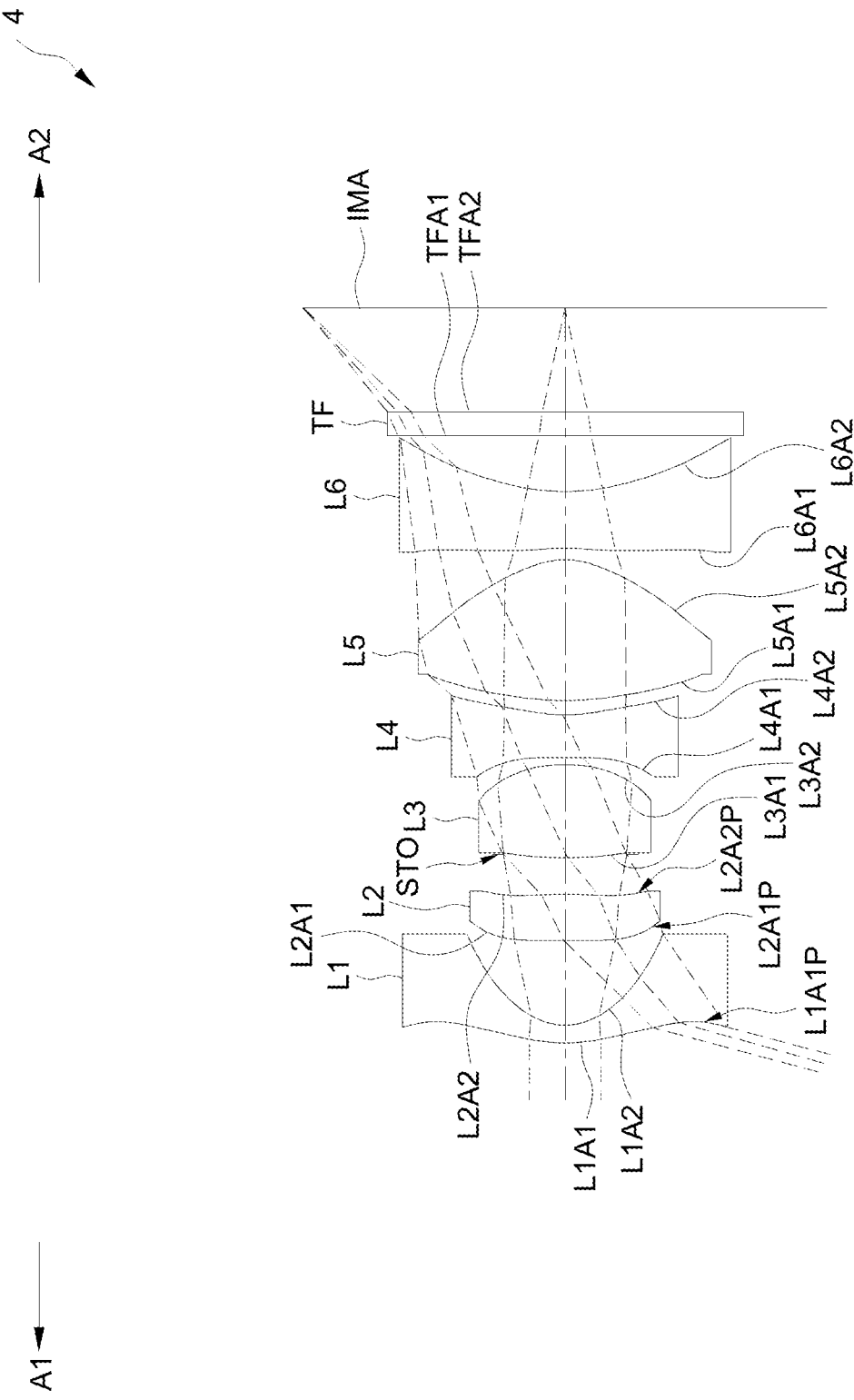
FIG. 18 depicts a cross-sectional view of the fourth embodiment of an optical imaging lens according to the present disclosure.

Reference is now made to FIGS. 18-21. FIG. 18 illustrates an example cross-sectional view of an optical imaging lens 4 according to a fourth example embodiment. FIGS. 19(*a*)-19(*d*) show example charts of a longitudinal spherical aberration and other kinds of optical aberrations of the optical imaging lens 4 according to the fourth example embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment.

As shown in FIG. 18, the optical imaging lens 4 of the present embodiment, in an order from an object side A1 to an image side A2 along an optical axis, may comprise a first lens element L1, a second lens element L2, an aperture stop STO, a third lens element L3, a fourth lens element L4, a fifth lens element L5, and a sixth lens element L6.

The arrangement of the convex or concave surface structures of the lens elements, including the object-side surfaces L3A1, L4A1, L5A1, and L6A1 and the image-side surfaces L1A2, L3A2, L4A2, L5A2, and L6A2, and the refracting powers of the lens elements of the present embodiment may be generally similar to the optical imaging lens 1, but the differences between the optical imaging lens 1 and the optical imaging lens 4 may include the concave or convex surface structures of the object-side surfaces L1A1, L2A1 and the image-side surface L2A2. Additional differences may include a radius of curvature, a thickness, aspherical data, and/or an effective focal length of each lens element. More specifically, the periphery region L1A1P of the object-side side surface L1A1 of the first lens element L1 may be concave, the periphery region L2A1P of the object-side surface L2A1 of the second lens element L2 may be convex, and the periphery region L2A2P of the image-side surface L2A2 of the second lens element L2 may be concave.

Here, in the interest of clearly showing the drawings of the present embodiment, only the surface shapes which are different from that in the first embodiment may be labeled. Please refer to FIG. 20 for the optical characteristics of each lens element in the optical imaging lens 4 of the present embodiment.

Figure 19A:
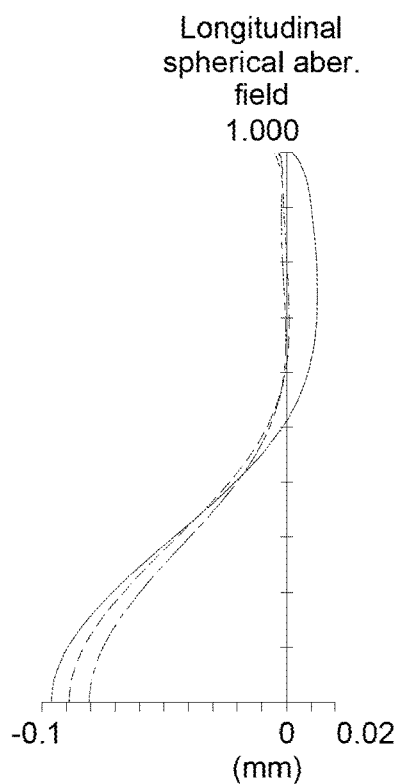
FIGS. 19(a)-19(d) depict a chart of a longitudinal spherical aberration and other kinds of optical aberrations of the fourth embodiment of an optical imaging lens according to the present disclosure.
Figure 19B:
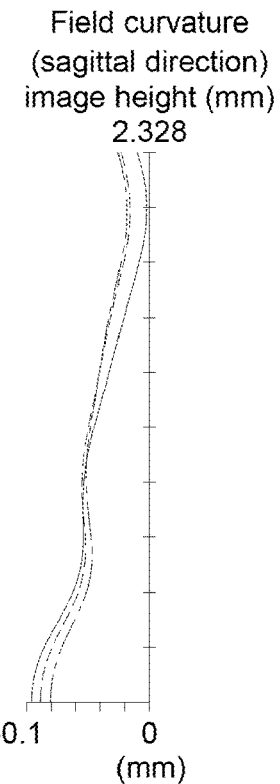
Figure 19C:
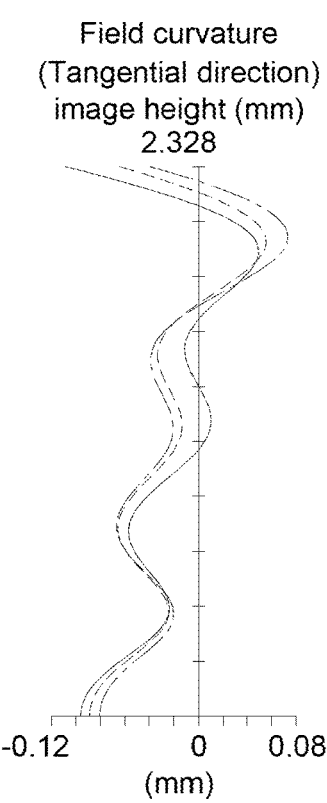
Figure 19D:
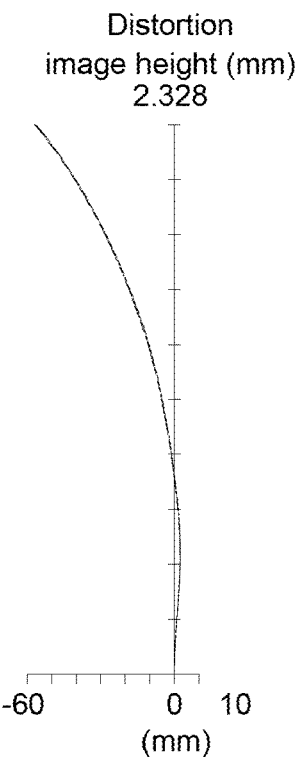

FIG. 19(a) shows a longitudinal spherical aberration for three representative wavelengths (470 nm, 555 nm, 650 nm), wherein the offset of the off-axis light relative to the image point may be within ±0.01 mm. Referring to FIG. 19(b), and the focus variation with respect to the three different wavelengths in the whole field may fall within ±0.01 mm. Referring to FIG. 19(c), the focus variation with respect to the three different wavelengths in the whole field may fall within ±0.12 mm. Referring to FIG. 19(d), the variation of the distortion aberration of the optical imaging lens 4 may be within ±60%.

As shown in FIGS. 19(a)-19(d) and FIG. 20, in comparison with the first embodiment, the field of view in the fourth embodiment may be larger.

Please refer to FIG. 46A for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 of the present embodiment.

Figure 22:
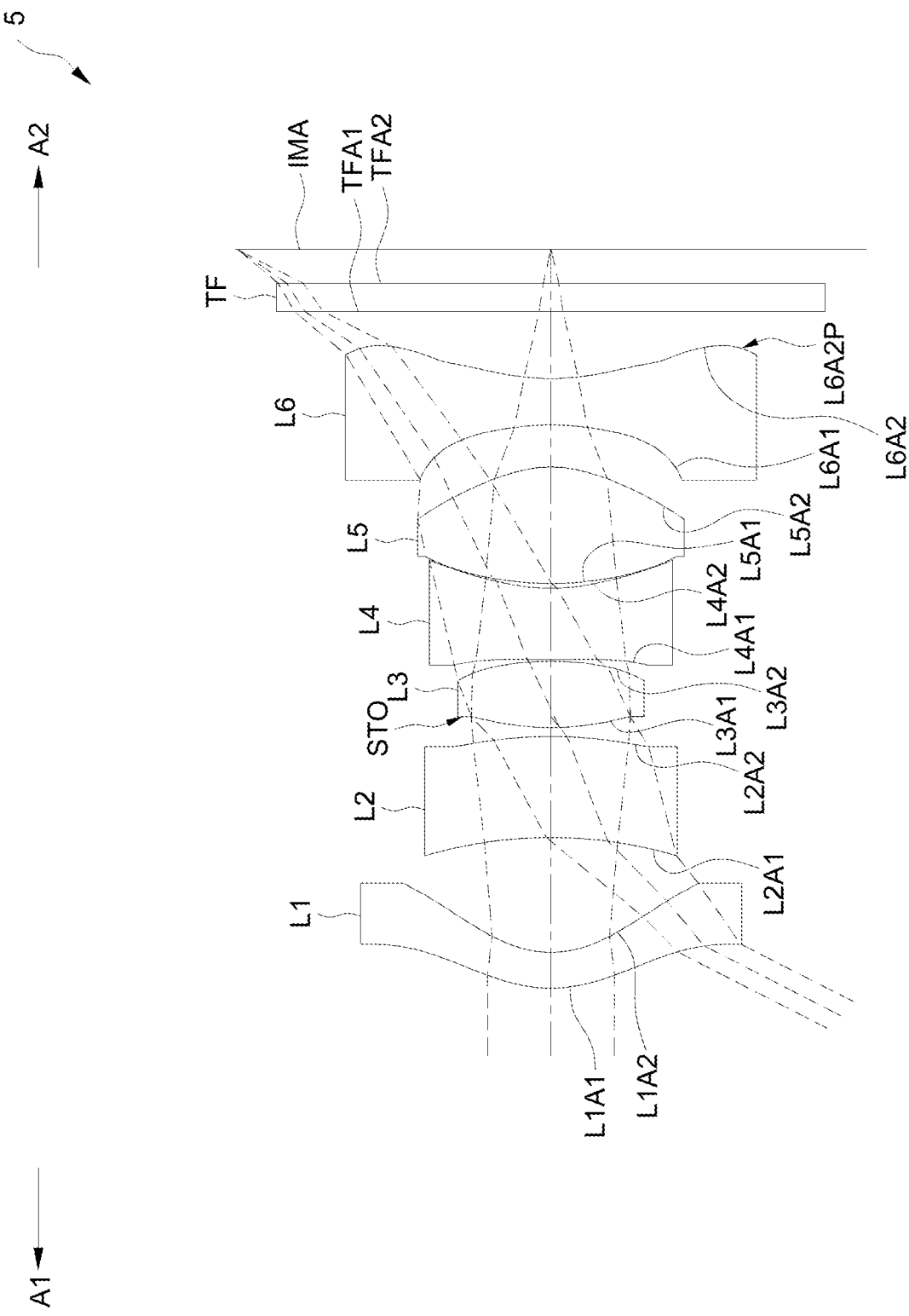
FIG. 22 depicts a cross-sectional view of the fifth embodiment of an optical imaging lens according to the present disclosure.

Reference is now made to FIGS. 22-25. FIG. 22 illustrates an example cross-sectional view of an optical imaging lens 5 according to a fifth example embodiment. FIGS. 23(a)-23(d) show example charts of a longitudinal spherical aberration and other kinds of optical aberrations of the optical imaging lens 5 according to the fifth example embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment.

As shown in FIG. 22 the optical imaging lens 5 of the present embodiment, in an order from an object side A1 to an image side A2 along an optical axis, may comprise a first lens element L1, a second lens element L2, an aperture stop STO, a third lens element L3, a fourth lens element L4, a fifth lens element L5, and a sixth lens element L6.

The arrangement of the convex or concave surface structures of the lens elements, including the object-side surfaces L1A1, L2A1, L3A1, L4A1, L5A1, and L6A1 and the image-side surfaces L1A2, L2A2, L3A2, L4A2, L5A2, and the refracting powers of the lens elements of the present embodiment may be generally similar to the optical imaging lens 1, but the differences between the optical imaging lens 1 and the optical imaging lens 5 may include the concave or convex surface structures of the image-side surface L6A2. Additional differences may include a radius of curvature, a thickness, aspherical data, and/or an effective focal length of each lens element. More specifically, the periphery region L6A2P of the image-side surface L6A2 of the sixth lens element L6 may be convex.

Here, in the interest of clearly showing the drawings of the present embodiment, only the surface shapes which are different from that in the first embodiment may be labeled. Please refer to FIG. 24 for the optical characteristics of each lens element in the optical imaging lens 5 of the present embodiment.

Figure 23A:
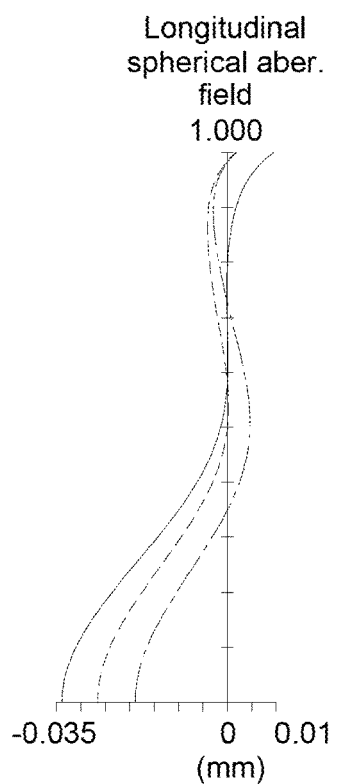
FIGS. 23(a)-23(d) depict a chart of a longitudinal spherical aberration and other kinds of optical aberrations of the fifth embodiment of the optical imaging lens according to the present disclosure.
Figure 23B:
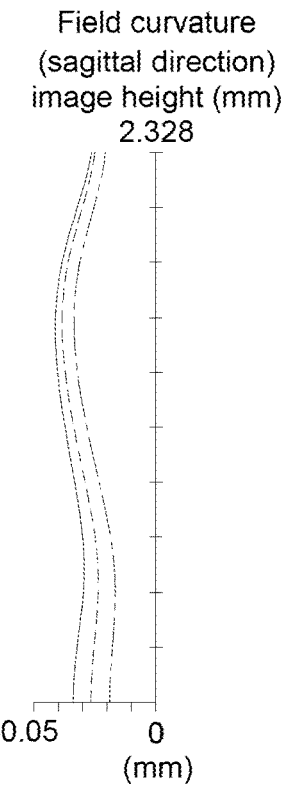
Figure 23C:
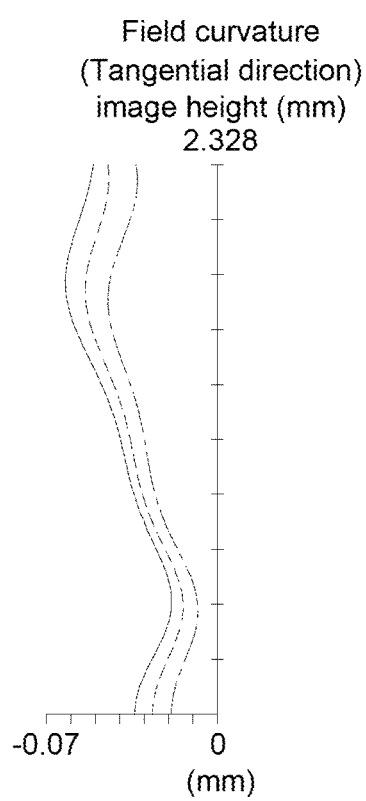
Figure 23D:
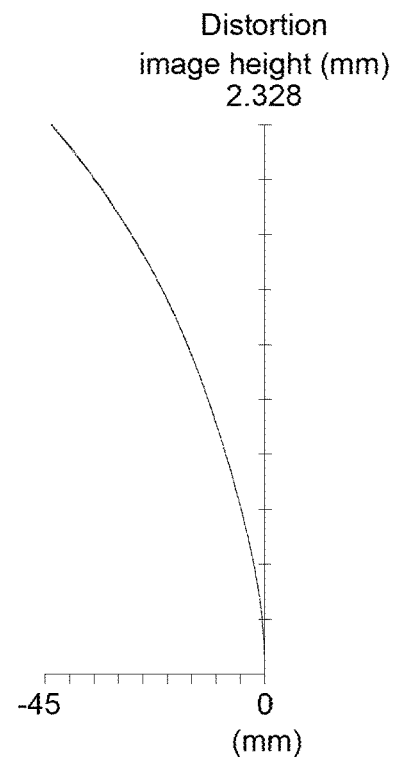

FIG. 23(a) shows a longitudinal spherical aberration for three representative wavelengths (470 nm, 555 nm, 650 nm), wherein the offset of the off-axis light relative to the image point may be within ±0.035 mm. Referring to FIG. 23(b), and the focus variation with respect to the three different wavelengths in the whole field may fall within ±0.05 mm. Referring to FIG. 23(c), the focus variation with respect to the three different wavelengths in the whole field may fall within ±0.07 mm. Referring to FIG. 23(d), the variation of the distortion aberration of the optical imaging lens 5 may be within ±45%.

As shown in FIGS. 23(a)-23(d) and FIG. 24, in comparison with the first embodiment, the field of view in the fifth embodiment may be larger, and the system length of the optical imaging lens 5 may be shorter.

Please refer to FIG. 46A for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 of the present embodiment.

Figure 26:
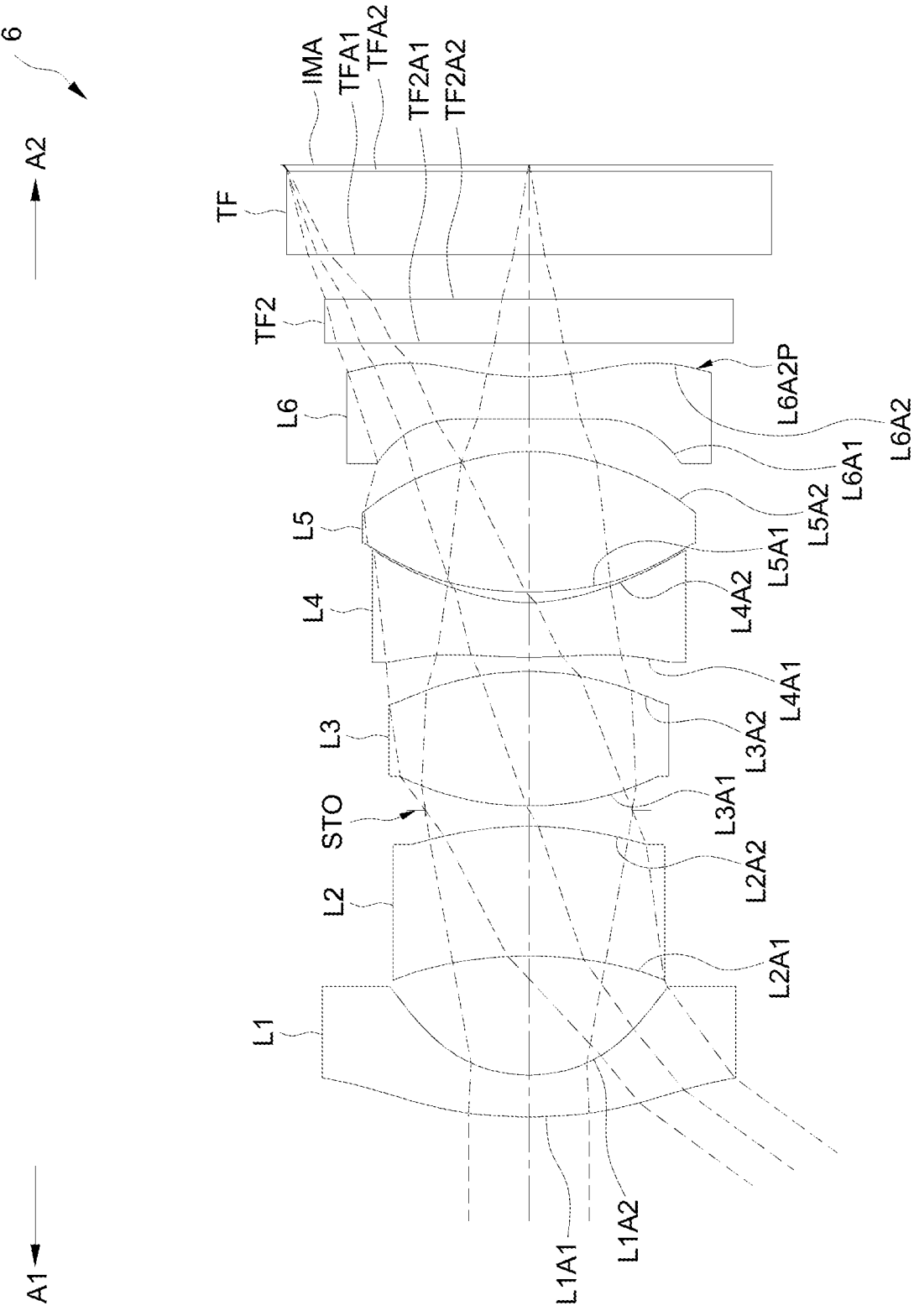
FIG. 26 depicts a cross-sectional view of the sixth embodiment of an optical imaging lens elements according to the present disclosure.

Reference is now made to FIGS. 26-29. FIG. 26 illustrates an example cross-sectional view of an optical imaging lens 6 according to a sixth example embodiment. FIGS. 27(a)-27(d) show example charts of a longitudinal spherical aberration and other kinds of optical aberrations of the optical imaging lens 6 according to the sixth example embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment.

As shown in FIG. 26 the optical imaging lens 6 of the present embodiment, in an order from an object side A1 to an image side A2 along an optical axis, may comprise a first lens element L1, a second lens element L2, an aperture stop STO, a third lens element L3, a fourth lens element L4, a fifth lens element L5, and a sixth lens element L6. Moreover, the optical imaging lens 6 further has a second filtering unit TF2 arranged between the sixth lens element L6 and the filtering TF. The second filtering unit TF2 comprises an object-side surface TF2A1 facing toward the object side A1 and an image-side surface TF2A2 facing toward the image side A2. The second filtering unit TF2 may be an IR cut filter, which can prevent the infrared ray in the light from being transmitted to the image plane and affecting the imaging quality, and may also be a protective glass to protect the optical imaging lens, but is not limit thereto.

The arrangement of the convex or concave surface structures of the lens elements, including the object-side surfaces L1A1, L2A1, L3A1, L4A1, L5A1, and L6A1 and the image-side surfaces L1A2, L2A2, L3A2, L4A2, L5A2, and the refracting powers of the lens elements of the present embodiment may be generally similar to the optical imaging lens 1, but the differences between the optical imaging lens 1 and the optical imaging lens 6 may include the concave or convex surface structures of the image-side surface L6A2. Additional differences may include a radius of curvature, a thickness, aspherical data, and/or an effective focal length of each lens element. More specifically, the periphery region L6A2P of the image-side surface L6A2 of the sixth lens element L6 may be convex.

Here, in the interest of clearly showing the drawings of the present embodiment, only the surface shapes which are different from that in the first embodiment may be labeled. Please refer to FIG. 28 for the optical characteristics of each lens element in the optical imaging lens 6 of the present embodiment.

Figure 27A:
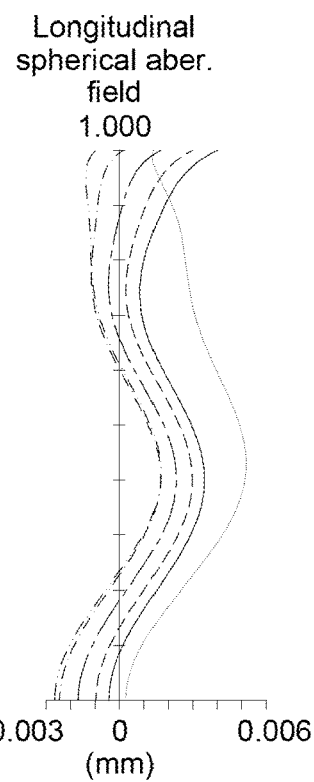
FIGS. 27(a)-27(d) depict a chart of a longitudinal spherical aberration and other kinds of optical aberrations of the sixth embodiment of the optical imaging lens according to the present disclosure.
Figure 27B:
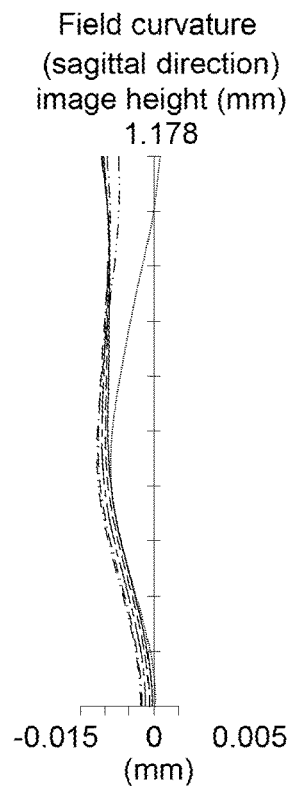
Figure 27C:
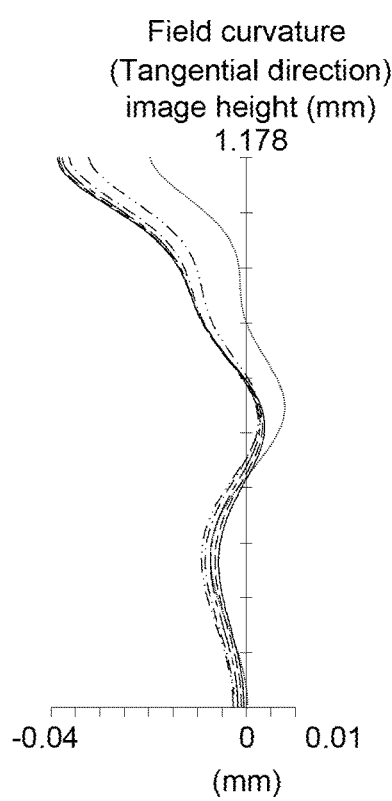
Figure 27D:
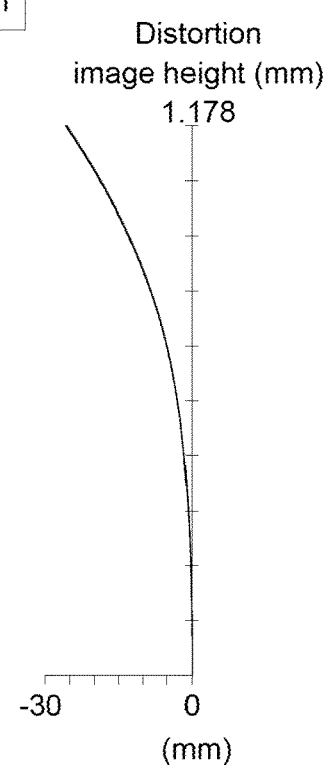

From the vertical deviation of each curve shown in FIG. 27(a), the offset of the off-axis light relative to the image point with respect to the six different wavelengths (500 nm, 600 nm, 700 nm, 800 nm, 900 nm, 1000 nm) may be within ±0.006 mm. Referring to FIG. 27(b), and the focus variation with respect to the six different wavelengths in the whole field may fall within ±0.015 mm. Referring to FIG. 27(c), the focus variation with respect to the six different wavelengths in the whole field may fall within ±0.04 mm. Referring to FIG. 27(d), the variation of the distortion aberration of the optical imaging lens 6 may be within ±30%.

As shown in FIGS. 27(a)-27(d) and FIG. 28, in comparison with the first embodiment, the longitudinal spherical aberration and the distortion aberration in the sixth embodiment may be smaller, the field of view of the optical imaging lens 6 the may be larger, the system length of the optical imaging lens 6 may be shorter, and the F-number of the optical imaging lens 6 may be smaller.

Please refer to FIG. 46B for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 of the present embodiment.

Figure 30:
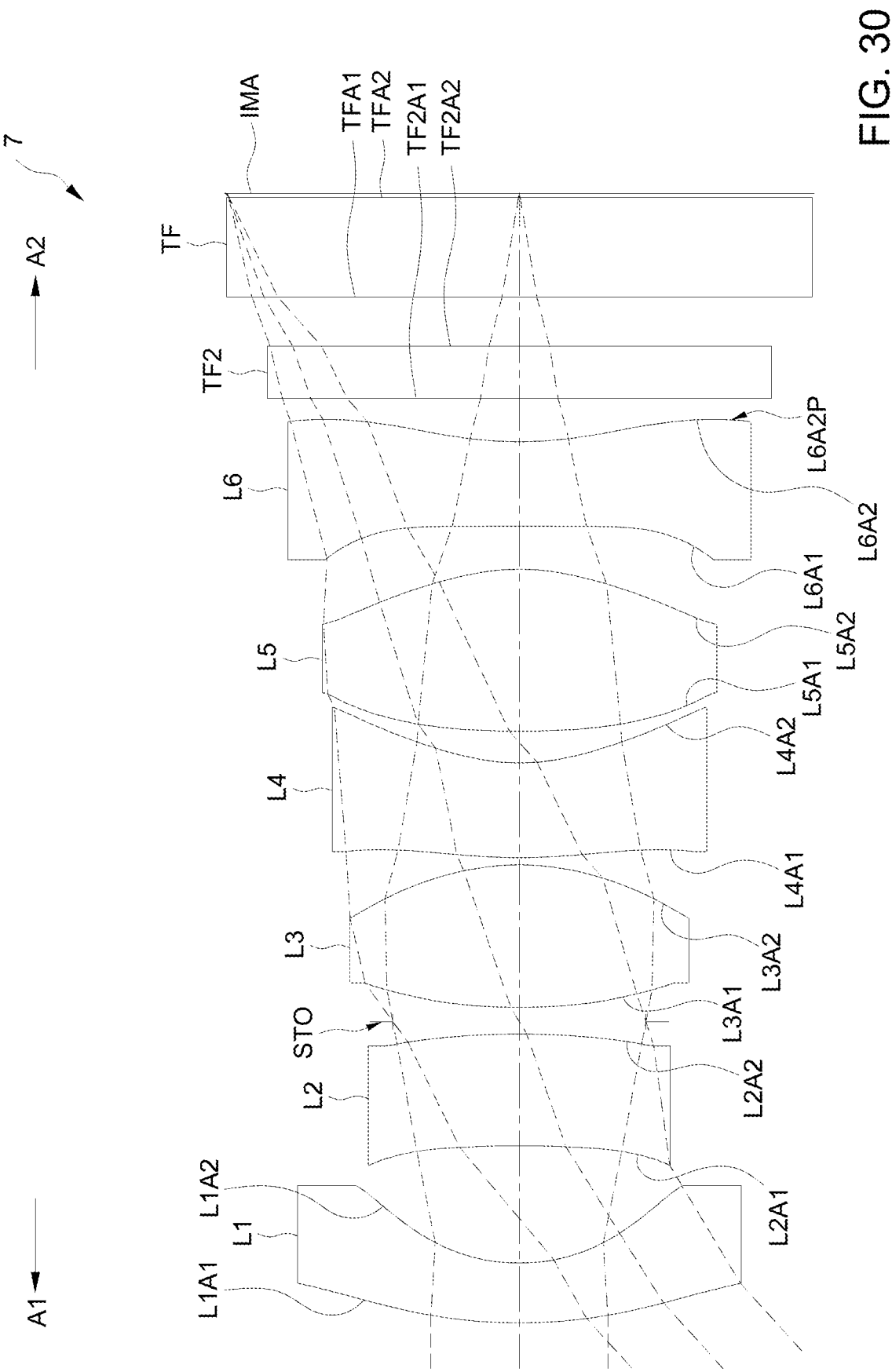
FIG. 30 depicts a cross-sectional view of the seventh embodiment of an optical imaging lens elements according to the present disclosure.

Reference is now made to FIGS. 30-33. FIG. 30 illustrates an example cross-sectional view of an optical imaging lens 7 according to a seventh example embodiment. FIGS. 31(a)-31(d) show example charts of a longitudinal spherical aberration and other kinds of optical aberrations of the optical imaging lens 7 according to the seventh example embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment.

As shown in FIG. 30 the optical imaging lens 7 of the present embodiment, in an order from an object side A1 to an image side A2 along an optical axis, may comprise a first lens element L1, a second lens element L2, an aperture stop STO, a third lens element L3, a fourth lens element L4, a fifth lens element L5, and a sixth lens element L6.

The arrangement of the convex or concave surface structures of the lens elements, including the object-side surfaces UAL L2A1, L3A1, L4A1, L5A1, and L6A1 and the image-side surfaces L1A2, L2A2, L3A2, L4A2, L5A2, and the refracting powers of the lens elements of the present embodiment may be generally similar to the optical imaging lens 1, but the differences between the optical imaging lens 1 and the optical imaging lens 7 may include the concave or convex surface structures of the image-side surface L6A2. Additional differences may include a radius of curvature, a thickness, aspherical data, and/or an effective focal length of each lens element. More specifically, the periphery region L6A2P of the image-side surface L6A2 of the sixth lens element L6 may be convex. Besides, the optical imaging lens 7 may further include a second filtering unit TF2 arranged between the sixth lens element L6 and the filtering unit TF.

Here, in the interest of clearly showing the drawings of the present embodiment, only the surface shapes which are different from that in the first embodiment may be labeled. Please refer to FIG. 32 for the optical characteristics of each lens element in the optical imaging lens 7 of the present embodiment.

From the vertical deviation of each curve shown in FIG. 31(a), the offset of the off-axis light relative to the image point with respect to the six different wavelengths (500 nm, 600 nm, 700 nm, 800 nm, 900 nm, 100 nm) may be within ±0.01 mm. Referring to FIG. 31(b), and the focus variation with respect to the six different wavelengths in the whole field may fall within ±0.015 mm. Referring to FIG. 31(c), the focus variation with respect to the six different wavelengths in the whole field may fall within ±0.03 mm. Referring to FIG. 31(d), the variation of the distortion aberration of the optical imaging lens 7 may be within ±10%.

As shown in FIGS. 31(a)-31(d) and FIG. 32, in comparison with the first embodiment, the longitudinal spherical aberration and the distortion aberration in the seventh embodiment may be smaller, the system length of the optical imaging lens 7 may be shorter, and the F-number of the optical imaging lens 7 may be smaller.

Please refer to FIG. 46B for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 of the present embodiment.

Figure 34:
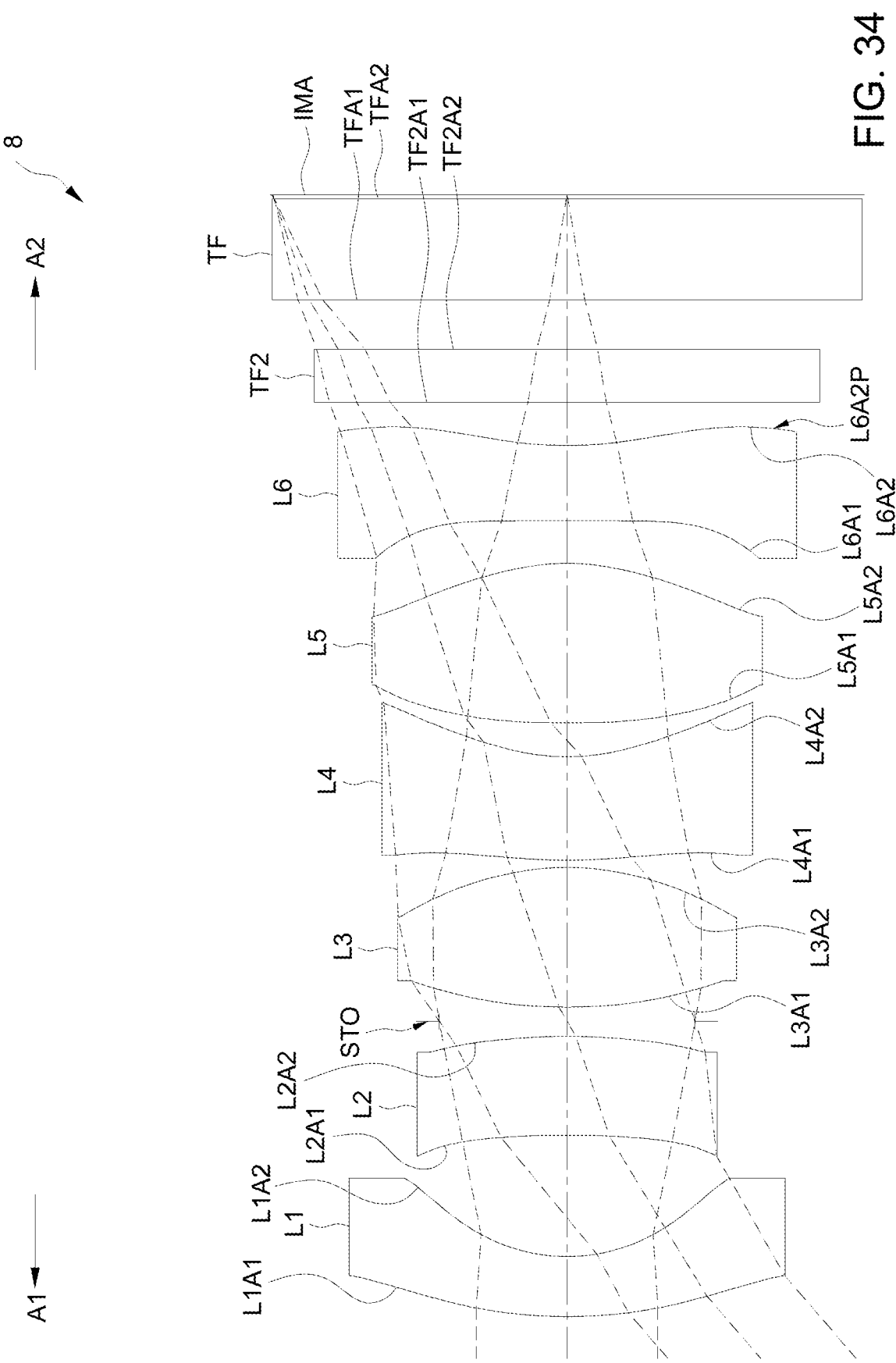
FIG. 34 depicts a cross-sectional view of the eighth embodiment of an optical imaging lens according to the present disclosure.

Reference is now made to FIGS. 34-37. FIG. 34 illustrates an example cross-sectional view of an optical imaging lens 8 according to an eighth example embodiment. FIGS. 35(a)-35(d) show example charts of a longitudinal spherical aberration and other kinds of optical aberrations of the optical imaging lens 8 according to the eighth example embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment.

As shown in FIG. 34 the optical imaging lens 8 of the present embodiment, in an order from an object side A1 to an image side A2 along an optical axis, may comprise a first lens element L1, a second lens element L2, an aperture stop STO, a third lens element L3, a fourth lens element L4, a fifth lens element L5, and a sixth lens element L6.

The arrangement of the convex or concave surface structures of the lens elements, including the object-side surfaces UAL L2A1, L3A1, L4A1, L5A1, and L6A1 and the image-side surfaces L1A2, L2A2, L3A2, L4A2, L5A2, and the refracting powers of the lens elements of the present embodiment may be generally similar to the optical imaging lens 1, but the differences between the optical imaging lens 1 and the optical imaging lens 8 may include the concave or convex surface structures of the image-side surface L6A2. Additional differences may include a radius of curvature, a thickness, aspherical data, and/or an effective focal length of each lens element. More specifically, the periphery region L6A2P of the image-side surface L6A2 of the sixth lens element L6 may be convex. Besides, the optical imaging lens 8 may further include a second filtering unit TF2 arranged between the sixth lens element L6 and the filtering unit TF.

Here, in the interest of clearly showing the drawings of the present embodiment, only the surface shapes which are different from that in the first embodiment may be labeled. Please refer to FIG. 36 for the optical characteristics of each lens element in the optical imaging lens 8 of the present embodiment.

From the vertical deviation of each curve shown in FIG. 35(*a*), the offset of the off-axis light relative to the image point with respect to the six different wavelengths (500 nm, 600 nm, 700 nm, 800 nm, 900 nm, 1000 nm) may be within ±0.01 mm. Referring to FIG. 35(*b*), and the focus variation with respect to the six different wavelengths in the whole field may fall within ±0.02 mm. Referring to FIG. 35(*c*), the focus variation with respect to the six different wavelengths in the whole field may fall within ±0.025 mm. Referring to FIG. 35(*d*), the variation of the distortion aberration of the optical imaging lens 8 may be within ±7%.

As shown in FIGS. 35(*a*)-35(*d*) and FIG. 36, in comparison with the first embodiment the longitudinal spherical aberration and the distortion aberration of the eighth embodiment may be smaller, the system length of the optical imaging lens 8 may be shorter, and the F-number of the optical imaging lens 8 may be smaller.

Please refer to FIG. 46B for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 of the present embodiment.

Figure 38:
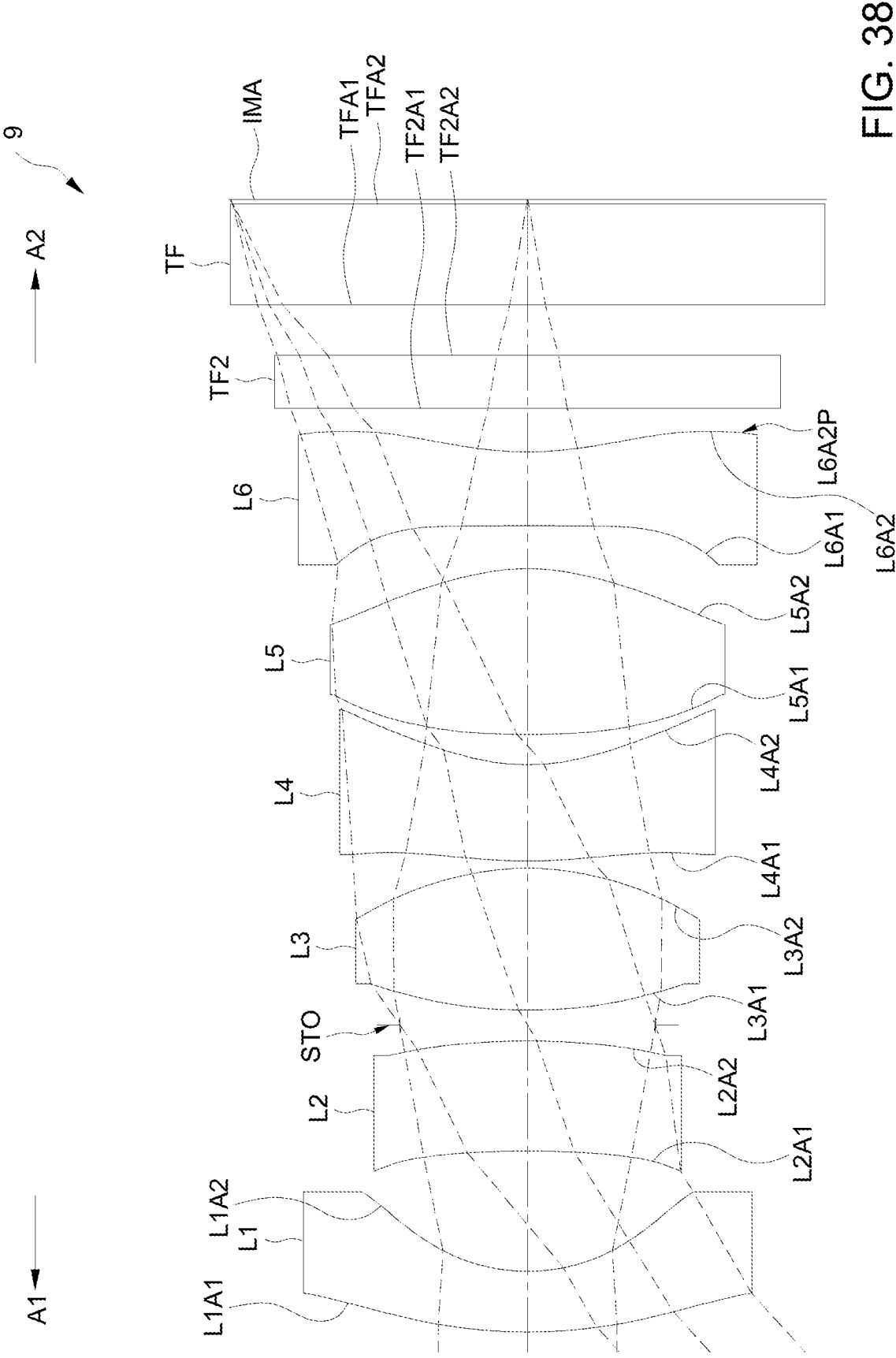
FIG. 38 depicts a cross-sectional view of the ninth embodiment of an optical imaging lens according to the present disclosure.
Figure 39A:
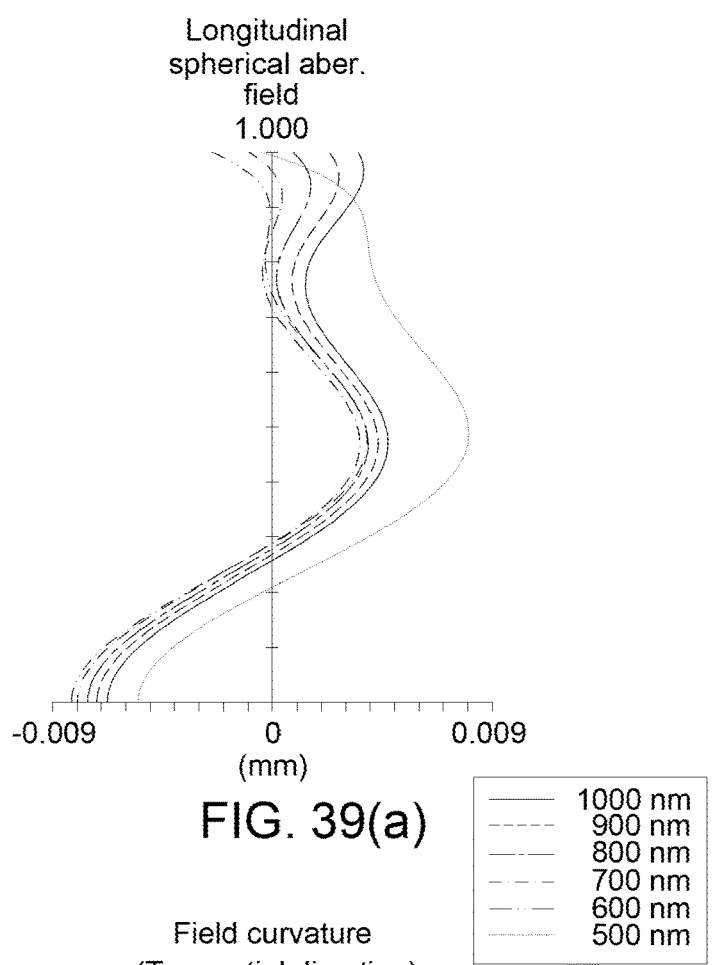
FIGS. 39(a)-39(d) depict a chart of a longitudinal spherical aberration and other kinds of optical aberrations of the ninth embodiment of the optical imaging lens according to the present disclosure.
Figure 39B:
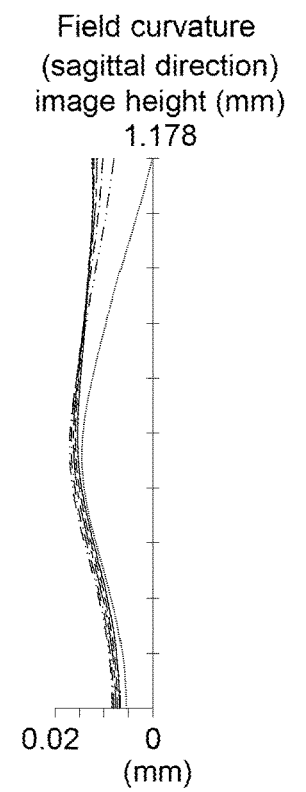
Figure 39C:
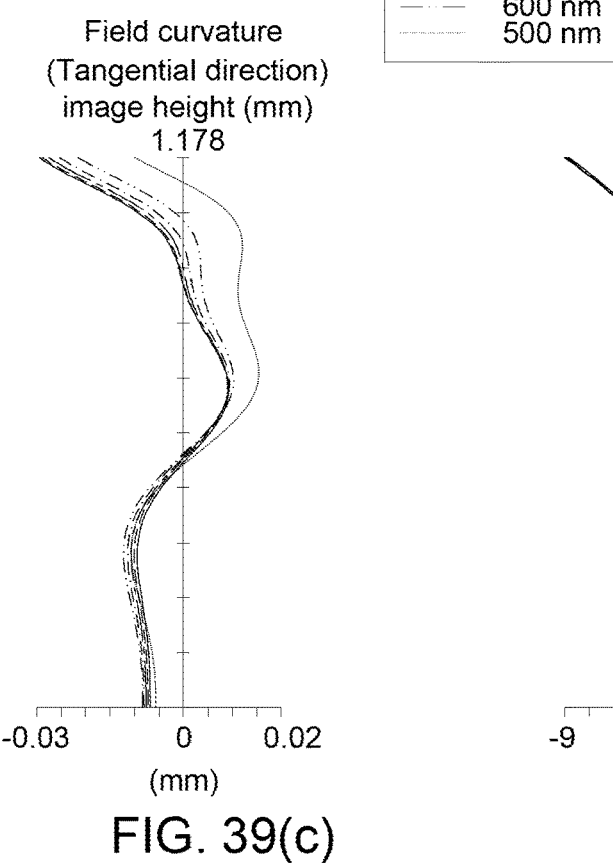
Figure 39D:
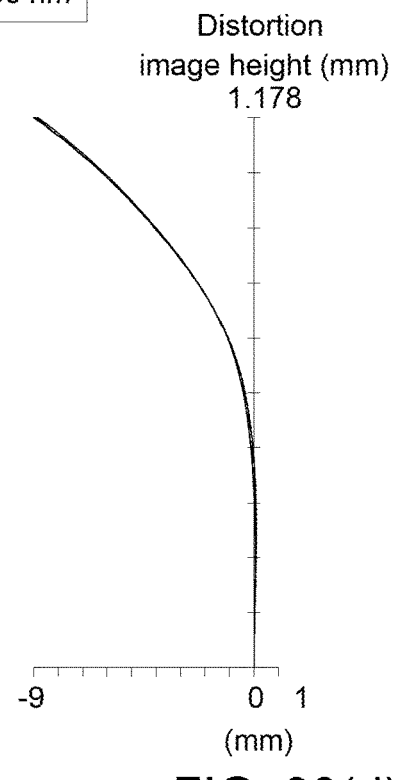

Reference is now made to FIGS. 38-41. FIG. 38 illustrates an example cross-sectional view of an optical imaging lens 9 according to a ninth example embodiment. FIGS. 39(*a*)-39(*d*) show example charts of a longitudinal spherical aberration and other kinds of optical aberrations of the optical imaging lens 9 according to the ninth example embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment.

As shown in FIG. 38 the optical imaging lens 9 of the present embodiment, in an order from an object side A1 to an image side A2 along an optical axis, may comprise a first lens element L1, a second lens element L2, an aperture stop STO, a third lens element L3, a fourth lens element L4, a fifth lens element L5, and a sixth lens element L6.

The arrangement of the convex or concave surface structures of the lens elements, including the object-side surfaces L1A1, L2A1, L3A1, L4A1, L5A1, and L6A1 and the image-side surfaces L1A2, L2A2, L3A2, L4A2, L5A2, and the refracting powers of the lens elements of the present embodiment may be generally similar to the optical imaging lens 1, but the differences between the optical imaging lens 1 and the optical imaging lens 9 may include the concave or convex surface structures of the image-side surface L6A2. Additional differences may include a radius of curvature, a thickness, aspherical data, and/or an effective focal length of each lens element. More specifically, the periphery region L6A2P of the image-side surface L6A2 of the sixth lens element L6 may be convex. Besides, the optical imaging lens 9 may further include a second filtering unit TF2 arranged between the sixth lens element L6 and the filtering unit TF.

Here, in the interest of clearly showing the drawings of the present embodiment, only the surface shapes which are different from that in the first embodiment may be labeled. Please refer to FIG. 40 for the optical characteristics of each lens element in the optical imaging lens 9 of the present embodiment.

From the vertical deviation of each curve shown in FIG. 39(*a*), the offset of the off-axis light relative to the image point with respect to the six different wavelengths (500 nm, 600 nm, 700 nm, 800 nm, 900 nm, 1000 nm) may be within ±0.009 mm. Referring to FIG. 39(*b*), and the focus variation with respect to the six different wavelengths in the whole field may fall within ±0.02 mm. Referring to FIG. 39(*c*), the focus variation with respect to the six different wavelengths in the whole field may fall within ±0.03 mm. Referring to FIG. 39(*d*), the variation of the distortion aberration of the optical imaging lens 9 may be within ±9%.

As shown in FIGS. 39(*a*)-39(*d*) and FIG. 40, in comparison with the first embodiment, the longitudinal spherical aberration and the distortion aberration of the ninth embodiment may be smaller, the system length of the optical imaging lens 9 may be shorter, and the F-number of the optical imaging lens 9 may be smaller.

Please refer to FIG. 46B for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 of the present embodiment.

Figure 42:
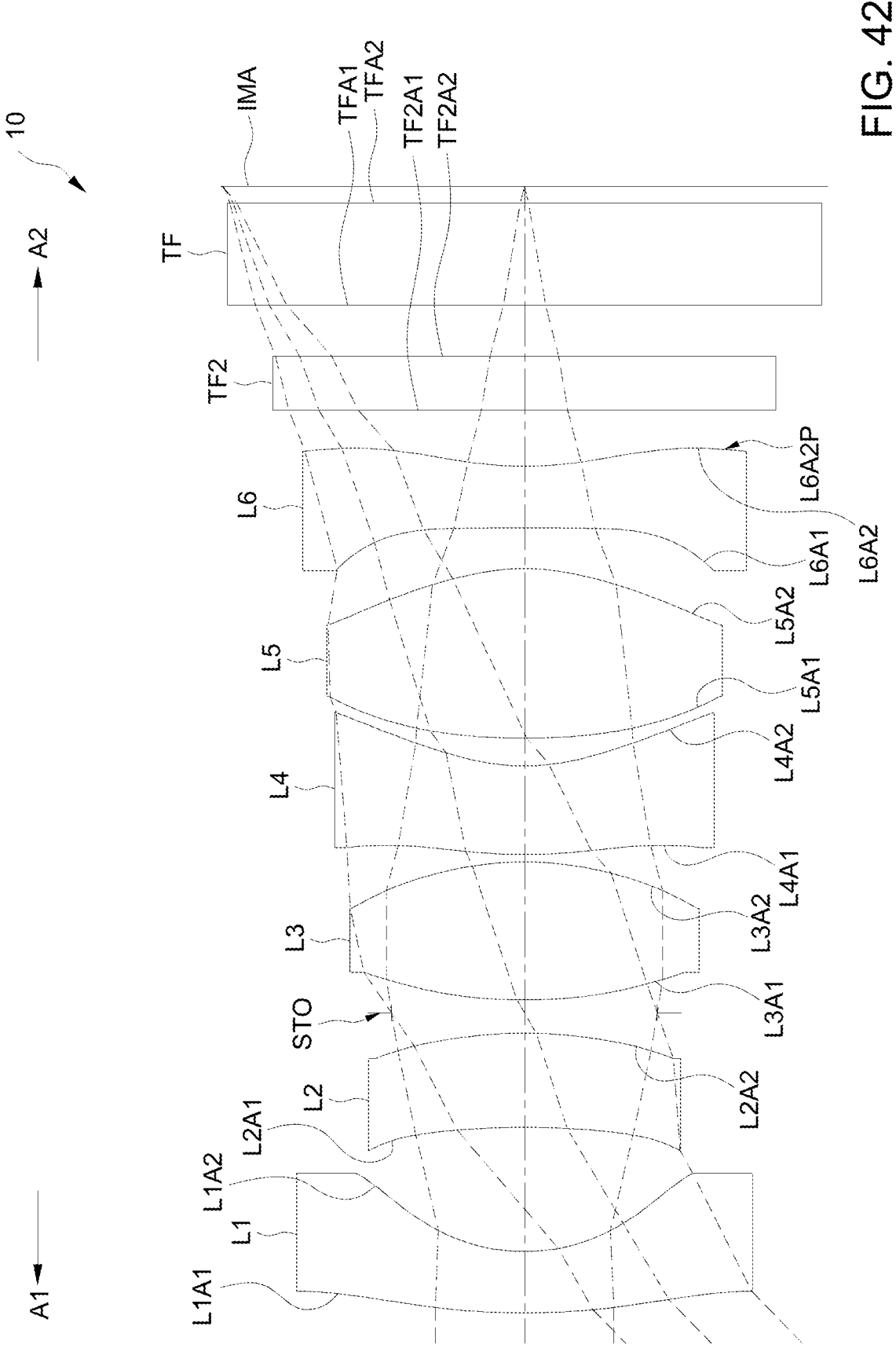
FIG. 42 depicts a cross-sectional view of the tenth embodiment of an optical imaging lens according to the present disclosure.

Reference is now made to FIGS. 42-45. FIG. 42 illustrates an example cross-sectional view of an optical imaging lens 10 according to a tenth example embodiment. FIGS. 43(*a*)-43(*d*) show example charts of a longitudinal spherical aberration and other kinds of optical aberrations of the optical imaging lens 10 according to the tenth example embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment.

As shown in FIG. 42, the optical imaging lens 10 of the present embodiment, in an order from an object side A1 to an image side A2 along an optical axis, may comprise a first lens element L1, a second lens element L2, an aperture stop STO, a third lens element L3, a fourth lens element L4, a fifth lens element L5, and a sixth lens element L6.

The arrangement of the convex or concave surface structures of the lens elements, including the object-side surfaces L1A1, L2A1, L3A1, L4A1, L5A1, and L6A1 and the image-side surfaces L1A2, L2A2, L3A2, L4A2, L5A2, and the refracting powers of the lens elements of the present embodiment may be generally similar to the optical imaging lens 1, but the differences between the optical imaging lens 1 and the optical imaging lens 10 may include the concave or convex surface structures of the image-side surface L6A2. Additional differences may include a radius of curvature, a thickness, aspherical data, and/or an effective focal length of each lens element. More specifically, the periphery region L6A2P of the image-side surface L6A2 of the sixth lens element L6 may be convex. Besides, the optical imaging lens 10 may further include a second filtering unit TF2 arranged between the sixth lens element L6 and the filtering unit TF.

Here, in the interest of clearly showing the drawings of the present embodiment, only the surface shapes which are different from that in the first embodiment may be labeled. Please refer to FIG. 44 for the optical characteristics of each lens element in the optical imaging lens 10 of the present embodiment.

Figure 43A:
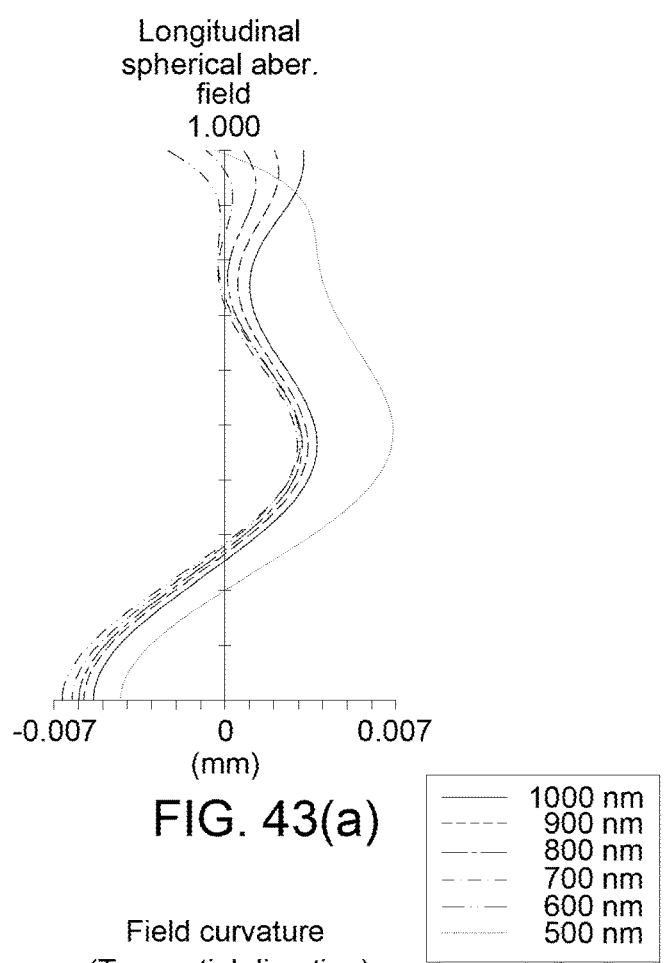
FIGS. 43(a)-43(d) depict a chart of a longitudinal spherical aberration and other kinds of optical aberrations of the tenth embodiment of the optical imaging lens according to the present disclosure.
Figure 43B:
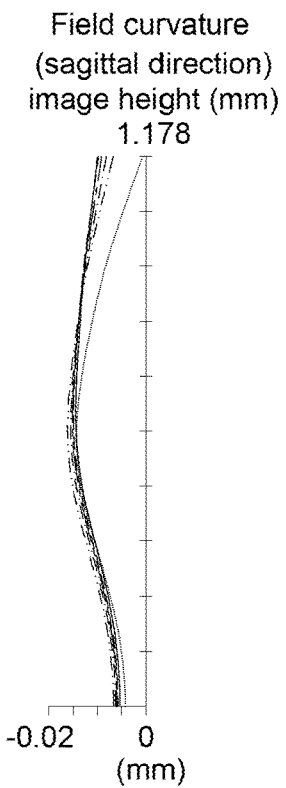
Figure 43C:
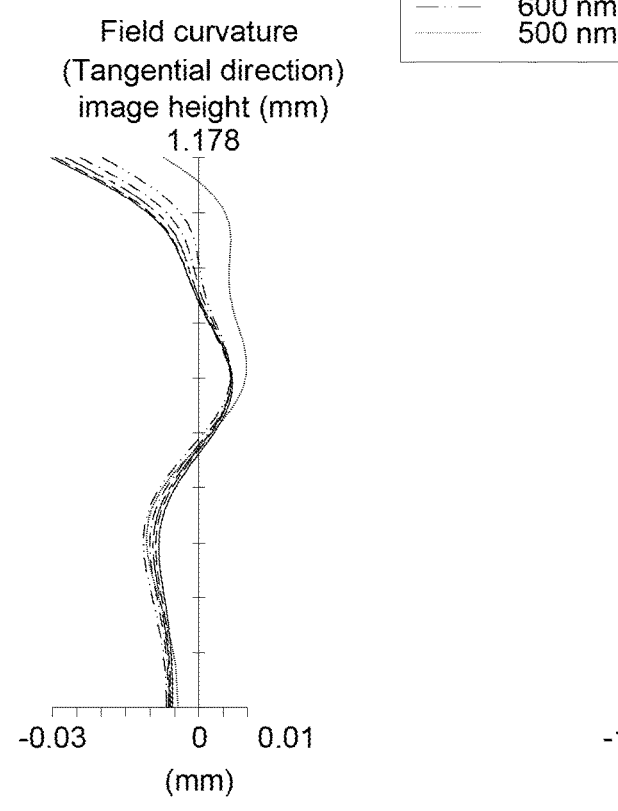
Figure 43D:
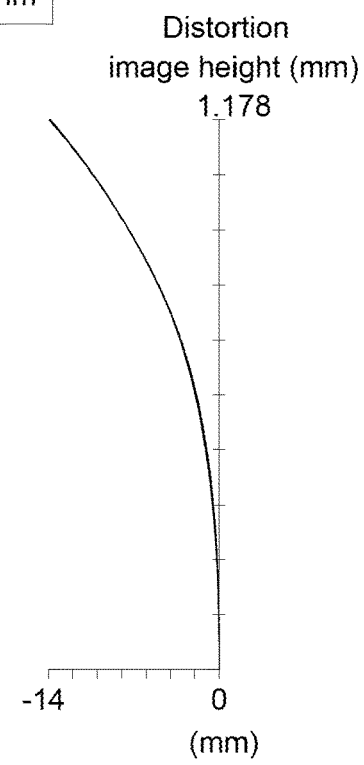

From the vertical deviation of each curve shown in FIG. 43(a), the offset of the off-axis light relative to the image point with respect to the six different wavelengths (500 nm, 600 nm, 700 nm, 800 nm, 900 nm, 1000 nm) may be within ±0.007 mm. Referring to FIG. 43(b), and the focus variation with respect to the six different wavelengths in the whole field may fall within ±0.02 mm. Referring to FIG. 43(c), the focus variation with respect to the six different wavelengths in the whole field may fall within ±0.03 mm. Referring to FIG. 43(d), the variation of the distortion aberration of the optical imaging lens 10 may be within ±14%.

As shown in FIGS. 43(a)-43(d) and FIG. 44, in comparison with the first embodiment, the longitudinal spherical aberration and the distortion aberration of the tenth embodiment may be smaller, the system length of the optical imaging lens 10 may be shorter, and the F-number of the optical imaging lens 10 may be smaller.

Please refer to FIG. 46B for the values of HFOV/(AAG+BFL), G12/(G45+G56), TTL/AAG, Fno*ImgH/EFL, V2+V4+V5, (T2+T6)/G12, ALT/(G34+T4+G45), (G23+T3+G34)/T4, TTL/(T2+T6), HFOV/(Fno*EFL), V1+V2+V4, (T3+T5)/T1, (ALT+G12)/BFL, (G12+T3+T5)/(G23+G56), TL/G12, HFOV/ALT, TL/AAG, (T1+T4)/(G45+G56), (T2+EFL)/BFL, and V2+V3+V4 of the present embodiment.

The optical imaging lens in each embodiment of the present disclosure with the arrangements of the convex or concave surface structures described below may advantageously increase the field of view, decrease the system length and the F-number of the optical imaging lens and maintain good optical characteristics: the first lens element having negative refracting power, an optical axis region of the object-side surface of the second lens element being concave, a periphery region of the image-side surface of the fifth lens element being convex, an optical axis region of the object-side surface of the sixth lens element being concave, and an optical axis region of the image-side surface of the sixth lens element being concave; alternatively, the first lens element having negative refracting power, an optical axis region of the object-side surface of the first lens element being convex, an optical axis region of the object-side surface of the second lens element being concave, an optical axis region of the object-side surface of the fourth lens element being convex, a periphery region of the image-side surface of the fourth lens element being concave, an optical axis region of the object-side surface of the fifth lens element being convex, and an optical axis region of the image-side surface of the sixth lens element being concave; alternatively, an optical axis region of the image-side surface of the second lens element being convex, an optical axis region of the object-side surface of the fourth lens element being convex, a periphery region of the object-side surface of the fifth lens element being convex, an optical axis region of the object-side surface of the sixth lens element being concave, and an optical axis region of the image-side surface of the sixth lens element being concave. The above three combinations may advantageously correct longitudinal spherical aberrations and field curvature aberration, and reduce the distortion aberration.

A numerical range including maximum and minimum values that is obtained based on combination and proportional relationships of the optical parameters disclosed in the embodiments of the disclosure may be implemented according thereto.

According to above disclosure, the longitudinal spherical aberration, the field curvature aberration and the variation of the distortion aberration of each embodiment may meet the use requirements of various electronic products which implement an optical imaging lens. Moreover, the off-axis light with respect to representative wavelengths may be focused around an image point, and the offset of the off-axis light for each curve relative to the image point may be controlled to effectively inhibit the longitudinal spherical aberration, the field curvature aberration and/or the variation of the distortion aberration. Further, as shown by the imaging quality data provided for each embodiment, the distance between the representative wavelengths may indicate that focusing ability and inhibiting ability for dispersion may be provided for different wavelengths.

In consideration of the non-predictability of the optical lens assembly, while the optical lens assembly may satisfy any one of inequalities described above, the optical lens assembly herein according to the disclosure may achieve a shortened length and smaller spherical aberration, field curvature aberration, and/or distortion aberration, provide an enlarged field of view, increase an imaging quality and/or assembly yield, and/or effectively improve drawbacks of a typical optical lens assembly.

While various embodiments in accordance with the disclosed principles are described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens comprising a first lens element, a second lens element, a third lens element, a fourth lens element, a fifth lens element, and a sixth lens element sequentially from an object side to an image side along an optical axis, each of the first, second, third, fourth, fifth, and sixth lens elements having an object-side surface facing toward the object side and allowing imaging rays to pass through as well as an image-side surface facing toward the image side and allowing the imaging rays to pass through, wherein:

the first lens element has negative refracting power;
    an optical axis region of the object-side surface of the second lens element is concave;
    a periphery region of the image-side surface of the fifth lens element is convex;
    an optical axis region of the object-side surface of the sixth lens element is concave;
    an optical axis region of the image-side surface of the sixth lens element is concave;
    lens elements included by the optical imaging lens are only the six lens elements described above;
    a half field of view of the optical imaging lens is represented by HFOV;
    a sum of five air gaps from the first lens element to the sixth lens element along the optical axis is represented by AAG;
    a distance from the image-side surface of the sixth lens element to an image plane along the optical axis is represented by BFL;
    a distance from the image-side surface of the first lens element to the object-side surface of the second lens element along the optical axis is represented by G12;
    a distance from the image-side surface of the fourth lens element to the object-side surface of the fifth lens element along the optical axis is represented by G45;
    a distance from the image-side surface of the fifth lens element to the object-side surface of the sixth lens element along the optical axis is represented by G56; and
    the optical imaging lens satisfies an inequality: HFOV/(AAG+BFL)≥16.000 degrees/mm and an inequality: G12/(G45+G56)≥1.300.

2. The optical imaging lens according to claim 1, wherein a distance from the object-side surface of the first lens element to the image plane along the optical axis is represented by TTL, and the optical imaging lens further satisfies an inequality: TTL/AAG≥4.000.

3. The optical imaging lens according to claim 1, wherein a F-number of the optical imaging lens is represented by Fno, an image height of the optical imaging lens is represented by ImgH, an effective focal length of the optical imaging lens is represented by EFL, and the optical imaging lens further satisfies an inequality: Fno*ImgH/EFL≥1.600.

4. The optical imaging lens according to claim 1, wherein an Abbe number of the second lens element is represented by V2, an Abbe number of the fourth lens element is represented by V4, an Abbe number of the fifth lens element is represented by V5, and the optical imaging lens further satisfies an inequality: V2+V4+V5≤135.000.

5. The optical imaging lens according to claim 1, wherein a thickness of the second lens element along the optical axis is represented by T2, a thickness of the sixth lens element along the optical axis is represented by T6, and the optical imaging lens further satisfies an inequality: (T2+T6)/G12≥1.200.

6. The optical imaging lens according to claim 1, wherein a sum of six thicknesses from the first lens element to the sixth lens element along the optical axis is represented by ALT, a distance from the image-side surface of the third lens element to the object-side surface of the fourth lens element along the optical axis is represented by G34, a thickness of the fourth lens element along the optical axis is represented by T4, and the optical imaging lens further satisfies an inequality: ALT/(G34+T4+G45)≥4.400.

7. The optical imaging lens according to claim 1, wherein a distance from the image-side surface of the second lens element to the object-side surface of the third lens element along the optical axis is represented by G23, a thickness of the third lens element along the optical axis is represented by T3, a distance from the image-side surface of the third lens element to the object-side surface of the fourth lens element along the optical axis is represented by G34, a thickness of the fourth lens element along the optical axis is represented by T4, and the optical imaging lens further satisfies an inequality: (G23+T3+G34)/T4≤3.200.

8. An optical imaging lens comprising a first lens element, a second lens element, a third lens element, a fourth lens element, a fifth lens element, and a sixth lens element sequentially from an object side to an image side along an optical axis, each of the first, second, third, fourth, fifth, and sixth lens elements having an object-side surface facing toward the object side and allowing imaging rays to pass through as well as an image-side surface facing toward the image side and allowing the imaging rays to pass through, wherein:

the first lens element has negative refracting power;
    an optical axis region of the object-side surface of the first lens element is convex;
    an optical axis region of the object-side surface of the second lens element is concave;
    an optical axis region of the object-side surface of the fourth lens element is convex;
    a periphery region of the image-side surface of the fourth lens element is concave;
    an optical axis region of the object-side surface of the fifth lens element is convex;
    an optical axis region of the image-side surface of the sixth lens element is concave;
    lens elements included by the optical imaging lens are only the six lens elements described above;
    a half field of view of the optical imaging lens is represented by HFOV;
    a sum of five air gaps from the first lens element to the sixth lens element along the optical axis is represented by AAG;
    a distance from the image-side surface of the sixth lens element to an image plane along the optical axis is represented by BFL;
    a distance from the image-side surface of the first lens element to the object-side surface of the second lens element along the optical axis is represented by G12;

a distance from the image-side surface of the fourth lens element to the object-side surface of the fifth lens element along the optical axis is represented by G45;

a distance from the image-side surface of the fifth lens element to the object-side surface of the sixth lens element along the optical axis is represented by G56; and the optical imaging lens satisfies an inequality: HFOV/(AAG+BFL)≥16.000 degrees/mm and an inequality: G12/(G45+G56)≥1.300.

9. The optical imaging lens according to claim 8, wherein a distance from the object-side surface of the first lens element to the image plane along the optical axis is represented by TTL, a thickness of the second lens element along the optical axis is represented by T2, a thickness of the sixth lens element along the optical axis is represented by T6, and the optical imaging lens further satisfies an inequality: TTL/(T2+T6)≥5.000.

10. The optical imaging lens according to claim 8, wherein a F-number of the optical imaging lens is represented by Fno, an effective focal length of the optical imaging lens is represented by EFL, and the optical imaging lens further satisfies an inequality: HFOV/(Fno*EFL) ≥8.000 degrees/mm.

11. The optical imaging lens according to claim 8, wherein an Abbe number of the first lens element is represented by V1, an Abbe number of the second lens element is represented by V2, an Abbe number of the fourth lens element is represented by V4, and the optical imaging lens further satisfies an inequality: V1+V2+V4≤140.000.

12. The optical imaging lens according to claim 8, wherein a thickness of the first lens element along the optical axis is represented by T1, a thickness of the third lens element along the optical axis is represented by T3, a thickness of the fifth lens element along the optical axis is represented by T5, and the optical imaging lens further satisfies an inequality: (T3+T5)/T1≥4.000.

13. The optical imaging lens according to claim 8, wherein a sum six thicknesses from the first lens element to the sixth lens element along the optical axis is represented by ALT, and the optical imaging lens further satisfies an inequality: (ALT+G12)/BFL≥2.600.

14. The optical imaging lens according to claim 8, wherein a thickness of the third lens element along the optical axis is represented by T3, a thickness of the fifth lens element along the optical axis is represented by T5, a distance from the image-side surface of the second lens element to the object-side surface of the third lens element along the optical axis is represented by G23, and the optical imaging lens further satisfies an inequality: (G12+T3+T5)/(G23+G56)≥5.800.

15. An optical imaging lens comprising a first lens element, a second lens element, a third lens element, a fourth lens element, a fifth lens element, and a sixth lens element sequentially from an object side to an image side along an optical axis, each of the first, second, third, fourth, fifth, and sixth lens elements having an object-side surface facing toward the object side and allowing imaging rays to pass through as well as an image-side surface facing toward the image side and allowing the imaging rays to pass through, wherein:

an optical axis region of the image-side surface of the second lens element is convex;

an optical axis region of the object-side surface of the fourth lens element is convex;

a periphery region of the object-side surface of the fifth lens element is convex;

an optical axis region of the object-side surface of the sixth lens element is concave;

an optical axis region of the image-side surface of the sixth lens element is concave;

lens elements included by the optical imaging lens are only the six lens elements described above;

a half field of view of the optical imaging lens is represented by HFOV;

a sum of five air gaps from the first lens element to the sixth lens element along the optical axis is represented by AAG;

a distance from the image-side surface of the sixth lens element to an image plane along the optical axis is represented by BFL;

a distance from the image-side surface of the first lens element to the object-side surface of the second lens element along the optical axis is represented by G12;

a distance from the image-side surface of the fourth lens element to the object-side surface of the fifth lens element along the optical axis is represented by G45;

a distance from the image-side surface of the fifth lens element to the object-side surface of the sixth lens element along the optical axis is represented by G56; and the optical imaging lens satisfies an inequality: HFOV/(AAG+BFL)≥16.000 degrees/mm and an inequality: G12/(G45+G56)≥1.300.

16. The optical imaging lens according to claim 15, wherein a distance from the object-side surface of the first lens element to the image-side surface of the sixth lens element along the optical axis is represented by TL, and the optical imaging lens further satisfies an inequality: TL/G12≥5.300.

17. The optical imaging lens according to claim 15, wherein a sum of six thicknesses from the first lens element to the sixth lens element along the optical axis is represented by ALT, and the optical imaging lens further satisfies an inequality: HFOV/ALT≥16.000 degrees/mm.

18. The optical imaging lens according to claim 15, wherein a distance from the object-side surface of the first lens element to the image-side surface of the sixth lens element along the optical axis is represented by TL, and the optical imaging lens further satisfies an inequality: TL/AAG≥3.500.

19. The optical imaging lens according to claim 15, wherein a thickness of the first lens element along the optical axis is represented by T1, a thickness of the fourth lens element along the optical axis is represented by T4, and the optical imaging lens further satisfies an inequality: (T1+T4)/(G45+G56)≤2.400.

20. The optical imaging lens according to claim 15, wherein a thickness of the second lens element along the optical axis is represented by T2, an effective focal length of the optical imaging lens is represented by EFL, and the optical imaging lens further satisfies an inequality: (T2+EFL)/BFL≥1.100.

* * * * *